United States Patent [19]
Buckland et al.

[11] Patent Number: 5,940,355
[45] Date of Patent: Aug. 17, 1999

[54] DATA STORAGE DEVICE INCLUDING A TRANSPORT MECHANISM FOR MOVING DISK STORAGE MEDIA BETWEEN A PLURALITY OF REMOVABLE MAGAZINES AND A DISK DRIVE

[75] Inventors: Kurt A. Buckland, Yorba Linda; Philip Bryer, Tarzana; William R. Miller; Michael Harvey, both of Irvine, all of Calif.

[73] Assignee: Cygnet Storage Solutions, San Jose, Calif.

[21] Appl. No.: 08/624,296

[22] Filed: Mar. 29, 1996

[51] Int. Cl.$^6$ ................................................. G11B 17/038
[52] U.S. Cl. .............................................. 369/36; 369/178
[58] Field of Search ................................. 369/34, 36–38, 369/178, 192; 360/98.04, 92

[56] References Cited

U.S. PATENT DOCUMENTS

| | | | |
|---|---|---|---|
| 4,271,489 | 6/1981 | Siryj et al. | 369/38 |
| 4,561,078 | 12/1985 | Nakayama | 369/38 |
| 4,589,101 | 5/1986 | Schatteman et al. | 369/38 |
| 4,682,313 | 7/1987 | Miyake | 369/39 |
| 4,685,095 | 8/1987 | Rudy et al. | 369/36 |
| 4,730,291 | 3/1988 | Ikedo et al. | 369/36 |
| 4,730,292 | 3/1988 | Hasegawa et al. | 369/39 |
| 4,737,945 | 4/1988 | Yamazaki et al. | 369/36 |
| 4,754,445 | 6/1988 | Young et al. | 369/37 |
| 4,768,116 | 8/1988 | Watanabe | 360/98.04 |
| 4,787,074 | 11/1988 | Deck et al. | 369/36 |
| 4,788,673 | 11/1988 | Ikedo et al. | 369/36 |
| 4,791,626 | 12/1988 | Staar | 369/37 |
| 4,797,865 | 1/1989 | Imai et al. | 369/39 |
| 4,800,554 | 1/1989 | Yamasaki et al. | 369/36 |
| 4,807,208 | 2/1989 | Geiger | 369/39 |
| 4,811,319 | 3/1989 | Ikedo et al. | 369/36 |
| 4,841,499 | 6/1989 | Takahashi et al. | 369/38 |
| 4,899,326 | 2/1990 | Takeya et al. | 369/36 |
| 4,926,406 | 5/1990 | Ikedo et al. | 369/36 |
| 4,969,138 | 11/1990 | Ikedo et al. | 369/36 |
| 5,033,038 | 7/1991 | Kobayashi et al. | 369/36 |
| 5,034,935 | 7/1991 | Ishibashi et al. | 369/36 |
| 5,036,503 | 7/1991 | Tomita | 369/36 |
| 5,056,073 | 10/1991 | Fitzgerald et al. | 369/36 |
| 5,058,090 | 10/1991 | Ueno et al. | 369/36 |
| 5,060,211 | 10/1991 | Blanding | 369/36 |

(List continued on next page.)

FOREIGN PATENT DOCUMENTS

| | | |
|---|---|---|
| 520636 | 1/1956 | Canada . |
| 0 139 161 | 5/1985 | European Pat. Off. . |
| 0 177 232 | 4/1986 | European Pat. Off. . |
| 0 296 829 | 12/1988 | European Pat. Off. . |
| 41 34 241 A1 | 4/1993 | Germany . |
| 43 14 387 | 11/1994 | Germany . |
| 58-166559 | 10/1993 | Japan . |
| 2 160 349 | 12/1985 | United Kingdom . |

OTHER PUBLICATIONS

Advertisement (2 pages) for PD/CD–ROM Library, Panasonic Communications & Systems Company "undated".

*Primary Examiner*—Brian E. Miller
*Attorney, Agent, or Firm*—Hopkins & Carley

[57] ABSTRACT

A CD-ROM tower holds 100 CD-ROM disks or like media in five removable magazines. The magazines are identifiable by a robotics control system in the tower. The tower further includes four drives which receive the disks and transfer data from the disks to a SCSI bus. A transport mechanism controlled by the robotics control system raises and lowers an elevator with respect to the magazines and the drives. A tray picker mechanism on the elevator pulls a tray out of a magazine, and a disk lifter mechanism on the elevator lifts a disk from the tray. After the tray is returned to the magazine, the elevator is moved a drive and the disk is lowered onto the drive drawer. In similar manner, a disk is removed from a drive drawer and returned to a magazine tray. The tower is configured to use commercially available CD-ROM drives or other media drives so that the drives are available at commodity prices and are easily replaceable and upgradeable.

4 Claims, 51 Drawing Sheets

U.S. PATENT DOCUMENTS

| | | | |
|---|---|---|---|
| 5,077,717 | 12/1991 | Onishi et al. | 369/36 |
| 5,084,859 | 1/1992 | Ishibashi et al. | 369/34 |
| 5,088,076 | 2/1992 | Serita et al. | 369/39 |
| 5,099,465 | 3/1992 | Geiger et al. | 369/36 |
| 5,099,466 | 3/1992 | Kimura et al. | 369/36 |
| 5,101,388 | 3/1992 | Fushimi | 369/36 |
| 5,107,474 | 4/1992 | Ishibashi et al. | 369/36 |
| 5,107,475 | 4/1992 | Serita et al. | 369/36 |
| 5,119,354 | 6/1992 | Umesaki | 369/36 |
| 5,123,000 | 6/1992 | Fitzgerald et al. | 369/36 |
| 5,123,001 | 6/1992 | Nakamichi et al. | 369/36 |
| 5,159,585 | 10/1992 | Ikedo et al. | 369/36 |
| 5,177,722 | 1/1993 | Nakamichi et al. | 369/36 |
| 5,206,845 | 4/1993 | Baxter et al. | 369/34 |
| 5,214,768 | 5/1993 | Martin et al. | 395/425 |
| 5,216,645 | 6/1993 | Sakayama | 369/36 |
| 5,226,025 | 7/1993 | Ikedo et al. | 369/36 |
| 5,228,016 | 7/1993 | Menke | 369/36 |
| 5,239,527 | 8/1993 | Sakiyama | 369/36 |
| 5,247,408 | 9/1993 | Osada et al. | 369/36 |
| 5,255,138 | 10/1993 | Serita et al. | 360/98.04 |
| 5,280,463 | 1/1994 | Okajima et al. | 369/36 |
| 5,289,589 | 2/1994 | Bingham et al. | 395/425 |
| 5,299,182 | 3/1994 | Sakiyama | 369/36 |
| 5,301,076 | 4/1994 | Kobayashi et al. | 360/98.06 |
| 5,303,214 | 4/1994 | Kulakowski | 369/34 |
| 5,341,350 | 8/1994 | Frank et al. | 369/30 |
| 5,353,269 | 10/1994 | Kobayashi et al. | 369/36 |
| 5,377,121 | 12/1994 | Dimitri et al. | 364/378 |
| 5,377,174 | 12/1994 | Nakagawa et al. | 369/34 |
| 5,384,760 | 1/1995 | Kumakura | 369/38 |
| 5,396,475 | 3/1995 | Nakagawa et al. | 369/36 |
| 5,666,337 | 9/1997 | Dang et al. | 369/36 |

DATA STORAGE DEVICE INCLUDING A TRANSPORT MECHANISM FOR MOVING DISK STORAGE MEDIA BETWEEN A PLURALITY OF REMOVABLE MAGAZINES AND A DISK DRIVE

BACKGROUND OF THE INVENTION

1. Field of the Invention

The present invention is in the field of electromechanical changers for compact digital read only memory (CD-ROM) disks, rewritable disks, and the like, stored in multiple-disk magazines.

2. Description of the Related Art

Previously, software and data for computers were delivered by floppy disks, and the software and data were transferred to a fixed (i.e., "hard") disk drive for rapid access to programs and data. In order to have access to a large number of different programs and large quantities of data associated with the programs, it was necessary to have a large hard drive. Regardless of the size of the chosen hard drive, many users found that the hard drive rapidly became full as the number of programs and the quantity of data increased.

Recently, a significant portion of software and data for computers have been delivered and stored on compact digital read only memory (CD-ROM) disks. The software and data can be transferred to a hard drive as before, or the software and data can be accessed on an as-needed basis from the CD-ROM disks. Often, a combination of accesses are used, wherein a frequently used executable portion of the software is stored on the hard drive and less-frequently accessed programs and data are accessed as needed directly from the CD-ROM disks.

Because of the current proliferation of software and data on CD-ROM disks, a typical user now finds that the user has a large number of software titles on multiple CD-ROM disks. Furthermore, databases comprising very large quantities of data may be published on large numbers of disks, such as, for example, the disks which encompass the images and text of issued patents, or the disks which encompass the West Publishing Federal Reporters, or the like. In order to make such extensive databases readily available to the user, it is necessary to install the CD-ROM disks on a multiple disk changer, also referred to as a CD jukebox. CD jukeboxes are known to the art, but they generally have been quite expensive, and are not readily adaptable to a database which exceeds the storage capability of the jukebox. In particular, when the number of CD-ROM disks exceeds the storage capacity (for example, 100 or 150 disks) of the jukebox, the user must then keep track of which disks are installed in the jukebox at any given time, and must swap the disks in and out of the jukebox as required. Furthermore, known CD-ROM jukeboxes use CD-ROM disk drives which are specially adapted to the jukebox. Thus, the drives are expensive compared to conventional CD-ROM disk drives which are sold in large quantities in a highly competitive market.

Thus, a need exists for an economical CD-ROM changer or jukebox which enables a user to keep track of the CD-ROM disks in the jukebox and which enables a user to quickly and easily swap disks in and out of the jukebox without having to handle individual disks each time. Further, there is a need for a CD-ROM jukebox which uses conventional commercially available CD-ROM disk drives which are economical to purchase and which are readily interchangeable in the event of drive failure or in the event that drives with increase performance are desired.

Although described herein with respect to CD-ROM disks, it should be understood that the present invention is equally applicable to rewritable optical storage disks, video disks, and the like.

SUMMARY OF THE INVENTION

The present invention is responsive to the needs of a user of multiple CD-ROM disks by providing a CD-ROM changer which holds a plurality of disks in each of a plurality of magazines. The magazines are easily inserted into and removed from the CD-ROM changer so that the library of CD-ROM disks in the changer at any given time can be readily modified. Each magazine has an identifying indicia on it which is readable by the CD-ROM changer and which is used to identify which magazines are presently resident in the CD-ROM changer as well as to recognize when a magazine has been changed. The CD-ROM disks are carried within each magazine on trays which slide in and out of the magazine when the disks are transported within the CD-ROM changer. An interlock mechanism on each magazine prevents the trays from moving when the magazine is not in the CD-ROM changer unless a release mechanism is activated by a user wanting to load or unload a disk. A transport mechanism within the CD-ROM changer extracts a tray from a magazine, removes a disk from the tray, inserts the empty tray back into the magazine, moves the disk to a disk drive and releases the disk to the drawer associated with the disk drive. Each disk drive is a conventional CD-ROM disk drive positioned within the CD-ROM changer such that when the drawer of the disk drive is opened, the drawer is positioned to receive or release a disk. Preferably, the CD-ROM changer has more than one drive (e.g., four in one particular embodiment). Each drive is operable independently of the other drives so that data are accessible from the disks in one or more drives while other disks are being loaded into and removed from other disk drives. Because the drives are conventional drives, they are readily available on an economic basis. Furthermore, as higher performance drives (e.g., higher speed and greater storage capabilities) and drives having added capability (e.g., writable drives, rewritable drives and drives having different formats) become available, the newer drives can be readily interchanged with originally installed drives. In the preferred embodiment, the control of the drives and the transfer of data from (and to in the case of writable drives) is controlled by a standard bus (e.g., a SCSI bus), such that conventional driver software can be used to access the data from the disks in the drives after the CD-ROM changer of the present invention has transported the correct disks to the drives.

One aspect of the present invention is a disk library which comprises an inner frame and a plurality of disk magazines removably secured within the inner frame. Each of the magazines includes a plurality of magazine trays which hold removable disks. The trays are selectively extendable from the magazines. The transport includes at least one disk drive removably secured within the inner frame. The disk drive includes at least one drive drawer which holds a removable disk. The drawer is selectively extendable from the disk drive. A disk transport mechanism transports disks to and from the trays and to and from the drawer. The transport mechanism comprises a vertical shaft. An elevator is slidably mounted to move up and down along the shaft. A tray picker is mounted to the elevator. The tray picker selectively pulls one of the trays from one of the magazines to extend the tray so that a disk in the tray has a predetermined alignment with respect to the elevator. A lifter is mounted to the elevator to raise a disk from and lower a disk to one of the trays or the drawer. The lifter retains a disk to move the retained disk from the tray to the drawer and from the drawer to the tray. An elevator motor is coupled to the elevator to move the elevator between a position proximate to one of the trays and a position proximate to the drawer.

The lifter comprises a base. A lifter motor is mounted to the base. A cam is coupled to the lifter motor. A chuck is slidably mounted to the base and is coupled to the cam. The chuck moves in response to operation of the lifter motor to move upward and downward with respect to the base. The chuck includes a plurality of extendable fingers which extend radially outward from the chuck and which are retractable into the chuck. The fingers are retracted to pass through a hole in the disk when the chuck is lowered, and the fingers are extended to contact the disk and raise the disk when the chuck is raised. A camming pin is slidably mounted within the chuck. The camming pin moves within the chuck to selectively extend and retract the fingers. A camming lever is coupled between the camming pin and the cam. The camming lever causes the camming pin to move up and down within the chuck independently of the movement of the chuck with respect to the base.

In preferred embodiments, the magazine comprises a top portion and a bottom portion. A frame is positioned between the top portion and the bottom portion. The frame comprises an inner portion having at least 20 slots wherein each slot is formed between a respective pair of guide rails. The magazine further includes at least 20 disk trays. Each tray is spaced apart by a center-to-center distance of approximately 0.1 inch such that the magazine has a vertical thickness between the top portion and the bottom portion of less than 2.5 inches. Preferably, each tray has projecting ears which permit the trays to be manually grasped. The trays are positioned in the magazine such that vertically adjacent trays have ears which are graspable from opposite sides to facilitate manual removal of one of the trays from the magazine without moving others of the trays.

In preferred embodiments, the tray picker includes an engagement tooth. At least one of the ears on each of the trays has a notch. The notches of all of the trays form an aligned channel for vertical movement of the engagement tooth of the tray picker therein. The engagement tooth further engages the notch of one of the trays when the tray picker operates to pull the tray from the magazine.

Also preferably, each of the trays has an opening formed therein. The openings of all of the trays are vertically aligned when all of the trays are secured within the magazines. The inner frame comprises a transmitter which transmits light through the aligned openings of the trays and a receiver which receives the light transmitted by the transmitter when the openings are aligned. The receiver provides an output signal that indicates that the openings are aligned, thereby indicating that all trays are secured in their respective magazines.

Preferably, the tray picker comprises two side rails disposed on opposite sides of the tray picker to guide a tray into the tray picker assembly and a biasing spring adjacent one of the side rails to push the tray against the opposite side rail to align a disk in the tray with respect to the lifter Preferably, the elevator includes at least one sensor positioned below the elevator and coupled to the elevator. The sensor generates an output signal which indicates the presence of an obstacle beneath the elevator. The sensor thereby indicates whether the drawer is extended from the disk drive.

Preferably, each of the trays comprises a circular shelf which supports a respective one of the disks therein. The trays are open in an area within a perimeter of the circular shelf. The inner frame further includes a sensor comprising a transmitter of light and a receiver of the light. One of the transmitter and the receiver is positioned above an uppermost one of the magazines and the other of the transmitter and the receiver is positioned below a lowermost of the magazines. The transmitter and the receiver are positioned with respect to the magazines to propagate light from the transmitter to the receiver at a predetermined distance from the magazine. The tray picker is operable to pull each of the trays from the magazines to partially extend each of the trays such that the light passes through a portion of the area within the perimeter of the circular shelf. The light is precluded from propagating to the receiver if a disk is present in the partially extended tray. The light propagates to the receiver if the tray is empty. The disk transport mechanism is thereby able to determine whether a disk is present in a tray without having to fully extend the tray.

Preferably, each magazine includes a bar code label to uniquely identify the magazine. The elevator includes a bar code reader positioned to scan the bar code label of the magazine as the elevator moves past the magazine.

Preferably, the disk drive comprises a commercially available disk drive. The disk transport mechanism further comprises a guide rail removably attached to the disk drive. The guide rail has dimensions selected for the disk drive to position the disk drive in the inner frame such that when the drawer is extended from the disk drive, a disk within the drawer has a center hole positioned in a predetermined location with respect to the elevator.

In particularly preferred embodiments, the disk library comprises five magazines. Each of the magazines has 20 trays for holding 20 disks therein. The disk library further comprises four drives. The disk transport is enclosed within a volume having dimensions of approximately the form factor of a conventional microprocessor-based computer tower. In particular, the dimensions of the enclosure are advantageously approximately 25 inches high by 18 inches deep by 8 inches wide.

Another aspect of the present invention is a disk lifter for a disk transport. The disk lifter comprises a base positionable over a disk in a tray or drawer below the base, wherein the disk has a center hole therein. A lifter motor is mounted to the base. A cam is coupled to the lifter motor. A chuck is slidably mounted to the base and is coupled to the cam. The chuck moves in response to operation of the lifter motor to move upward and downward with respect to the base. The chuck includes plurality of extendable fingers which extend radially outward from the chuck and which are retractable into the chuck. The fingers are retracted to pass through the center hole of the disk when the chuck is lowered. The fingers are extended to contact the disk and raise the disk when the chuck is raised. A camming pin is slidably mounted within the chuck. The camming pin moves within the chuck to selectively extend and retract the fingers. A camming lever is coupled between the camming pin and the cam. The camming lever causes the camming pin to move up and down within the chuck independently of the movement of the chuck with respect to the base.

Preferably, the chuck is supported by a vertical panel. The vertical panel supports a pair of spaced apart horizontal rails. The cam comprises an arcuate portion and a detented portion, and further comprises a pin mounted to the arcuate portion to rotate with the cam. The pin is positioned between the horizontal rails to cause the panel and thereby the chuck to reciprocate vertically when the cam is rotated by the lifter motor. The camming lever preferably includes a vertical leg and a horizontal leg. The lever pivots upon the panel at the intersection of the vertical and horizontal leg. A spring biases the lever so that the vertical leg is reciprocally moved by the arcuate and detented portions of the cam. The horizontal leg operates on the camming pin in response to reciprocation of the vertical leg to cause the camming pin to reciprocate vertically within the chuck. Preferably, each of the fingers in the chuck comprises an angled upper portion, a vertical lower portion and a generally horizontal hook portion. The hook portion extends radially outward from the chuck. The camming pin slidably engages each finger to cause the finger to retract into the chuck when the pin engages the angled upper portion and to cause the finger to extend radially outward when the pin engages the lower portion. Preferably, the lifter motor is selectively operable in a first rotational direction and a second rotational direction. The lifter motor operates in the first rotational direction to cause the chuck to move downward with the fingers retracted to pass through the hole in the disk on the tray or the drawer. The fingers extend after passing through the hole such that when the chuck reciprocates upward with continued rotation of the lifter motor in the first rotational direction, the disk is lifted by the extended fingers. The lifter motor operates in the second rotational direction to cause the chuck to move downward with the fingers extended to thereby support a disk thereon. The fingers remain extended until the disk has reached the tray or the drawer. The fingers then retract such that when the chuck reciprocates upward with continue rotation of the lifter motor in the second rotational direction, the fingers pass through the hole in the disk without lifting the disk. Preferably, the lifter includes a disk present sensor mounted proximate to the chuck to detect the presence of a disk supported by the fingers.

Another aspect of the present invention is a disk magazine for a disk transport. The magazine comprises a top portion and a bottom portion. A frame is positioned between the top portion and the bottom portion. The frame comprises an inner portion having at least 20 slots. Each slot is formed between a respective pair of guide rails. The magazine preferably includes at least 20 disk trays. Each tray is spaced apart by a center-to-center distance of approximately 0.1 inch such that the magazine has a vertical thickness between the top portion and the bottom portion of less than 2.5 inches. Each disk tray has an opening formed therein for receiving and supporting a respective disk therein. Preferably, each tray has projecting ears which permit the trays to be manually grasped. The trays are positioned in the magazine such that vertically adjacent trays have ears which are graspable from opposite sides to facilitate manual removal of one of the trays from the magazine without moving others of the trays. In preferred embodiments, each tray includes a hook extending from an edge thereof. The magazine includes a spring-biased latch positioned proximate the midpoint of a side of the magazine. The latch includes an actuator portion and a hook portion. The hooks of the trays engage the hook portion of the latch upon extension of the trays unless the actuator portion of the latch is actuated by insertion of the magazine in the inner frame. The latch thereby prevents full extension of the trays unless the magazine is in the inner frame.

Also preferably, each of the trays includes a latch catch proximate to an edge of the tray. The magazine includes a latch pivotally mounted thereto for engaging the latch catches to prevent trays from accidentally falling out of the magazine unless the latch is manually actuated or automatically actuated by inserting the magazine into the frame.

In particularly preferred embodiments, each tray includes a spring catch proximate to a rear portion of the tray. The magazine includes a spring-biased latch proximate to a rear portion of the magazine. The latch engages the spring catch upon full insertion of the tray within the magazine to bias the tray toward the rear portion of the magazine. The latch releases the tray when sufficient force is applied manually or by a tray picker to pull the tray from the magazine.

Preferably, each tray includes an ear having a notch formed therein. The notches from all trays are vertically aligned to form a channel for a tray picker having an engagement tooth. As the elevator moves, the tray picker tooth moves in a vertical direction within the channel. When the elevator has stopped, the tray picker tooth engages the notch of one of the trays and moves in a horizontal direction to pull the tray from the magazine.

BRIEF DESCRIPTION OF THE DRAWINGS

The present invention will be described below in connection with the accompanying drawing figures in which.

DETAILED DESCRIPTION OF THE PREFERRED EMBODIMENT

Figure 1A:
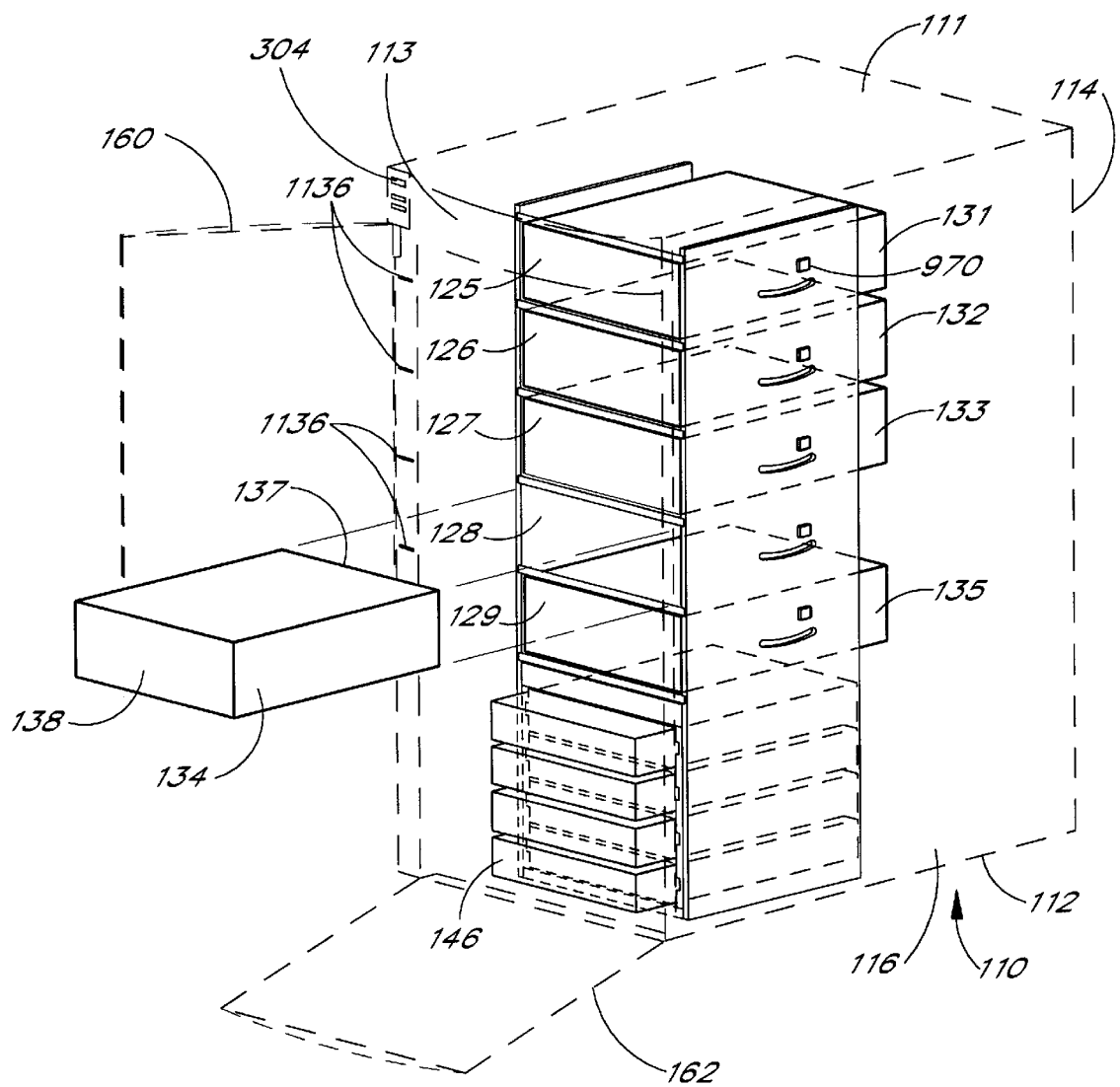
FIGS. 1A and 1B are perspective views of the disk changer of the present invention with an outer enclosure shown in phantom to better illustrate the inner assemblies.
Figure 1B:
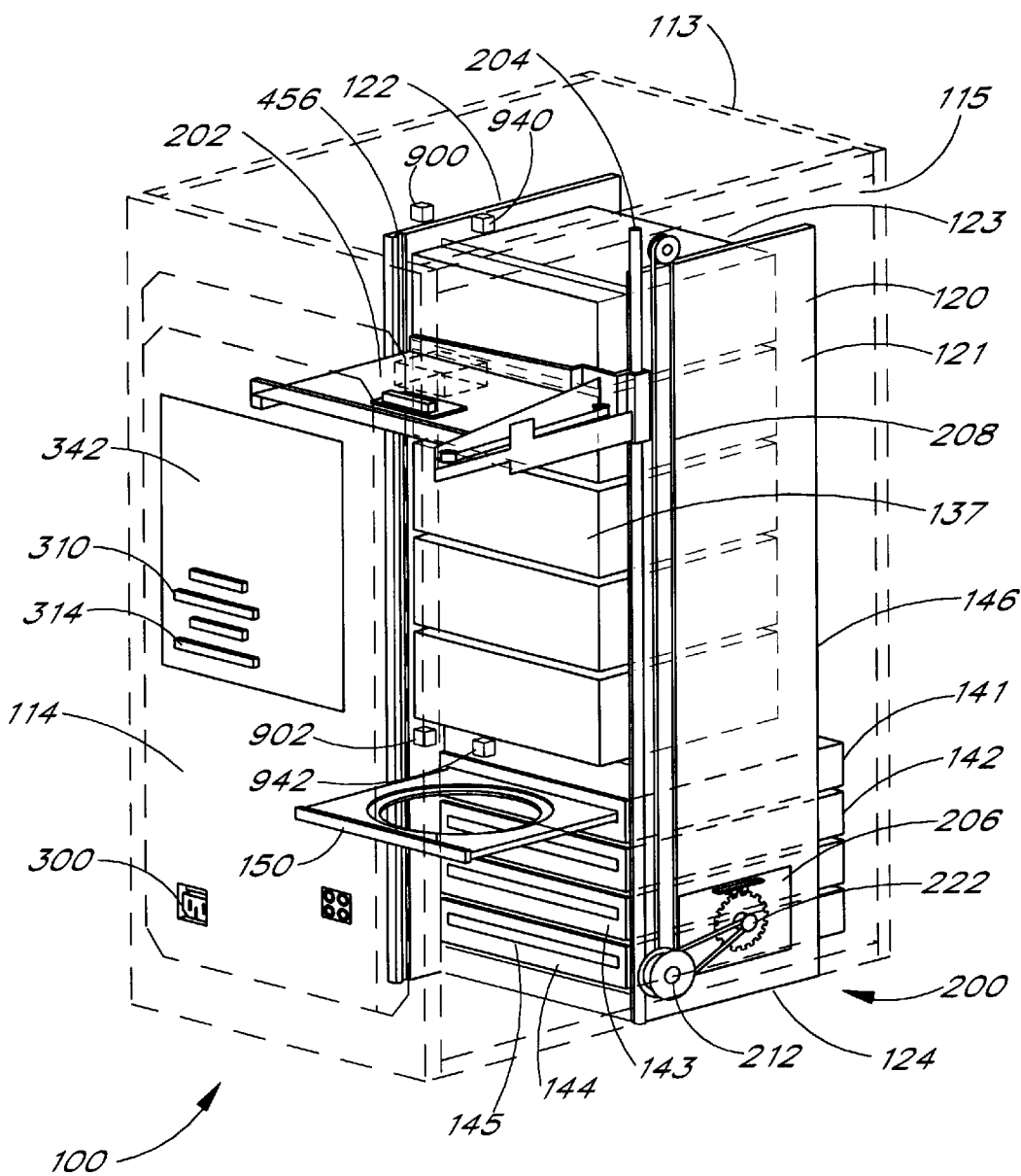
Figure 2A:
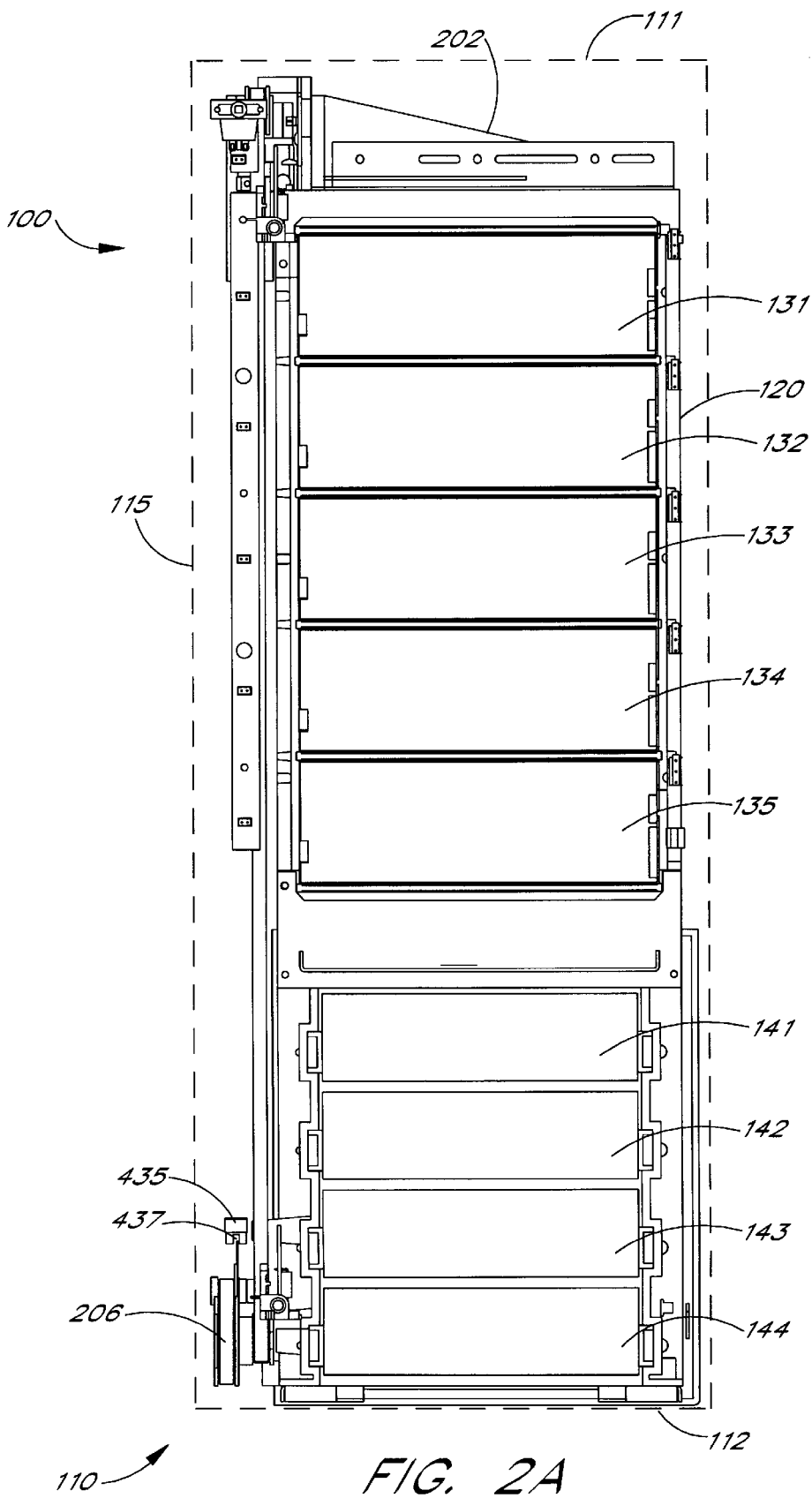
FIGS. 2A, 2B and 2C are front, right and left views, respectively, of the tower of the present invention.
Figure 2B:
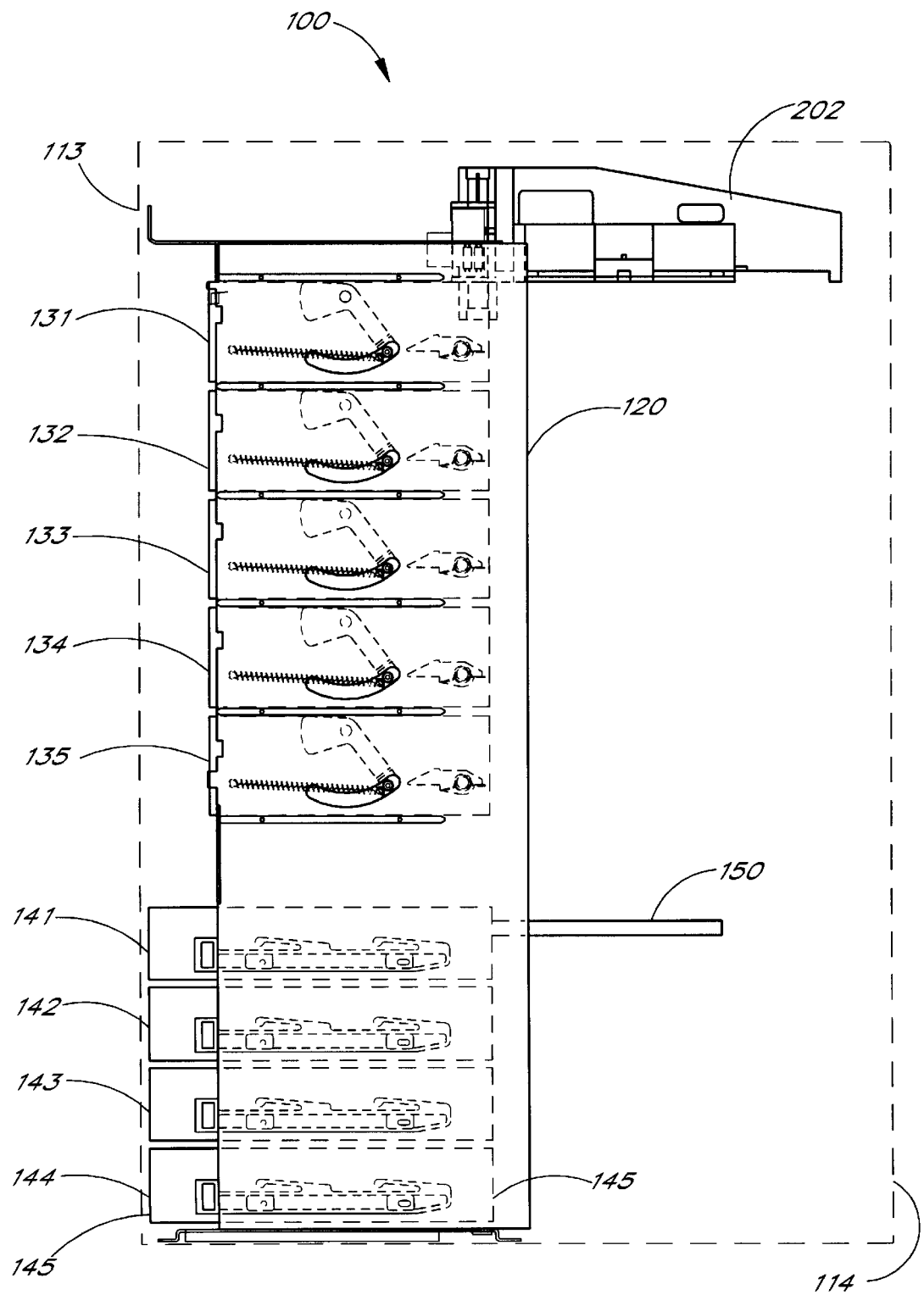
Figure 2C:
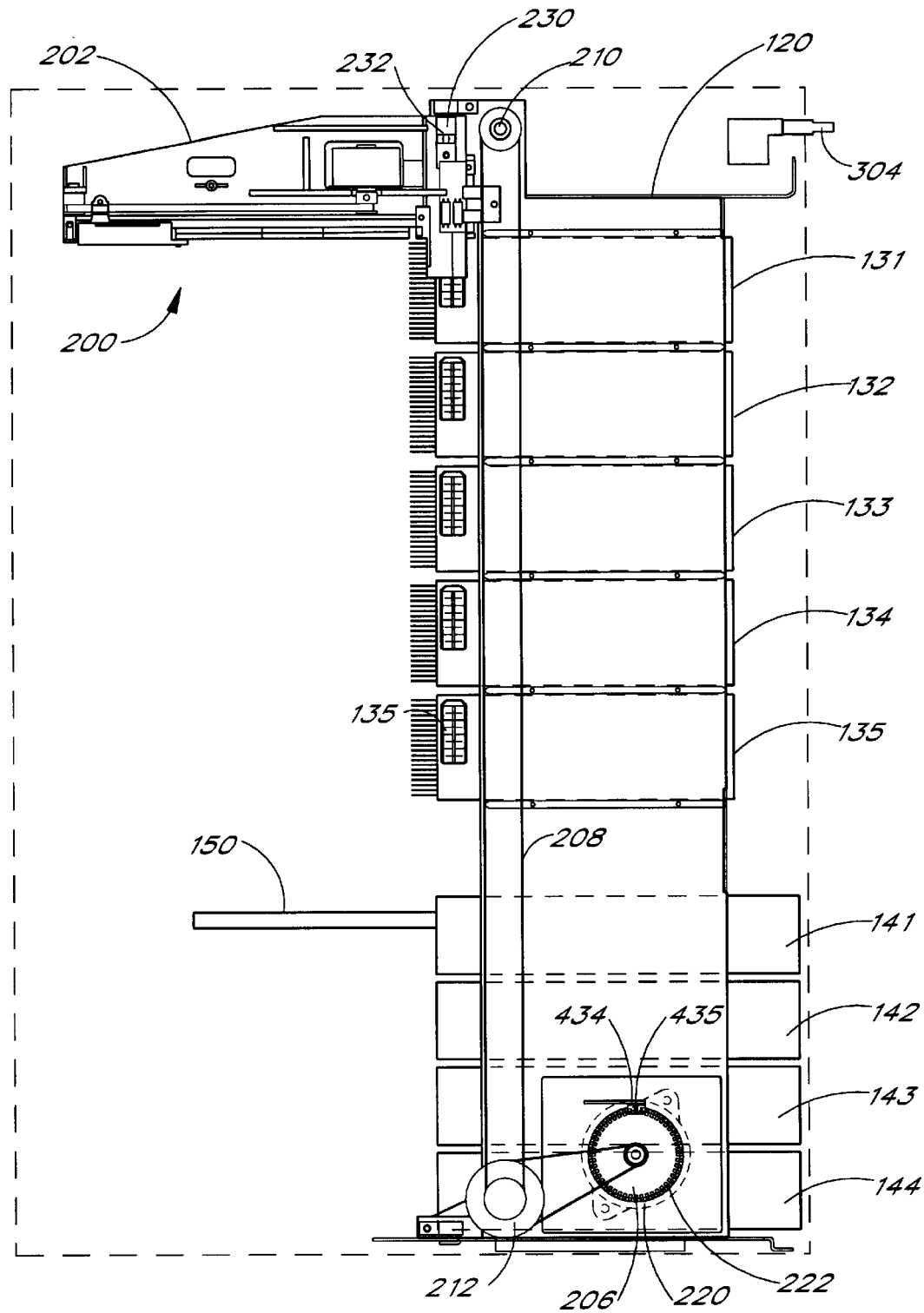
Figure 3A:
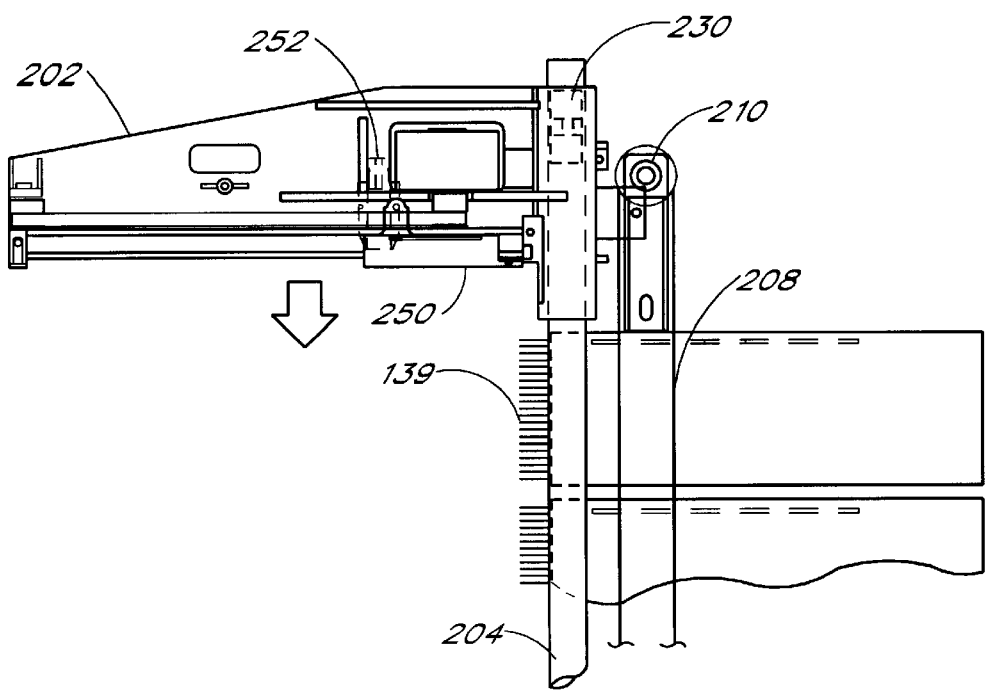
FIGS. 3A–3G are partially enlarged views of the disk transport mechanism shown in FIG. 2C, illustrating the elevator moving from a home position, picking a magazine tray, lifting a disk from the tray, pushing in the magazine tray, lowering to an open disk drive tray, dropping the disk into the disk drive drawer, and returning to the home position.
Figure 3A:
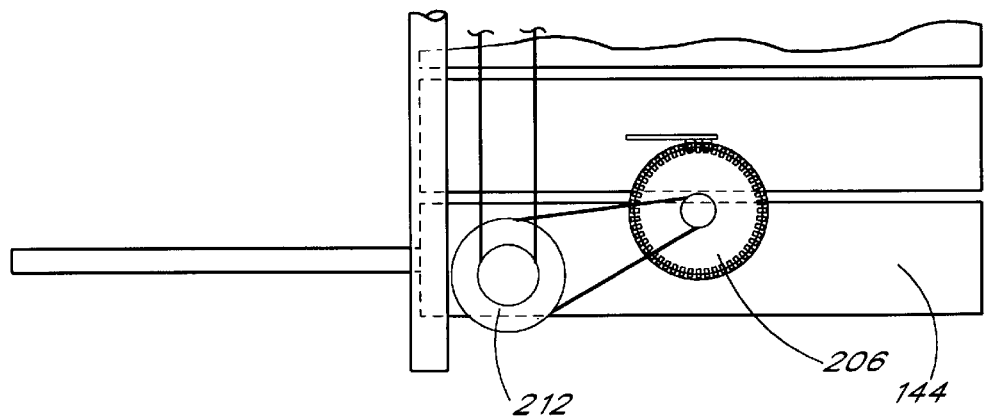
Figure 3B:
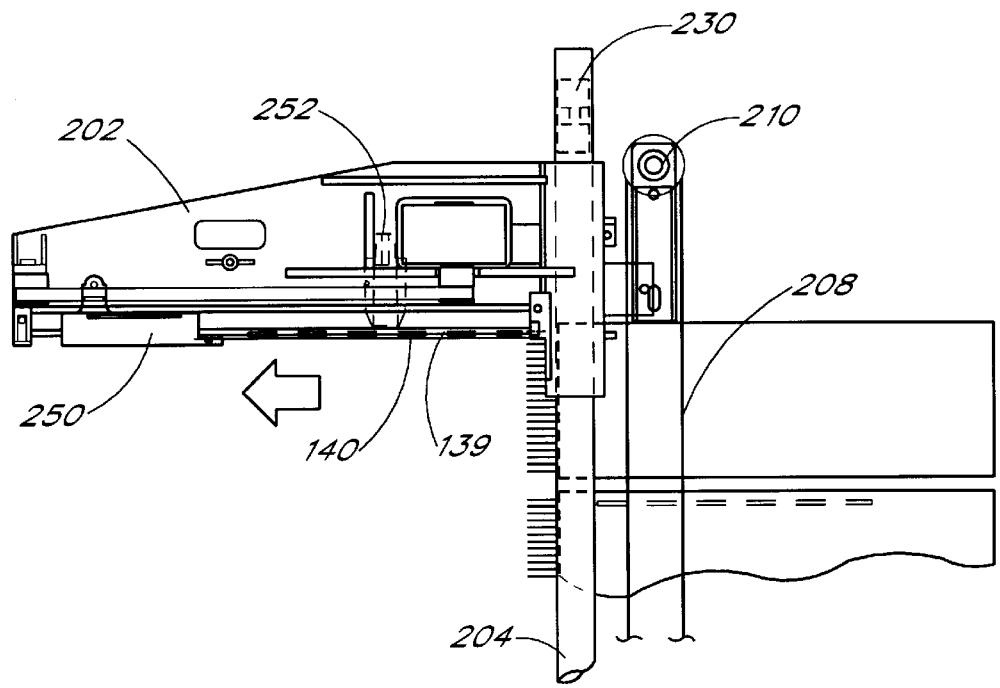
Figure 3B:
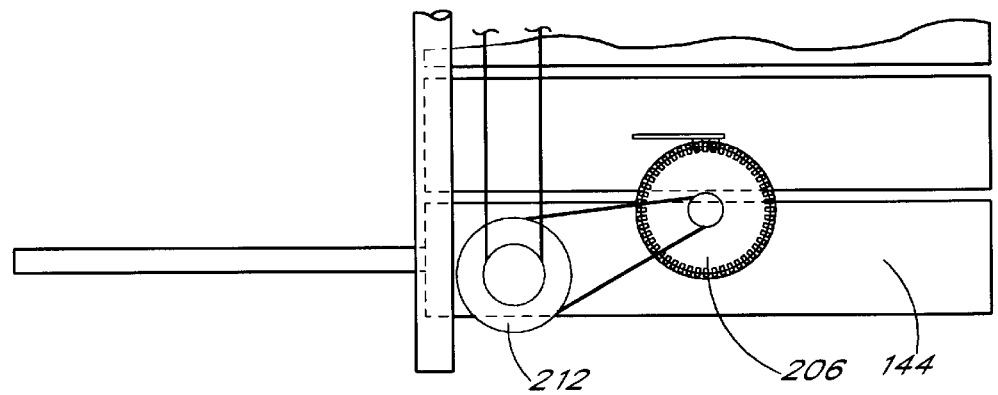
Figure 3C:
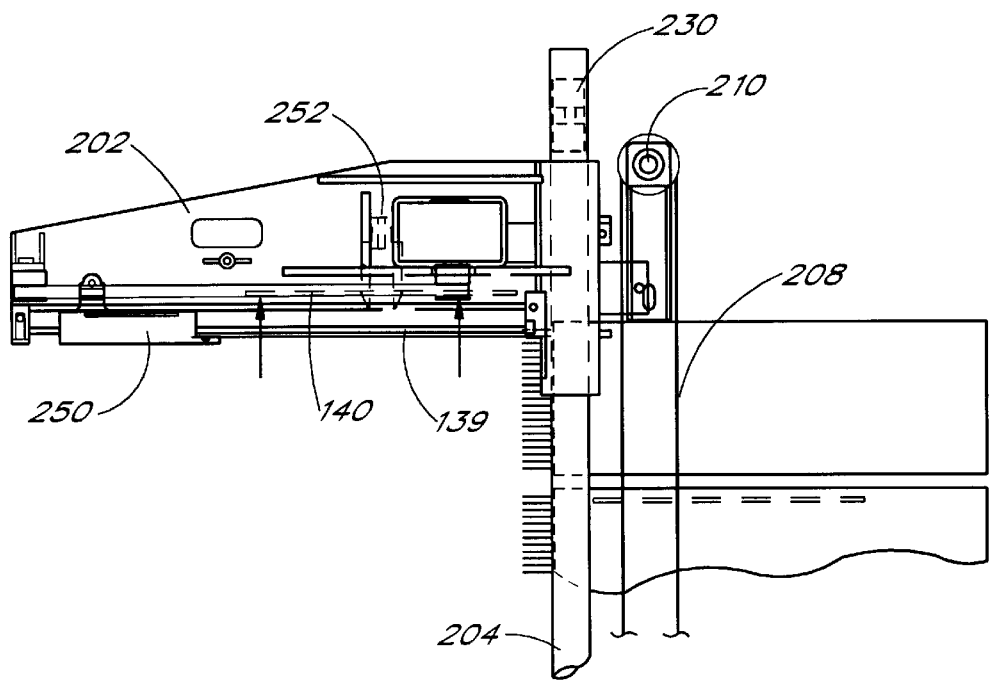
Figure 3C:
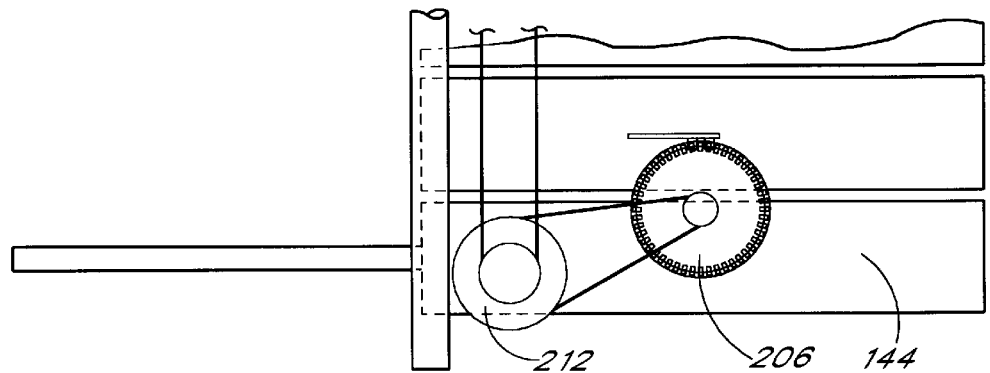
Figure 3D:
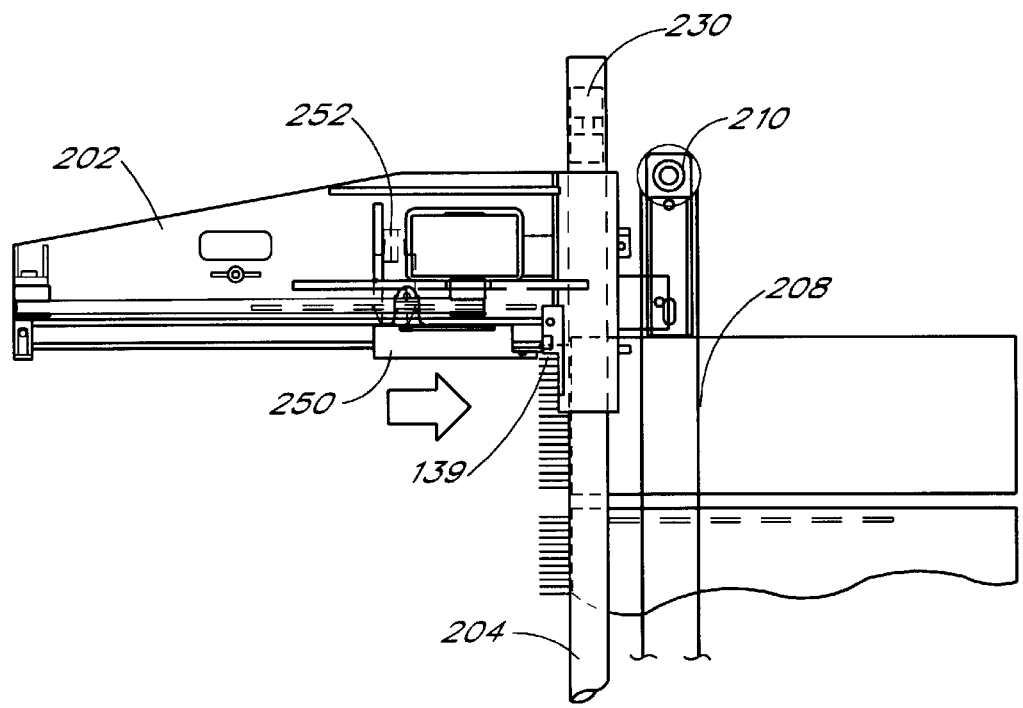
Figure 3D:
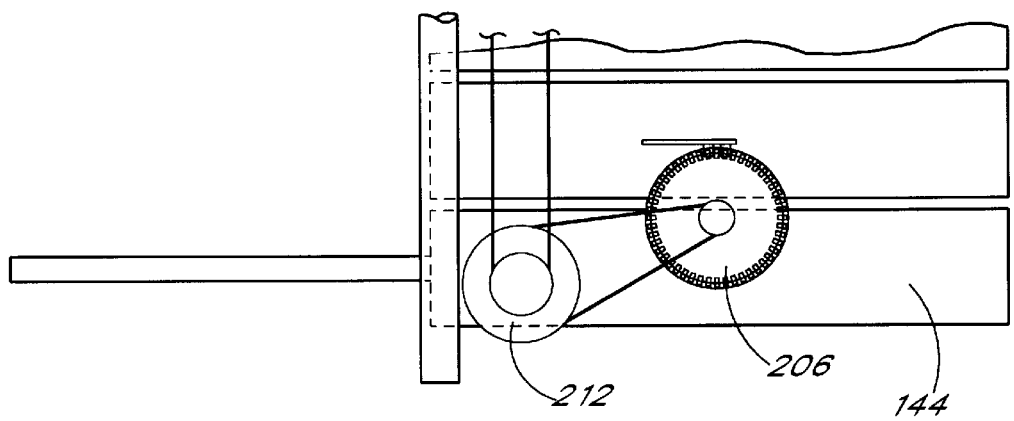
Figure 3E:
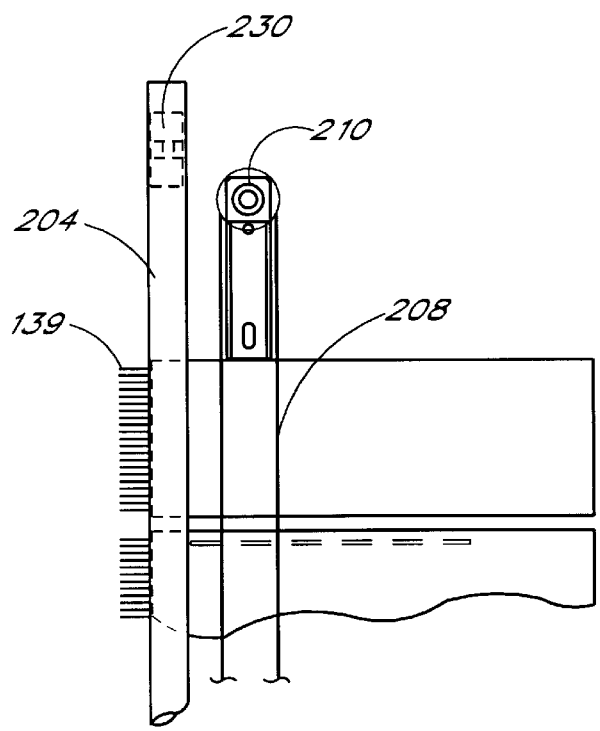
Figure 3E:
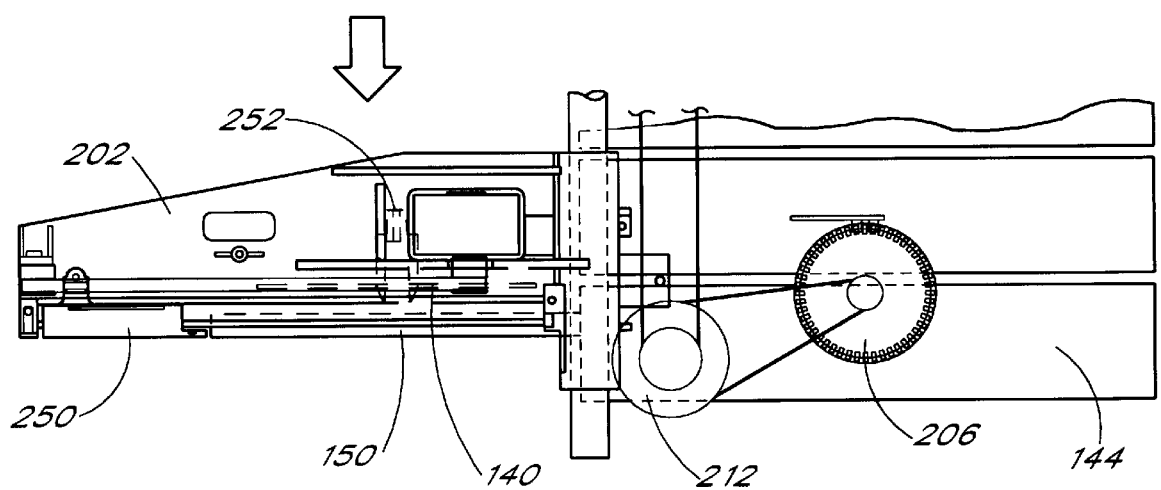
Figure 3F:
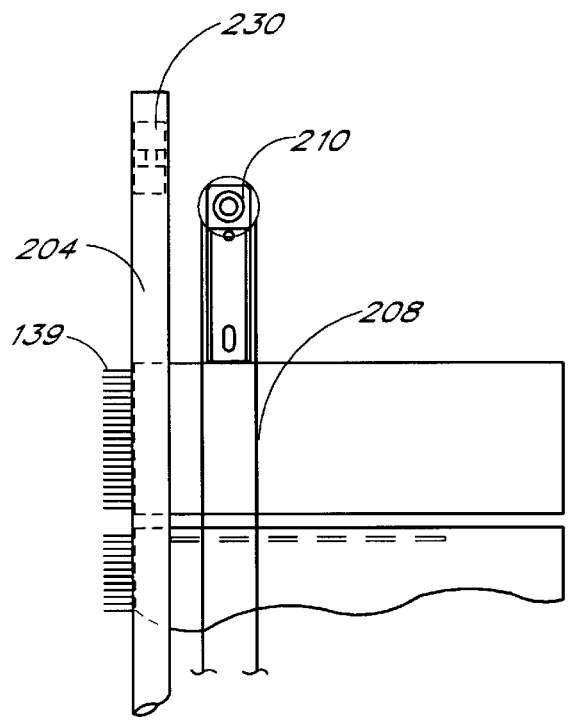
Figure 3F:
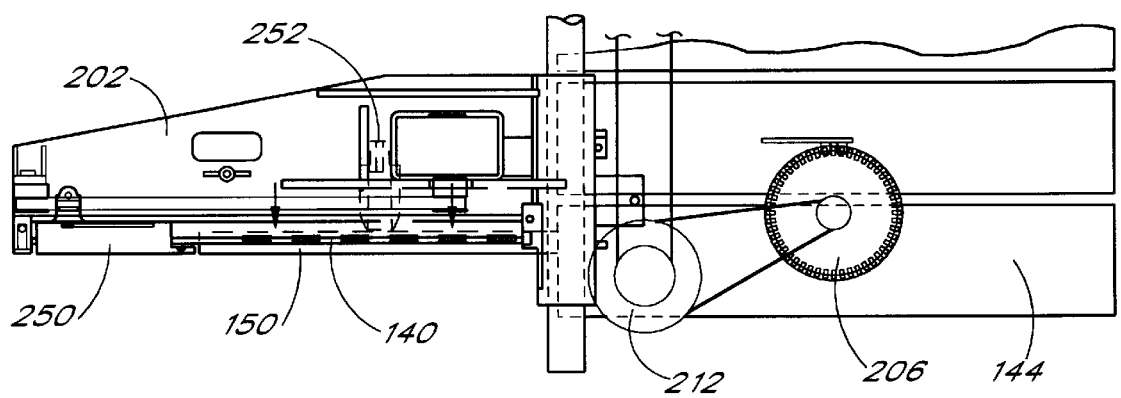
Figure 3G:
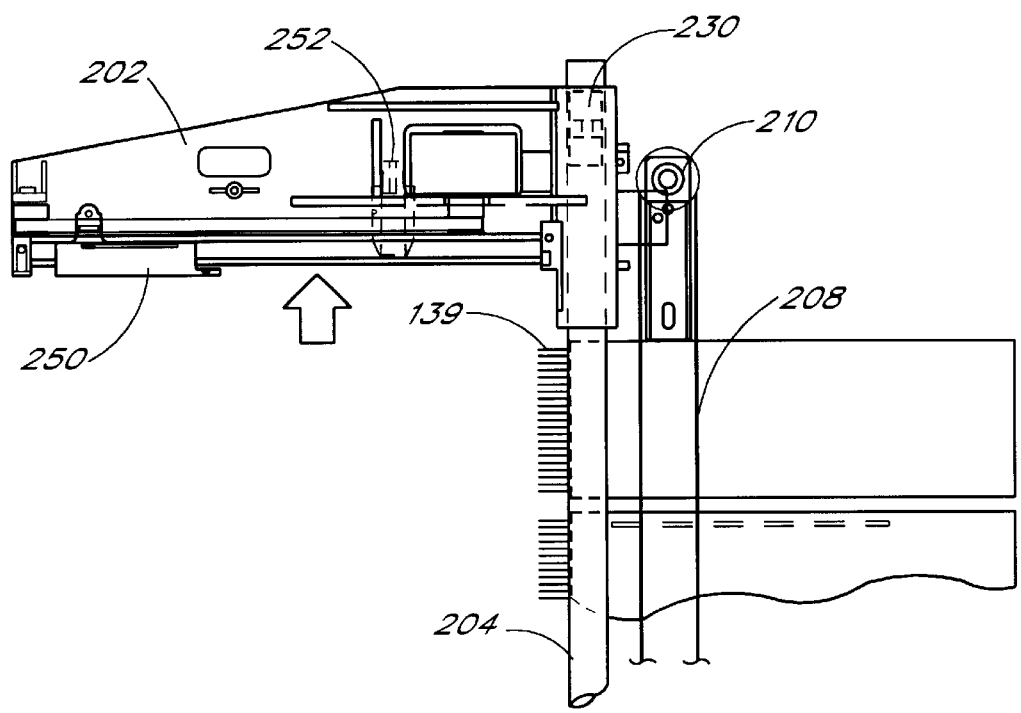
Figure 3G:
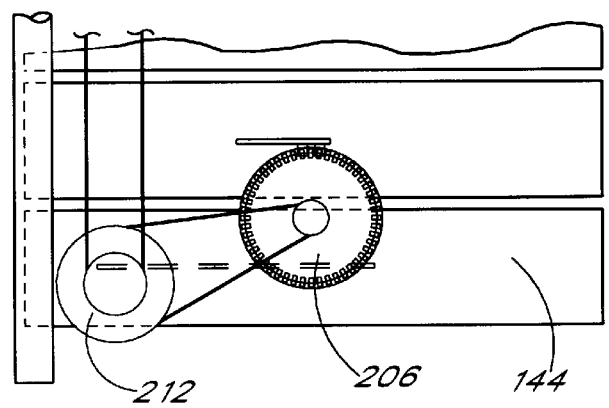

FIGS. 1A and 1B are perspective views of the present invention, and FIGS. 2A, 2B and 2C are front, left and right side views, respectively, of the present invention. As illustrated in FIGS. 1A, 1B, 2A, 2B and 2C, the changer 100 comprises a "tower" enclosure 110 having a top 111, a bottom 112, a front 113, a rear 114, a left side 115 and a right side 116. One skilled in the art will appreciate that when the changer 100 is in operation, the left and right sides 115, 116 will be covered with a skin (not shown) of steel or other suitable material. The sides 115, 116 are shown as being open in FIGS. 1 and 2 to expose the assemblies therein for illustrative purposes.

The enclosure 110 further includes an inner frame 120 comprising a left side portion 121, a right side portion 122, a top 123 and a bottom 124. The inner frame 120 further comprises five magazine slots 125, 126, 127, 128, 129 which are open toward the front 113 and rear 114 of the enclosure 110. A plurality (e.g., 5) of disk magazines 131, 132, 133, 134, 135 are stacked vertically with respect to each other in the slots 125–129 proximate to the front 113 of the enclosure 110. The magazines 131–135 are easily inserted and removed by sliding the magazines 131–135 from the slots 125–129 via the front 113 of the enclosure 110. More details regarding the insertion and removal of the magazines 131–135 will be provided below.

Each magazine 131–135 has a respective front portion 137 and a respective rear portion 138. (For convenience, numerical identifiers have been applied to only the front portion 137 and the rear portion 138 of one of uppermost magazines 131–135.) The magazines 131–135 are mounted in the enclosure 110 such that the rear portions 138 face in the same direction as the front 113 of the enclosure 110 and such that the front portions 137 are within the enclosure 110.

As will be described in more detail below in connection with FIG. 12B, each of the magazines 131–135 has reference rails which engage corresponding reference rails in the slots 125–129 to hold the magazines in fixed, precise relationship with respect to the slots. As will be further described below in connection with FIG. 12B, the magazine rails are biased against the slot rails to assure that the engagement is uniform each time a magazine is inserted in a slot.

Each magazine 131–135 holds a plurality (e.g., 20) of magazine trays 139 which slide into and out of the magazines. Each tray 139 holds a respective disk 140, which, as will be described in detail below, is removed from the tray 139 and transported to a disk drive to be accessed therein.

As further illustrated in FIGS. 1 and 2, the enclosure 110 includes a plurality (e.g., 4) of CD-ROM disk drives 141, 142, 143, 144 which are positioned in a stacked relationship beneath the disk magazines 131–135. (Although described herein as CD-ROM disk drives, it should be understood that other disk drives, such as writable disk drives, rewritable disk drives, and the like, can be used in combination with the present invention.)

Each disk drive 141–144 has a respective front portion 145 and a respective rear portion 146. (For convenience, numeric identifiers are applied to only the front portion 145 and the rear portion 146 of one of the disk drives 141–144.) As illustrated, the disk drives 141–144 are mounted in the enclosure 110 such that the rear portions 146 face in the same direction as the front 113 of the enclosure 110 and such that the front portions 145 are within the enclosure 110. The drives 141–144 are biased by spring-like fingers, described below in connection with FIG. 23, to precisely position each drive in the enclosure 120.

The front portion of each disk drive 141–144 includes a drawer 150 which opens to receive a disk 140 from one of the magazines 131–135, and which closes so that the disk 140 is positioned within the disk drive to enable data to be transferred from the disk 140. The drives 141–144 operate in a conventional manner, and the operation will not be described in detail herein. Briefly, the drives 141–144 receive signals via a conventional bus, which in the preferred embodiment described herein, is a Small Computer System Interface (SCSI) bus. Each drive 141–144 is responsive to the signals to open its drawer 150, to close its drawer 150, and to transfer data from the disk 140 to the SCSI bus from storage locations determined by request signals sent via the bus. In the case of writable media and a read/write drive, data can be transferred over the SCSI bus to the disk 140 in the drive 141–144.

A door 160 is hinged to the front 113 of the enclosure 110 proximate to the left side 120. The door 160 is sized to provide access to the magazines 131–135. An access panel 162 is also hinged to the front 113 proximate to the bottom front edge. The access panel 162 is sized to provide access to the drives 141–144. The separate door 160 and access panel 162 are provided for the magazines and the drives because the magazines will be frequently accessed while it is unlikely that a user will need to access the drives on a regular basis. Preferably, the door 160 is key-operated in a conventional manner to restrict access to the magazines 131–135, while the access panel 162 can only be removed from inside the door 160 using a special tool, thereby limiting access to the drives 141–144. Also preferably, a microswitch (not shown) or other detection device is provided for the door 160 to indicate to the electronics (described below) that the door is open. Preferably, the door 160 is provided with a dashpot (not shown) or other impeding mechanism to restrict the speed at which the door 160 can be opened by the user. By providing a mechanical delay of approximately two seconds, the electronics (described below) are able to detect that the door has been opened and complete any disk transport operation before the user has opened the door sufficiently far to be able to remove a magazine 131–135. Indicating LEDs 1136 flash to warn the user not to extract a magazine prematurely.

The enclosure 110 further includes a transport mechanism 200 which comprises an elevator 202 which moves vertically upward and downward on a shaft 204. Force to move the elevator 202 is provided by a motor assembly 206 via a belt 208 and a belt 424. The belt 208 is a toothed belt which operates over an upper toothed pulley 210 and a lower toothed pulley 212. The elevator 202 is secured to the belt 208 to move with the belt 208. The lower toothed pulley 212 is powered by the motor assembly 206. As will be discussed in more detail below, the motor assembly 206 comprises a stepper motor 220 and a tachometer 222. The tachometer 222 enables the electronics (discussed below) to operate the transport mechanism 200 as a closed loop system to thereby control the position of the elevator 202 to true stopping position accurate to ±0 steps of the stepper motor 220. A home position sensor 230 is mounted proximate to the top of the shaft 204 to detect when the elevator 202 is at the uppermost travel position (i.e., home position) of the elevator 202. The home position sensor comprises an internal infrared light transmitter (not shown) and an internal infrared light receiver (not shown). A vane 231 mounted to the elevator 202 enters a slot 232 in the sensor 230 and interrupts the light between the transmitter and receiver when the elevator 202 is at the home position. The home position sensor 230 generates a signal on a line 233 (see FIG. 23C) in response to the interruption of the light.

As discussed below, the operation of the transport mechanism 200 is controlled with respect to the home position. The magazines 131–135 and the drives 141–144 are accurately located within the enclosure with respect to the home position by the rail and spring arrangement to be described below such that the elevator 202 can be stepped to a precise location with respect to a particular tray 139 in a particular magazine 131–135 or with respect to a drawer 150 in a particular drive 141–144.

As illustrated in FIGS. 3A–3G, the elevator 202 supports a tray picker assembly 250 and a disk lifter assembly 252. As will be discussed in more detail below, the tray picker assembly 250 engages the magazine tray 139 with which it is aligned and withdraws the tray 139 out of the respective magazine 131–135 in a horizontal plane to position the disk 140 in the tray 139 with the center hole of the disk 140 positioned beneath the disk lifter assembly 252. (See FIG. 3A.) The disk lifter assembly 252 lifts the disk 140 from the tray 139. (See FIG. 3B.) The tray picker assembly 250 then pushes the tray 139 back into the magazine from which it was withdrawn so that the tray 139 does not impede the vertical movement of the elevator 202. (See FIG. 3C.) After the tray 139 is reinserted into the magazine 131–135, the elevator 202 is moved downward along the shaft 204 until the elevator is positioned above a drawer 150 extending from one of the disk drives 141–144. (See FIG. 3D.) The lifter assembly releases the disk 140 into the drawer 150. (See FIG. 3E.) The drawer 150 is then retracted into the disk drive 141–144 so that the disk 140 is in its operating position. (See FIG. 3F.) Note that the extension and retraction of the drawer 150 of the disk drive 141–144 is controlled by signals sent to the disk drive 141–144 via the SCSI bus, and the elevator 202 does not control the movement of the drawer 150.

As further illustrated in FIGS. 1 and 2, the rear 114 of the enclosure 110 includes a conventional recessed power plug 300 which receives a socket (not shown) on a conventional power cable (not shown) which plugs into a conventional AC outlet to provide AC electrical power to the enclosure 110 and the components therein. The front 113 also supports a conventional on/off switch 304 for controlling the power applied to the changer 100.

Figure 4:
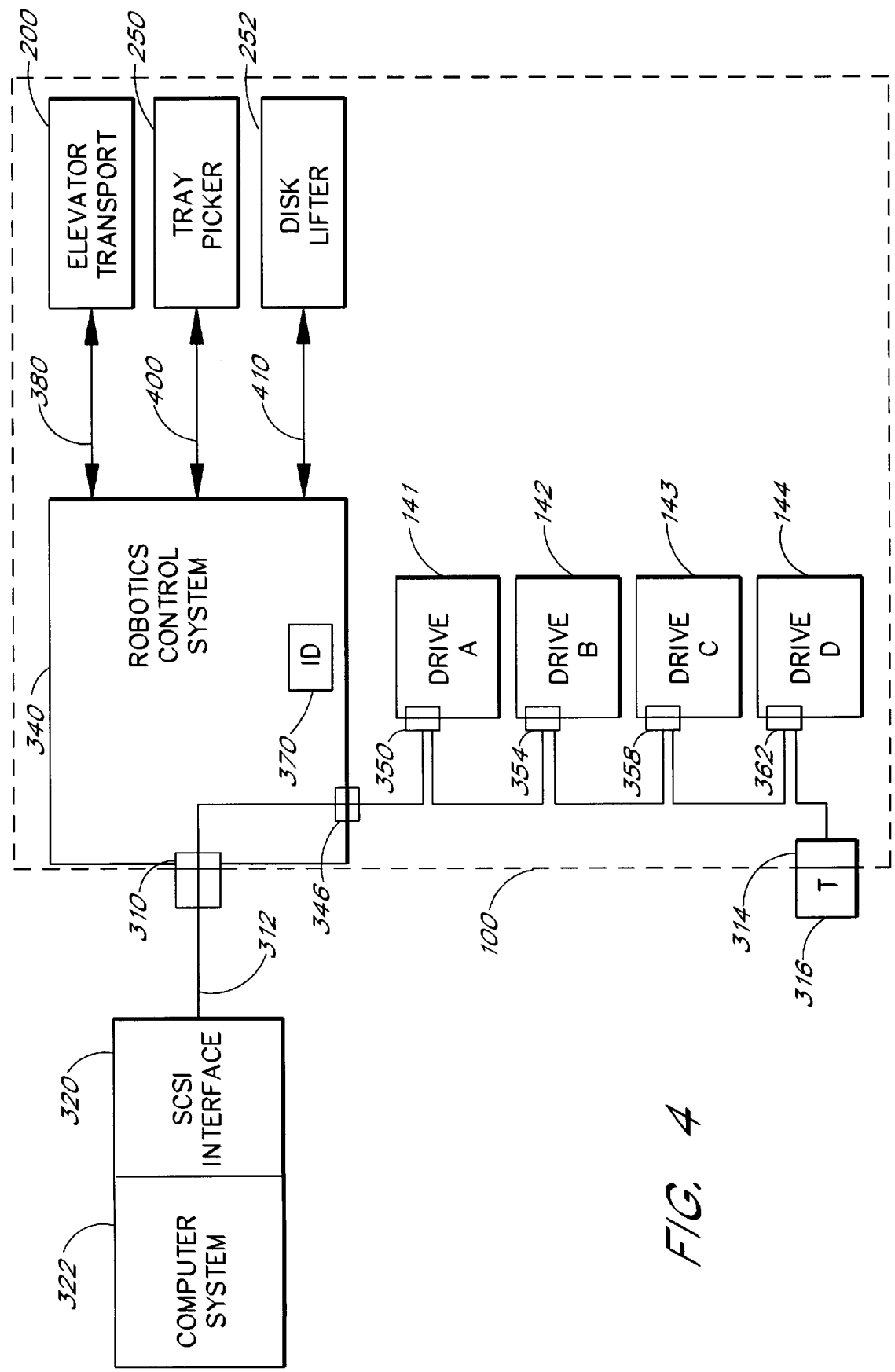
FIG. 4 illustrates a block diagram of the electrical interconnections between the principal components of the present invention.

The rear 114 further supports a conventional SCSI bus input connector 310 which receives a connector (not shown) from a conventional SCSI bus cable 312 (FIG. 4), and a conventional SCSI bus output connector 314 which receives a connector (not shown) from a conventional SCSI bus cable (not shown) or from a SCSI bus terminator 316 (FIG. 4). The SCSI bus cable 312 interconnects the electronic components within the enclosure 110 to a SCSI interface 320 (FIG. 4) of a computer system 322 (FIG. 4), a computer network or another digital electronic system which controls the changer 100 and receives the data transferred therefrom.

FIG. 4 is a schematic illustration of the electrical interconnections between the principal components of the changer 100 when connected to the SCSI interface 320 of the computer system 322. The computer system 322 is a conventional computer system which includes software drivers which control the SCSI interface 320 to cause the SCSI interface 320 to transmit control and data signals on the SCSI bus cable 312 and to receive control and data signals from the SCSI bus cable 312. The operation of the computer system 322 and the SCSI bus interface 320 with respect to the transmission and reception of control and data signals is well known and will not be described in detail herein other than to describe particular sequences of signals which control the present invention.

The SCSI bus cable 312 communicates the SCSI control and data signals between the SCSI interface 320 and the SCSI bus input connector 310 on the changer 100. The connector 310 is electrically connected internally to a robotics control system 340 (FIG. 4) which is implemented by components on a printed circuit board 342 (FIG. 1A) which is preferably mounted to the rear 114. The robotics control system 340 has an output connector 346 which is electrically connected in a known manner to a conventional SCSI input/output connector 350 on the first disk drive (DRIVE A) 141, to a SCSI input/output connector 354 on the second disk drive (DRIVE B) 142, to a SCSI input/output connector 358 on the third disk drive (DRIVE C) 143, to a SCSI input/output connector 362 on the fourth disk drive (DRIVE D) 144, and to the SCSI output connector 314 on the rear 114, and thus to the SCSI terminator 316. One skilled in the art will appreciate that further SCSI devices (not shown) can be connected to the SCSI bus by replacing the SCSI terminator 316 with a cable (not shown) to such further SCSI devices. Furthermore, such further SCSI devices can be connected between the SCSI interface 320 and the changer 100, if desired.

The robotics control system 340 has a conventional SCSI identification (ID) selector 370 for selecting the SCSI address to which the robotics control system 340. Similarly, each of the drives 141–144 has a respective ID selector (not shown) for selecting the SCSI address to which each drive 141–144 responds. It should be understood from FIG. 4, that the drives 141–144 are not controlled by the robotics control system 340. Rather, the drives 141–144 transfer control and data signals to and from the SCSI interface 320 in a conventional manner. The functional operation of each of the disk drives 141–144 is not affected by the robotics control system 340, and the disk drives 141–144 therefore operate in conventional manner. The present invention is directed to the manner in which disks 140 are mechanically loaded into and removed from each drive 141–144. In particular, the drives 141–144 are advantageously vendor standard equipment available from a number of sources which are not modified in any manner other than to remove the front bezels and drawer facia therefrom. This feature is very advantageous because the drives 141–144 are readily available at competitive prices and can be easily replaced in the event of failure or if upgraded capabilities are desired.

As further illustrated in FIG. 4, the robotics control system 340 is electrically connected to the elevator transport mechanism 200 via a set of lines 380 (A–F). In particular, and as described in more detail below, the robotics control system 340 generates stepping signals to the stepper motor 220 via the lines 380 to cause the elevator 202 to be moved up and down along the shaft 204. The robotics control system 340 receives feedback signals from the tachometer 222 and the home position sensor 230 via the lines 380 to keep track of the position of the elevator 202 in order to control the stepping of the motor 220.

The robotics control system 340 is also electrically connected to the tray picker assembly 250 via a set of lines 400 (A–F), In particular, and as described in more detail below, the robotics control system 340 generates signals to the tray picker assembly 250 via the lines 400 to cause the tray picker assembly 250 to extract a tray 139 from a magazine and to position the tray 139 beneath the disk lifter assembly 252. The robotics control system further generates signals to the tray picker assembly 250 via the lines 400 to cause the tray picker assembly 250 to reinsert the tray 139 into its magazine. The robotics control system 340 receives feedback signals from sensors on the tray picker assembly 250 via the lines 400 to indicate the current position of a tray 139 being moved by the tray picker assembly 250. Other signals received from other sensors (described below) associated with the tray picker assembly 250 indicate the presence of obstacles to the movement of the elevator 202 on which the tray picker assembly is mounted.

The robotics control system 340 is also electrically connected to the disk lifter assembly 252 via a set of lines 410. The robotics control system 340 generates signals on the lines 410 to cause the disk lifter assembly 252 to operate in a first manner to lift a disk 140 from a magazine tray 139 or a drive drawer 150 positioned beneath the disk lifter assembly 252. The robotics control system 340 further generates signals on the lines 410 to cause the disk lifter assembly 252 to operate in a second manner to lower a disk 140 onto a magazine tray 139 or a drive drawer 150 and to release the disk 140. The robotics control system 340 receives a feedback signal from the disk lifter assembly 252 via the lines 410 to indicate when a disk 140 is being held by the disk lifter assembly 252 after being lifted from a magazine tray 139 or a drive drawer 150. The robotics control system 340 also receives a feedback signal from the disk lifter assembly 252 to indicate when the disk lifter assembly 252 is in its uppermost (i.e., raised position).

Although not shown in FIG. 4, a hard disk drive may advantageously be connected to the SCSI bus in preferred embodiments. By incorporating a hard disk drive into the system, frequently accessed programs or data may be transferred from one or more CD-ROMs or other optical disks so that the information can be accessed without requiring movement of a disk from a magazine tray to a drive drawer. This reduces the access time for the frequently used data and also makes all four drives available for less frequently used data.

Figure 5A:
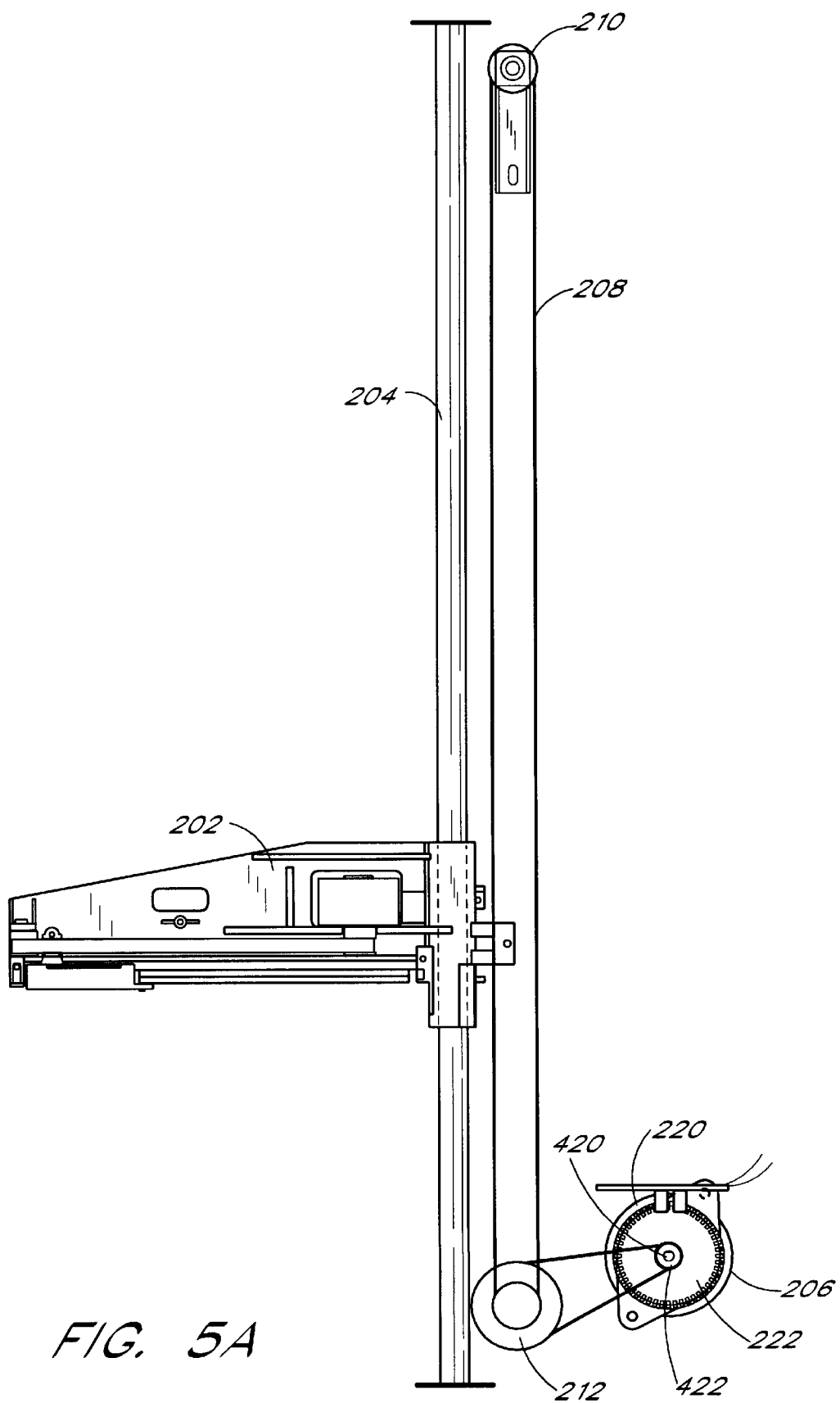
FIGS. 5A–5C are a left view, an enlarged view, and a side view, respectively, of the driving assembly of the transport mechanism of FIG. 2C.
Figure 5C:
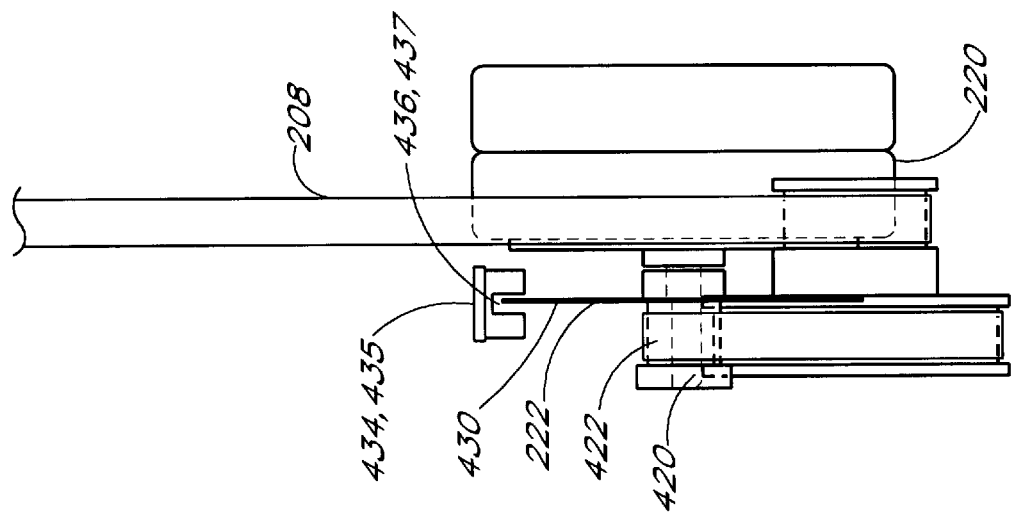
Figure 5B:
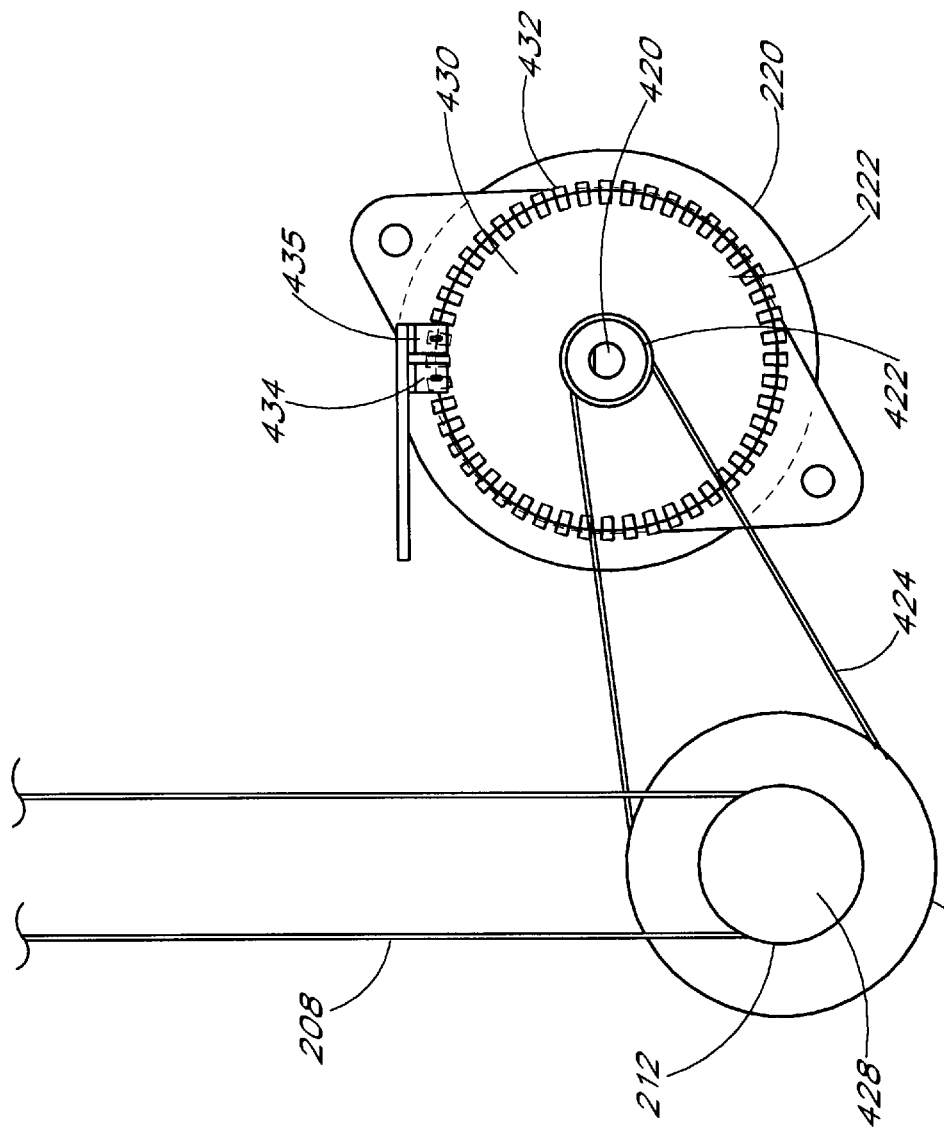

FIGS. 5A–5C illustrate the elevator transport motor assembly 206 in more detail. As illustrated, the motor assembly 206 comprises the motor 220 and the tachometer 222. The motor 220 is a conventional stepper motor which moves a predetermined angular distance in response to pulses received from the robotics control system 340 via lines 380A, 380B, 380C and 380D. As is well known in the art, by applying pulses to the lines in particular sequences, the stepper motor 220 can be stepped selectively in the clockwise or the counterclockwise angular direction. The motor 220 has a shaft 420 which is rotated by the operation of the motor 220. The tachometer 222 is mounted on the shaft 420 to thereby rotate in synchronization with the motor 220. A toothed pulley 422 is also mounted on the shaft 420. In the preferred embodiment, the tachometer 222 is positioned between the pulley 422 and the motor 220. A toothed belt 424 interconnects the pulley 422 with a toothed pulley 426 which is mounted on a common shaft 428 with the lower toothed pulley 212 at the base of the shaft 204. Thus, the rotation of the motor 220 causes the toothed pulley 426 and the lower toothed pulley 212 to rotate, thereby moving the belt 208. The elevator 202 is attached to the belt 208 so that the movement of the belt 208 moves the elevator 202 upward and downward along the shaft 204.

As illustrated in more detail in FIG. 5B, the tachometer 222 comprises a disk 430 having a plurality (e.g., 48) of evenly spaced slots 432 formed on the perimeter thereof. A sensor 434 and a sensor 435 are mounted proximate to the disk 430 so that the slots 432 pass through respective slots 436, 437 in the sensors 434, 435. The sensors 434, 435 are conventional photoelectric sensors each of which has an internal light source (not shown) which is directed toward an internal phototransistor (not shown). The disk 430 rotates as the shaft 420 rotates to move the slots 432 through the slots 436, 437 of the sensors 434, 435. The slots 432 of the disk 430 periodically allow light to pass from the light sources to be detected by the phototransistors, and the sensors 434, 435 output electrical signals on line 380E and 380F responsive to the detected light. The electrical signals are communicated to the robotics control system 340 to indicate that the disk has moved a distance corresponding to another step of the motor 220. In the preferred embodiment, each step of the motor 220 moves the elevator 202 up or down by a predetermined incremental distance in proportion to each step of the motor 220 (e.g., 0.0125 inch in the preferred embodiment).

As illustrated in FIG. 5B, the sensors 434, 435 are positioned such that they are in a quadrature relationship with respect to the slots 432. In particular, when the slots 432 are positioned such that the light from the light source to the phototransistor in one of the sensors 434 is partially blocked (i.e., a slot 432 is either moving into the sensor 434 or moving out of the sensor 434) the light from the light source to the phototransistor in the other sensor 435 is either fully blocked or fully open. Thus, the signals generated by the two sensors 435, 436 are in quadrature relationship. Because of this quadrature relationship, the direction of movement can be readily detected by the order in which the signals change.

Although described herein as stepper motors, the motor 220 and the other stepper motors described below can be replaced with conventional DC motors or other motors controlled by known motor control techniques.

Figure 6:
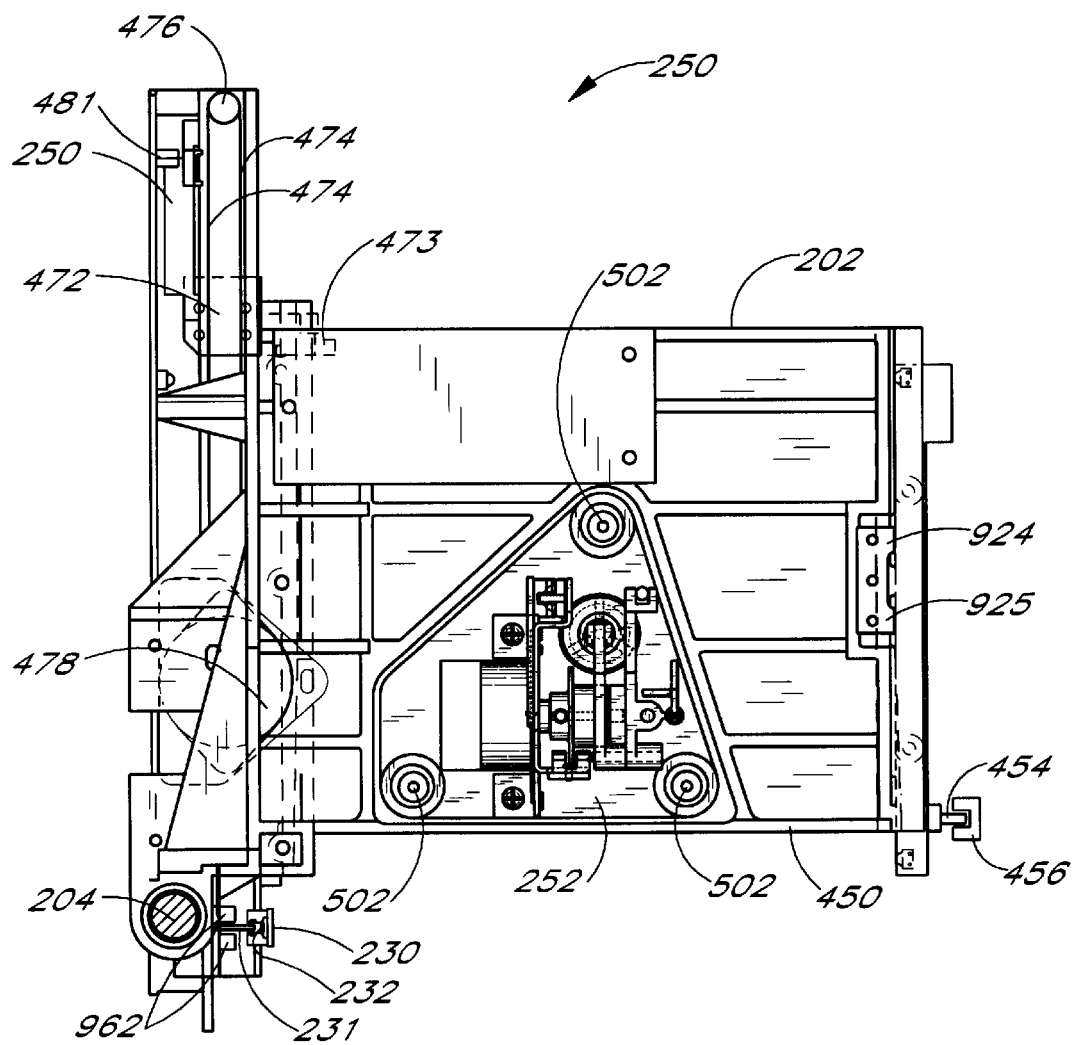
FIG. 6 is a top plan view of the elevator, tray picker assembly and disk lifter assembly.

FIG. 6 illustrates the elevator 202 in more detail. The elevator 202 comprises a platform 450 which supports the tray picker assembly 250 and the disk lifter assembly 252. The elevator 202 includes a tubular bearing 452 which is mounted on the shaft 204 to move up and down along the shaft 202. As illustrated, the shaft 202 is mounted proximate to the left side portion 121 of the inner frame 120. The elevator 202 also includes a protruding pin 454 which is disposed opposite the bearing 452 to engage a vertical slot 456 formed in the right side portion 122 of the inner frame 120. The protruding pin 454 moves up and down in the slot 456 as the elevator 202 is raised and lowered and has the effect of preventing the elevator 202 from rotating about the shaft 202. Preferably, the vane 231, which interrupts the light in the home position sensor 230, is proximate to the bearing 452.

Figure 7:
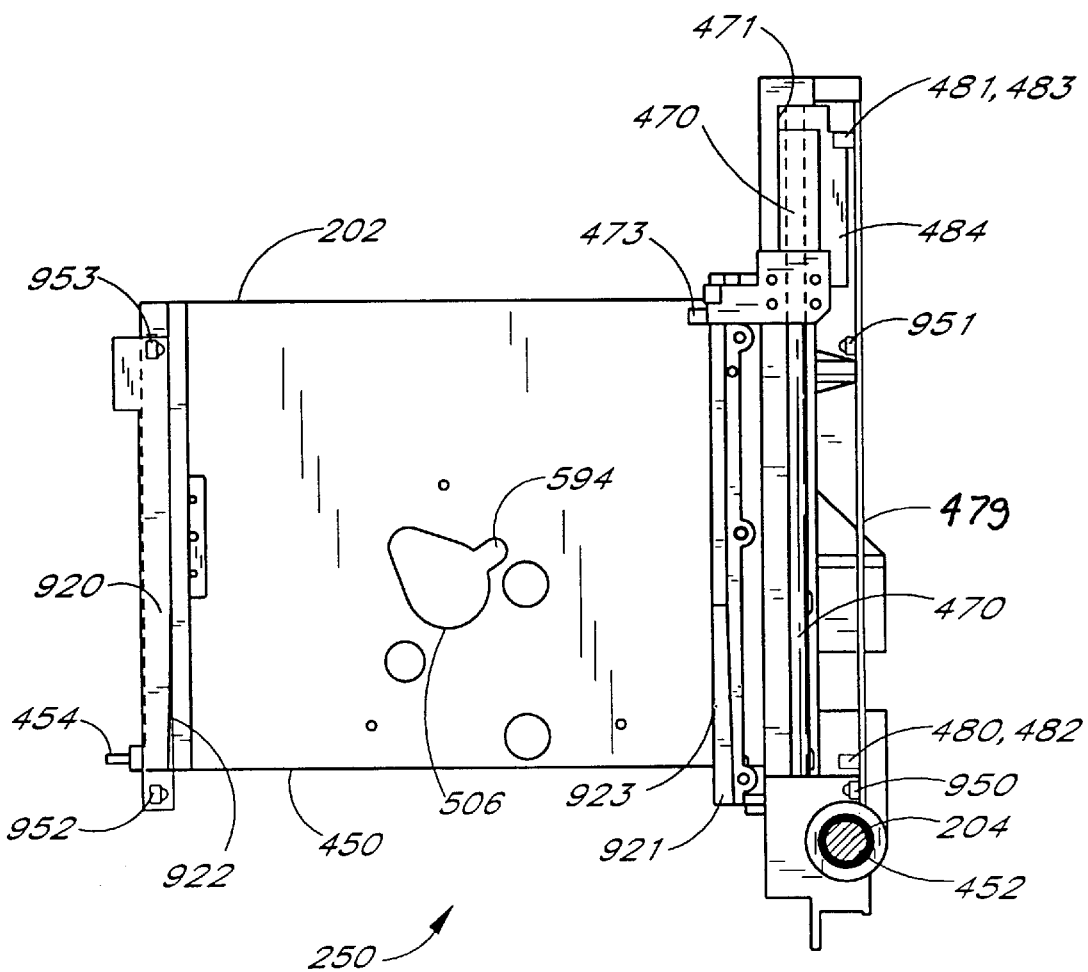
FIG. 7 is a bottom plan view of the elevator, tray picker assembly and disk lifter assembly of FIG. 6.

FIG. 7 is a lower plan view of the tray picker assembly 250 which illustrates the tray picker assembly 250 in more detail. The tray picker assembly 250 comprises a horizontally disposed rod 470 mounted on the left side of the elevator 202. A bearing 471 is mounted on the rod 470. The bearing 471 is attached to a picker carriage 472 which supports a picker tooth 473. A toothed belt 474 is attached to the bearing 471 and thus to the picker carriage 472. The belt 474 is a continuous belt which is mounted on a front toothed pulley 475 and a rear toothed pulley 476. A picker stepper motor 478 is coupled to the front toothed pulley 475 via a shaft 479. The motor 470 is controlled by stepping signals on a set of lines 400A, 400B, 400C and 400D from the robotics control system 340. When the motor 478 is stepped, the front pulley 475 rotates to cause the belt 474 to move either forward or rearward parallel to the rod 470, thus causing the picker carriage 472 and the picker tooth 473 to move forward or rearward. The operation of the picker tooth 473 in moving the trays 139 will be described in more detail below.

The tray picker assembly 250 further includes a forward travel sensor 480 and a rearward travel sensor 481 mounted on a printed circuit board 479. The forward travel sensor is coupled to the robotics control system 340 via a forward sensor signal line 400E. The rearward travel sensor is coupled to the robotics control system 340 via a rearward sensor signal line 400F. Each sensor 480, 481 includes a respective slot 482, 483 which separates an internal light source (not shown) from an internal phototransistor (not shown). A vane 484 is mounted on the picker carriage 472. When the picker carriage 472 is moved to its forwardmost position, the vane 484 enters the slot 482 of the forward travel sensor 480 and blocks the light to the phototransistor therein. This results in a detectable change in a forward travel sensor signal on the line 400E. Similarly, when the picker carriage 472 is moved to its rearmost position, the vane 484 enters the slot 483 of the rearward travel sensor 481 and blocks the light to the phototransistor therein. This results in a detectable change in a rearward travel sensor signal on the line 400F.

The forward and rearward sensors 480, 481 thus provide feedback signals which assure that the picker carriage 472 has moved to its proper forward and rearward positions when the motor 470 has been signaled to cause the picker carriage 472 to move. It should be understood that stepping signals are sent to the motor 470 to step the motor 470 by a predetermined number of steps between the forwardmost position and the rearwardmost position, and vice versa. The travel sensors 480, 481 assure that the motion caused by the motor 470 is successfully completed. If the movement of the picker carriage 472 is impeded by an obstacle or by a tray 139 having too much friction, the sensors 480, 481 will detect that the picker carriage 472 has not moved to the required position. Additional stepping signals can be sent to the motor 470 from the robotics control system 340 to attempt to further move the picker carriage 472, and if additional stepping signals do not achieve the required position, the robotics control system 340 will inhibit further operations until the problem is cleared by the user.

FIG. 8 (comprising FIGS. 8A, 8B, 8C, 8D) illustrates the disk lifter assembly 252 in more detail. The disk lifter assembly 252 comprises a horizontally disposed base portion 500 which is mounted to the elevator 202 by a plurality of screws 502 through a set of holes 503. The base portion 500 has a hole 504 formed in it which is aligned with a corresponding hole 506 in the elevator 202. A vertically disposed frame 510 is secured to the base portion 500.

A stepper motor 512 is secured to the vertically disposed frame 510 (FIG. 10). The motor 512 receives stepping signals from the robotics control system 340 via a set of signal lines 410A, 410B, 410C and 410D. The motor 412 has a shaft 514 which rotates when the motor 512 is stepped. A cam 516 is mounted to the shaft 514 to rotate therewith. As illustrated, the cam has a generally semicircular arcuate portion 518 and a detented portion 520. As further illustrated, a pin 522 is mounted on the arcuate portion 518 to rotate in a circular path around the shaft 514.

A vertically disposed movable panel 530 is slidably mounted proximate to the cam 516 with a first side 531 facing the cam 516 and a second side 532 facing away from the cam 516. A pair of horizontally disposed ears 533, 534 having holes 535, 536 formed therein are secured to the second side 532. A first rod 537 is vertically mounted on the base portion 500 and extends through the holes 535, 536 to provide a vertical guide on which the panel 530 moves up and down. A second rod 538 is also vertically mounted on the base portion 500. A slot 539 in a third horizontally disposed ear 540 of the panel 530 engages the second rod 538 to secure the panel 530 so that it does not rotate in a horizontal plane.

A pair of horizontally disposed rails 541, 542 are mounted to the first side 531 and are spaced apart by a distance slightly greater than the diameter of the pin 522. The panel 530 is mounted on the rods 537, 538 such that the pin 522 is positioned between the upper rail 541 and the lower rail 542. As illustrated in FIGS. 10 and 11, and as discussed below, as the motor 512 is stepped, the interaction of the pin 522 with the rails 541, 542 causes the panel 530 to move upward and downward in a reciprocating manner.

Figure 9:
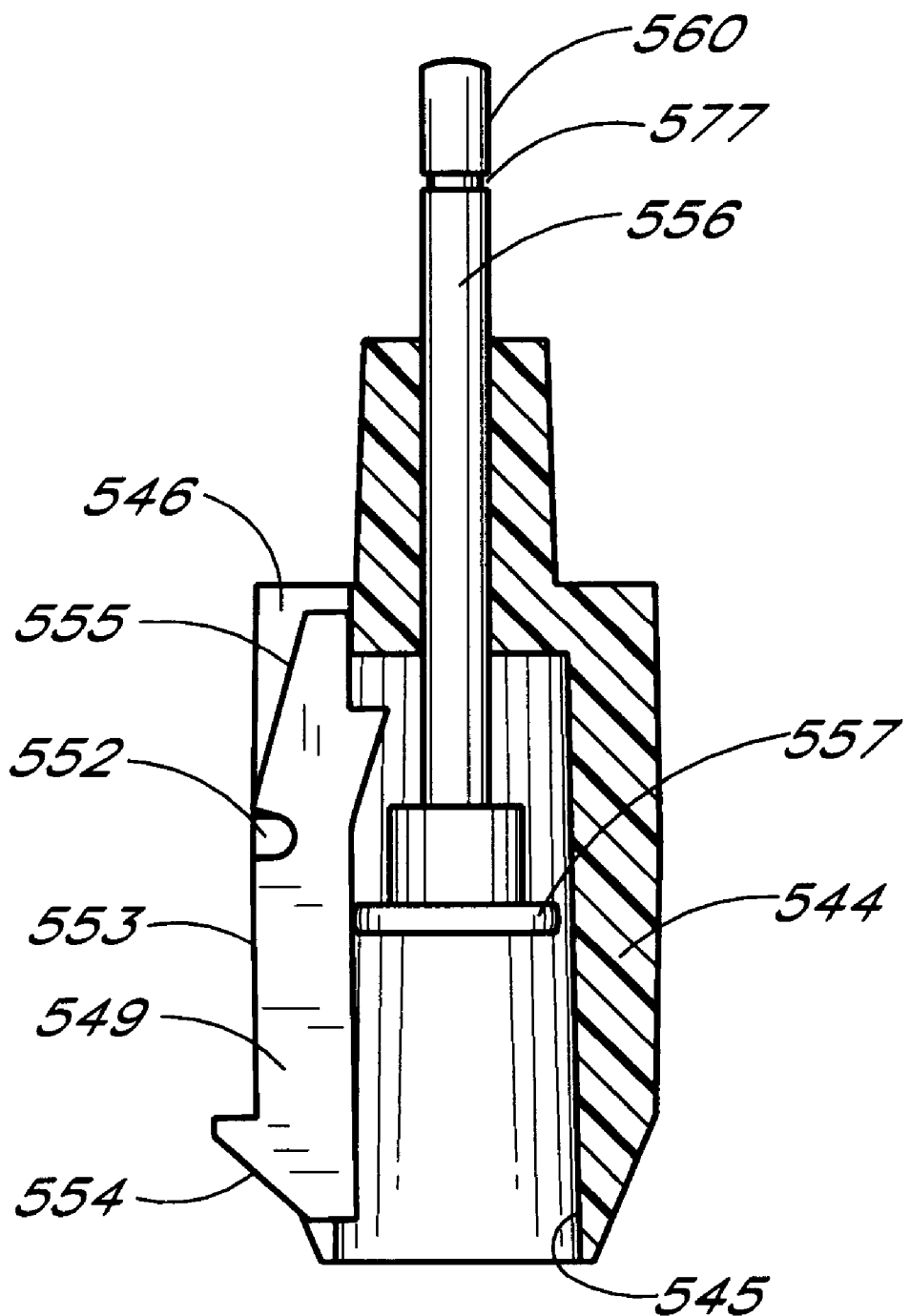
FIG. 9 is an enlarged cross-sectional view of the chuck of the disk lifter assembly showing the lifter fingers in more detail.

The panel 530 has a horizontal portion 543 mounted to the lower lefthand corner thereof. The horizontal portion 543 supports a lifter chuck 544 which is secured to the horizontal portion 543 such that the chuck 544 moves vertically upward and downward as the panel 530 is moved upward and downward by the pin 522. The chuck 544 has a hollow central shaft 545 (FIG. 9) and three vertical slots 546, 547, 548. Three fingers 549, 550, 551 are disposed in the slots 546–548. The fingers 549–551 are pivoted on respective pivot pins 552. (One of the pins 552 is shown in detail in a cross-sectional view in FIG. 9.) As illustrated for the finger 549 in FIG. 9, each finger 549–551 has a generally straight lower portion 553 with an outwardly extending hook portion 554 formed thereon. Each finger 549–551 further has an inwardly tapered upper portion 555. A camming pin 556 is mounted in hollow shaft 545 of the chuck 544 and moves upward and downward therein. An enlarged lower end 557 of the pin 556 moves along the upper and lower portions 555, 553 of the fingers 549–551. When the end 557 is above the pivot pins 552, the upper portion 555 of each finger 549–551 is pushed outward to cause the lower portion 553 to pivot inward and thereby pull the hook portion 554 into the chuck 544 (i.e., the hook portions 554 are retracted). When the end 562 is below the pivot pins 552 (as shown in FIG. 9), the lower portion 553 of each finger 549–551 is pushed outward to thereby cause the hook portions 554 to extend horizontally outward from the chuck 544.

The pin 556 has an upper end 560 which is coupled to a first end 561 of a horizontal leg 562 of a generally L-shaped camming lever 563. The lever 563 has a vertical leg 564. A pivot hole 565 is formed in the lever 563 at the intersection of the horizontal leg 562 and the vertical leg 564. A pivot pin 566 fits in the pivot hole 565 and is pressed into a hole 567 formed in the panel 530. The lever 563 is secured to the pivot pin 566 by an E-washer 568, or the like, which fits into a groove (not shown) on the pivot pin 566. The lever 563 thus pivots with respect to the panel 530 and also moves up and down with the panel 530.

The vertical leg 564 of the camming lever 563 has a straight inner portion 570 which engages the cam 516. Thus, as the cam 516 rotates, the arcuate portion 518 of the cam 516 moves the inner portion 570 of the vertical leg 564 outward away from the shaft 514 to cause the horizontal leg 562 to move downward against the upper end 560 of the pin 556 to thereby push the lower end 557 downward with respect to the chuck 544 thus causing the hook portions 554 of the fingers 549–551 to extend from the chuck 544. When the detented portion 520 of the cam 516 is positioned proximate to the inner portion 570, the vertical leg 564 can pivot to the left. A bias spring 572 is mounted on the pin 556 between the top of the chuck 544 and the upper end 560 of the pin 556. A washer 574 constrains the upper end of the bias spring 572. The washer 574 is secured in place by an E-washer 576 which fits into a groove 577 (FIG. 9) in the upper end 560 of the pin 556. The bias spring 572 is inserted in compressed state so that bias spring 572 biases the upper end 560 of the pin 556 away from the chuck 544 and thus biases the lever 563 so that the vertical leg 564 is biased to the left (toward the shaft 514).

The camming lever 563 is positioned such that the inner portion 570 of the vertical leg 564 is substantially perpendicular when engaged by the arcuate portion 518 of the cam 516. Thus, as the panel 530 reciprocates upward and downward, the vertical leg 564 is not caused to move inwardly or outwardly except for the motion caused by the shape of the cam 516. Thus, the camming action of the camming lever 563 operates independently of the reciprocating motion of the panel 530.

The disk lifter assembly 252 further includes a home position sensor 580 which comprises a disk 581 having a slot 582 formed therein. The disk 581 is mounted on the shaft 514 of the motor 512. The disk 581 rotates with the cam 516. A sensor 585 is mounted proximate to the disk 581. The sensor 585 has a slot 586 which receives the peripheral portion of the disk 581. The sensor 585 has an internal light source (not shown) on one side of the slot 586 and an internal phototransistor (not shown) on the opposite side of the slot 586. The peripheral portion of the disk 581 interrupts the light from the light source to the phototransistor except when the slot 582 of the disk 581 is within the slot 586 of the sensor 585. The sensor 585 outputs a signal on a signal line 410E when the light is sensed (i.e., when the slot 582 is within the slot 586). The disk 581 is positioned on the shaft 514 such that when the slot 581 is within the slot 586, the pin 522 is at its upper most position (i.e., top dead center).

Figure 8A:
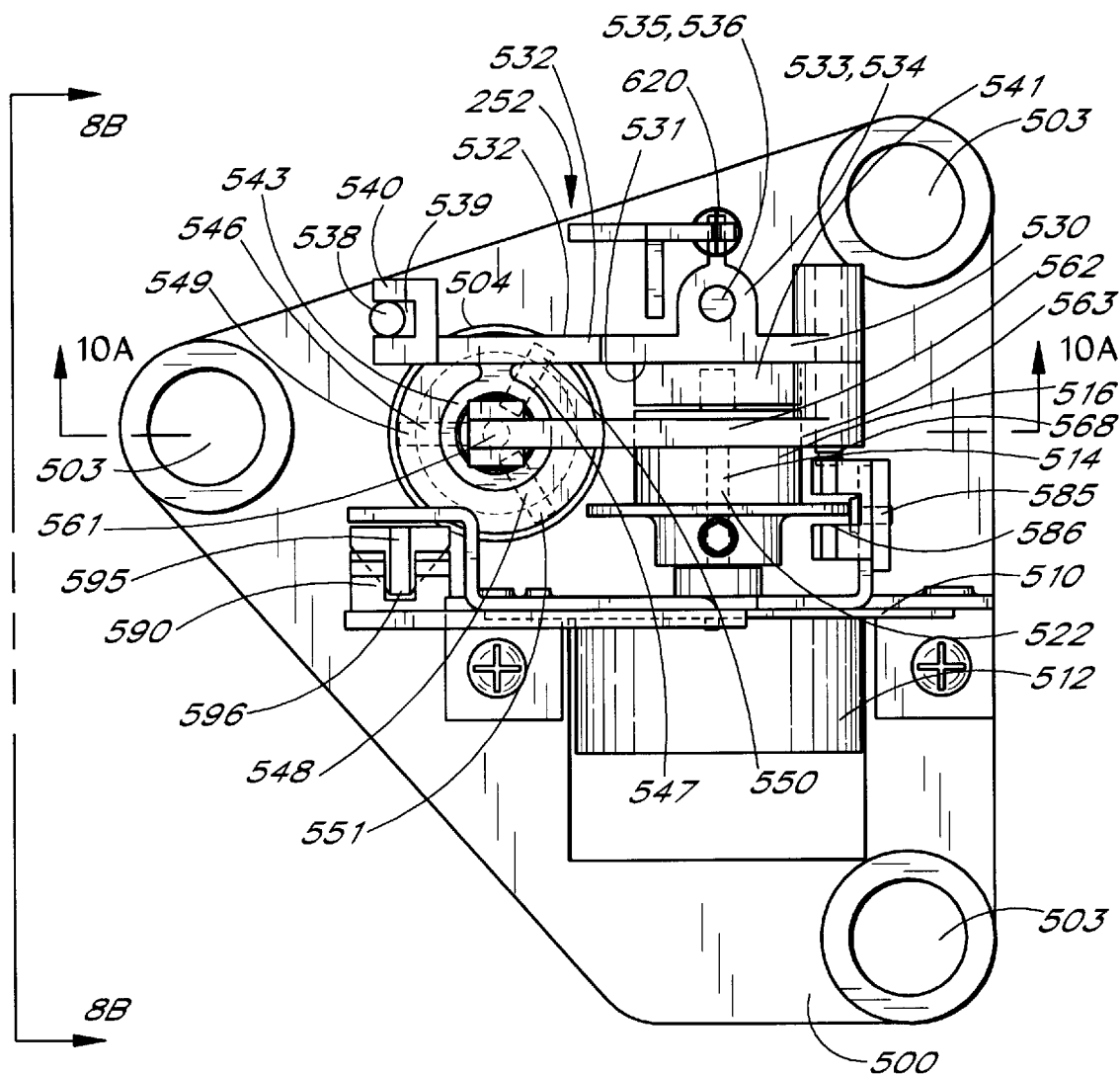
FIG. 8A is an enlarged top plan view of the disk lifter assembly.
Figure 8B:
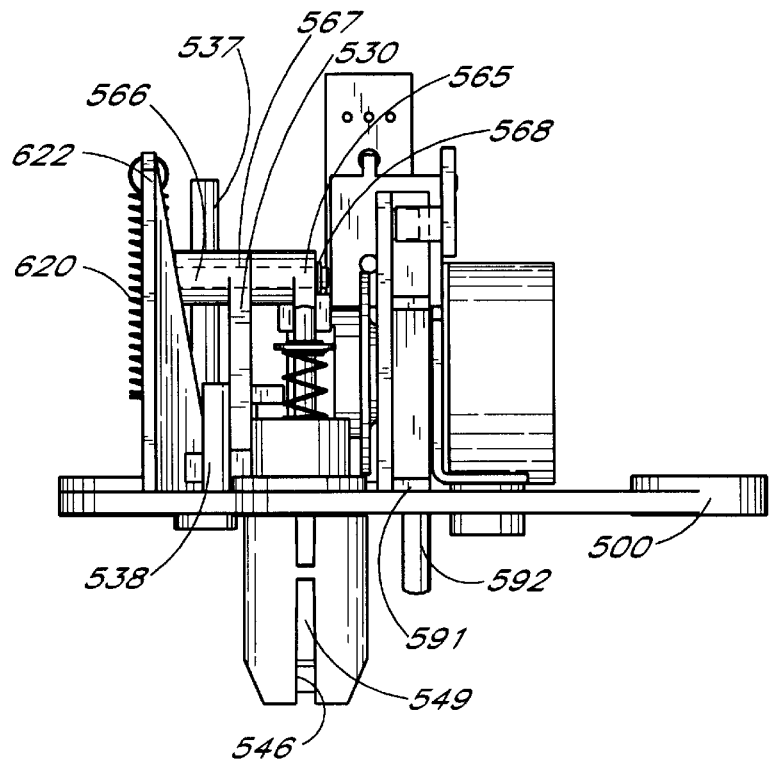
FIG. 8B is a rear view taken along the lines 8B—8B of FIG. 8A.
Figure 8C:
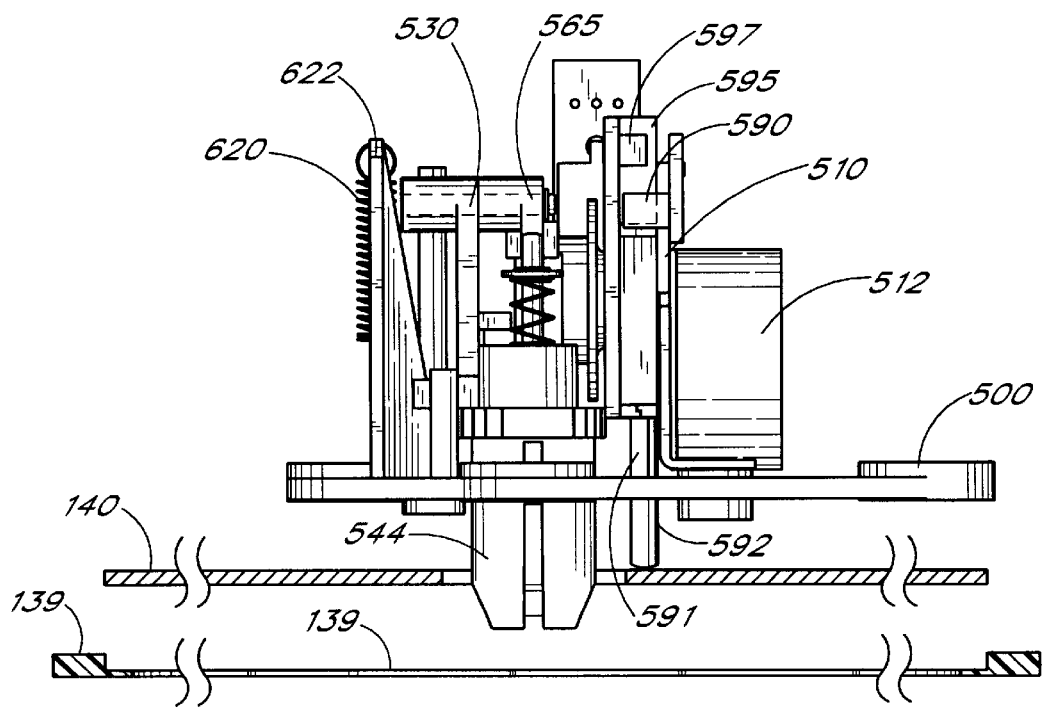
FIG. 8C illustrates the same view shown in FIG. 8B with the chuck in a raised position.
Figure 8D:
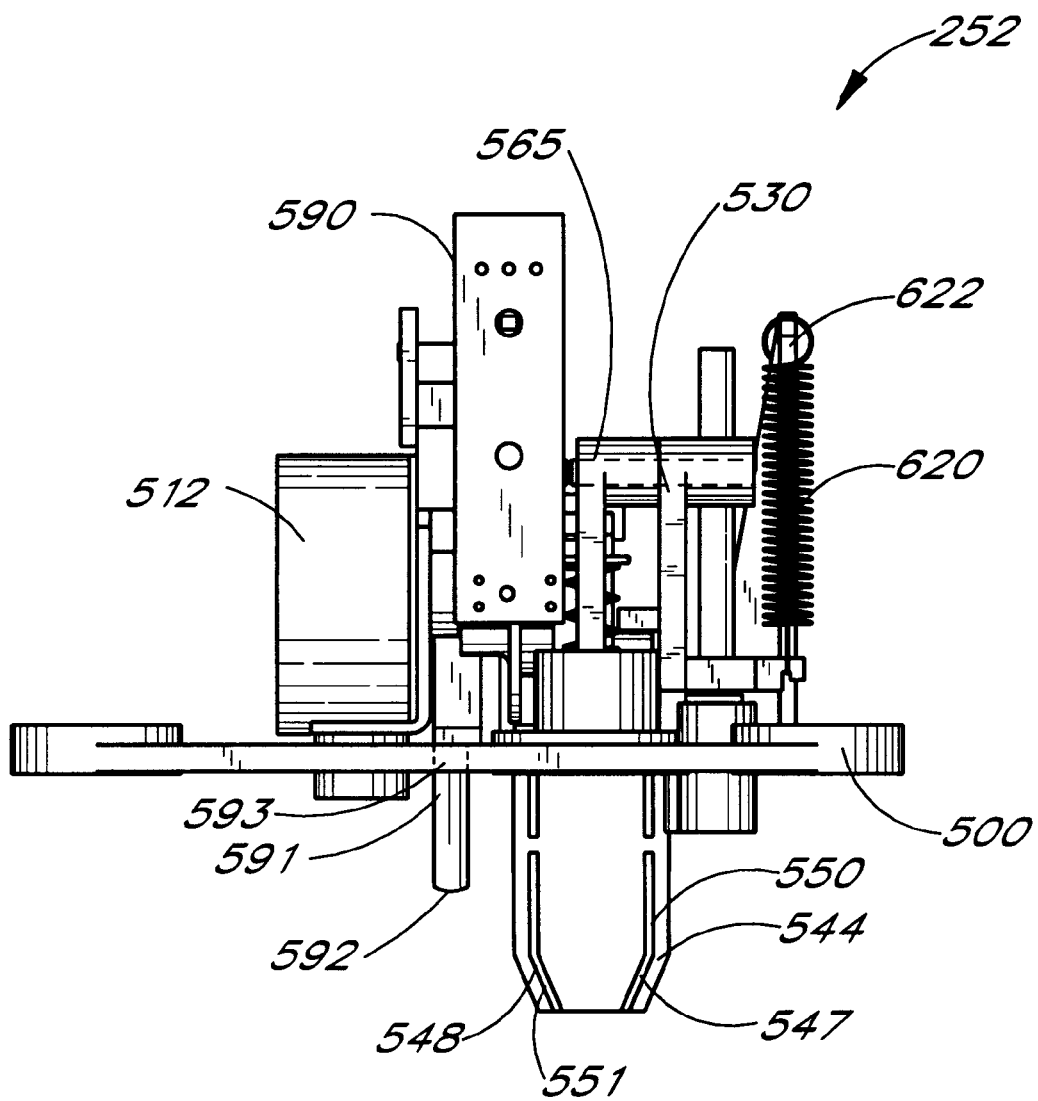
FIG. 8D is a front view of the disk lifter assembly.

As shown in FIG. 8D, the disk lifter assembly 252 further includes a disk present sensor 590 which is mounted proximate to the chuck 544. A rod 591 has a lower portion 592 which extends through a hole 593 in the base portion 500 of the lifter assembly 252 and through a hole 594 in the platform 450 of the elevator 202. The rod 591 is coupled to an upper vane 595 (FIG. 8A) which extends into a slot 596 in the sensor 598. The sensor 590 has a light source (not shown) on one side of the slot 596 and a phototransistor (not shown) on the other side of the slot 596. The sensor 590 generates a signal on a line 410F which indicates whether light from the source is detected by the phototransistor. The vane 595 has a slot 597 formed in it proximate to its top. The slot 597 lies within the slot 596 of the sensor 590 when the rod 591 is at its lowermost position so that light from the source is detected by the phototransistor. As will be discussed below, when a disk 140 is supported by the disk lifter assembly 252, the rod 591 is raised such that the slot 597 is no longer in the slot 596 and the light from the source is blocked from reaching the phototransistor. This causes the signal on the line 410F to change accordingly. If no disk is present, the rod 591 drops by gravity to lower the slot 597 into the slot 596 of the sensor 590.

The operation of the disk lifter assembly 252 is illustrated in FIGS. 10 and 11. In particular, FIG. 10, comprising FIGS. 10A, 10B, 10C, 10D and 10E, illustrates the operation of the disk lifter assembly 252 when the motor 512 is stepped counterclockwise (as viewed in FIGS. 8, 10 and 11) to lift the disk 140 from the magazine tray 139 or the drive drawer 150. FIG. 11, comprising FIGS. 11A, 11B, 11C, 11D and 11E, illustrates the operation when the motor 512 is stepped clockwise to lower the disk 140 to the magazine tray 139 or the drive drawer 150.

Figure 10A:
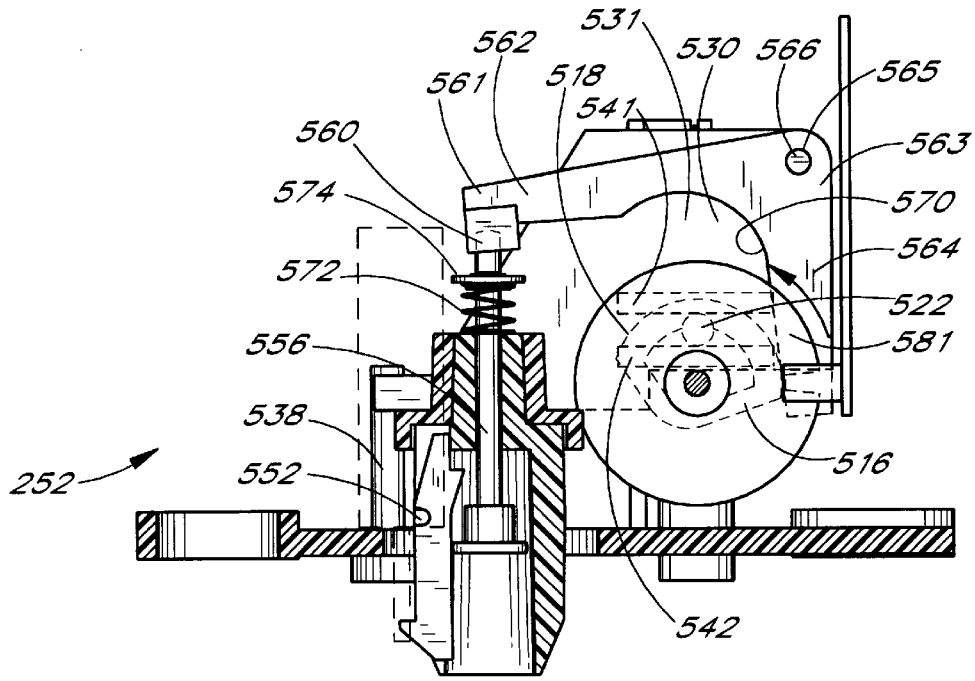
FIGS. 10A–10E illustrate a left view of the disk lifter assembly showing the disk lifting operation of the lifter assembly.

FIG. 10A illustrates the disk lifter assembly 252 in its rest position over the extended magazine tray 139 having a disk 140 to be lifted from the tray 139. In the rest position, the pin 522 is at top dead center and the slot 582 of the disk 581 is positioned within the slot 586 of the sensor 585 of the home position sensor 580. The disk lifter assembly 252 is in this rest position at all times except when it is lifting or lowering a disk 140. The robotics control system 340 assures that the disk lifter assembly 252 returns to this position by sensing the signal from the home position sensor 580 via the line 410E. When the disk lifter assembly 252 is in the rest position shown in FIG. 10A, the arcuate portion 518 of the cam 516 is engaged with the inner portion 570 of the vertical leg 564 to cause the camming lever 563 to push the pin 556 downward to extend the hook portions 554 of the fingers 549–551, as discussed above. The hook portions 554 are extended in the rest position regardless of whether a disk is being supported by the hook portions 554.

Figure 10B:
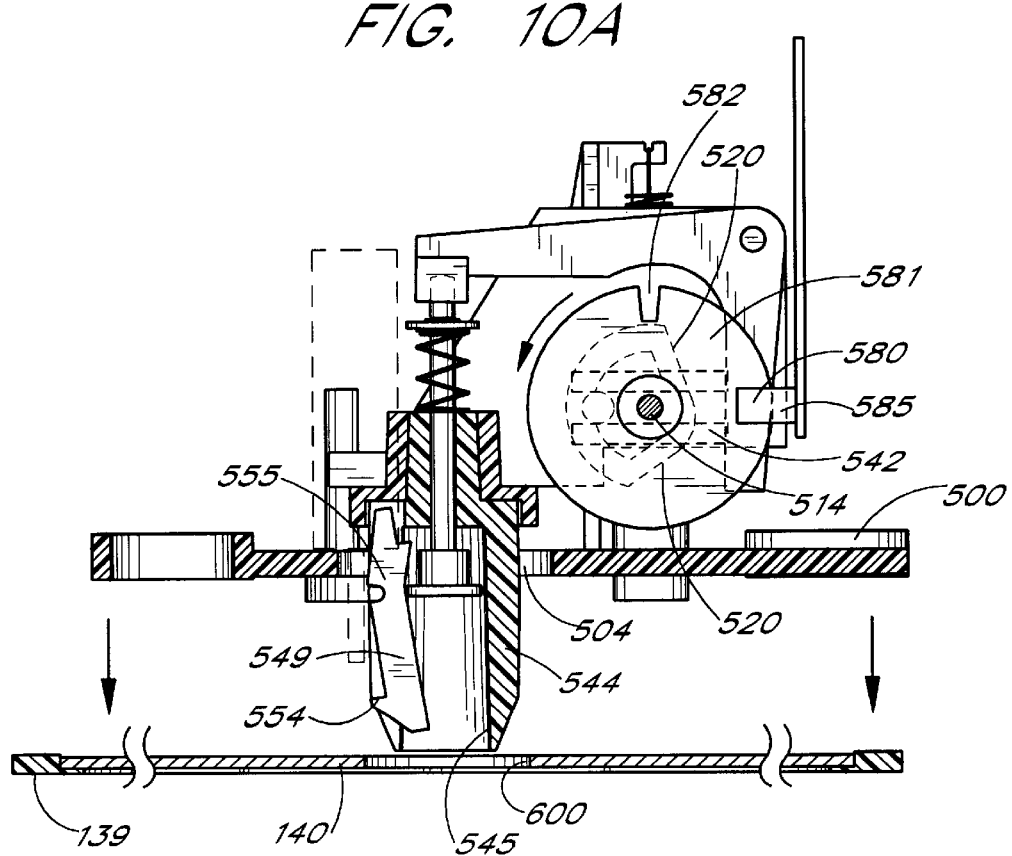

In order to lift a disk 140, the robotics control system 340 applies a predetermined sequence of signals to the signal lines 410A, 410B, 410C and 410D to cause the motor 512 to be stepped in the counterclockwise direction (as viewed in FIGS. 10A–10E). The control of the signals applied to the phase windings of a stepper motor is well known to a person of ordinary skill in the art, and the signals will not be described in detail herein. As illustrated in FIG. 10B, the counterclockwise rotation of the motor 512 causes the cam 516 and the pin 522 to rotate counterclockwise. The counterclockwise rotation of the pin 522 causes the pin 522 to push down on the lower rail 542 to push the panel 530 downward, thereby pushing the chuck 544 through the hole 504 in the base portion 500 and the hole 506 in the elevator. At the same time, detented portion 520 of the came 516 is rotated into position against the inner portion 570 of the vertical leg 564 so that the vertical leg 564 is allowed to move to the left towards the shaft 514 (as viewed in FIGS. 10 and 11) in response to the force applied to the horizontal leg 562 by the bias spring 572 via the upper end 560 of the camming pin 556. Thus, the camming pin 556 moves upward within the hollow shaft 545 of the chuck 544 to engage the upper portions 555 of the fingers 549–551. Thus, as illustrated in FIG. 10B, the hook portions 554 of the fingers 549–551 are retracted.

Figure 10C:
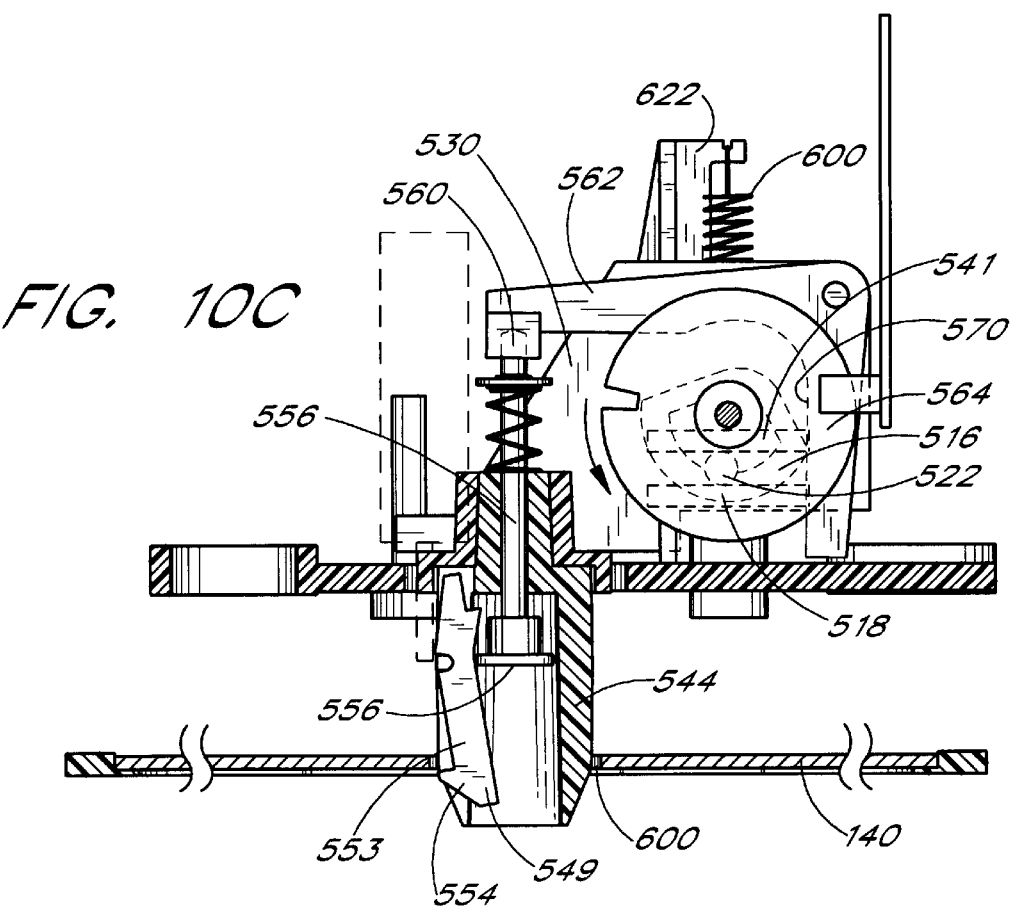

As illustrated in FIG. 10C, with the hook portions 554 retracted, the chuck 544 passes through a center hole 600 in the disk 140. Thereafter, when the cam 516 has rotated almost 180 degrees, and just as the pin 522 reaches bottom dead center, the arcuate portion 518 of the cam 516 engages the inner portion 570 of the vertical leg 564 and pushes the vertical leg 564 to the right. This action causes the horizontal leg 562 to move downward against the upper end 560 of the camming pin 556. The lower end 557 of the camming pin 556 engages the lower portions 553 of the fingers 549–551 to thereby push the hook portions 554 outward beneath the disk 140. The hook portions 554 are sized to extend beyond the radius of the hole 600.

Figure 10D:
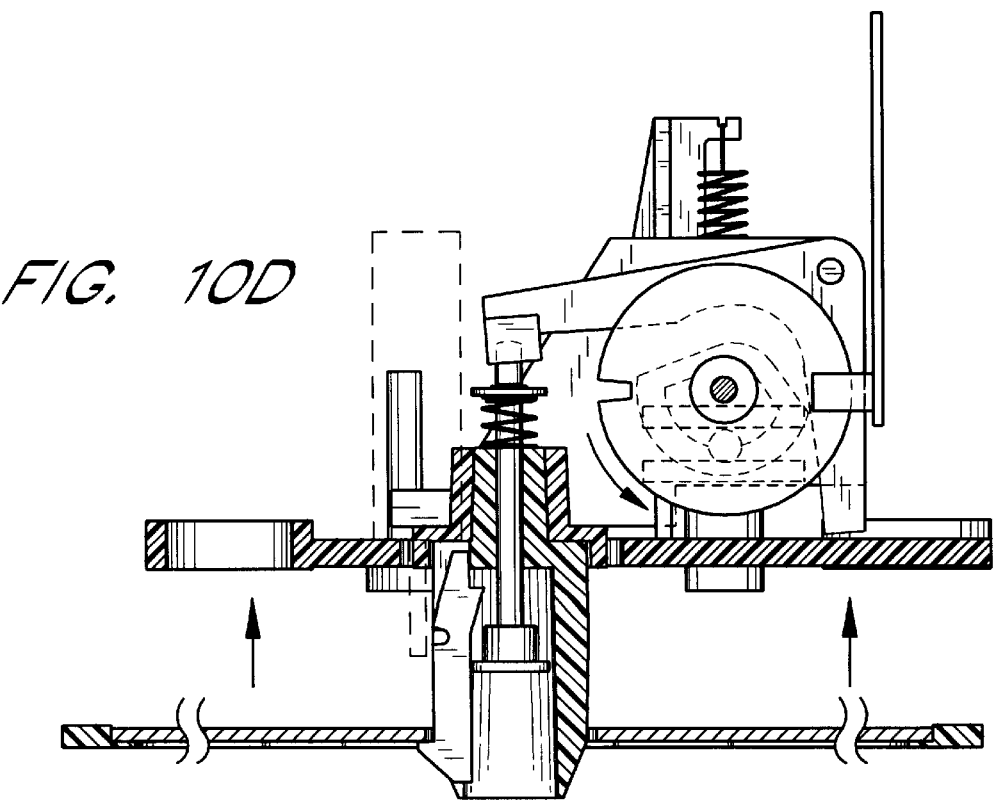

As illustrated in FIG. 10D, the cam 516 continues to rotate counterclockwise, the pin 522 begins moving upward and pushes against the upper rail 541 to move the panel 530 upward. The arcuate portion 518 of the cam 516 continues to engage the inner portion 570 of the vertical leg 564 to maintain the hook portions 554 in their extended positions. Thus, the hook portions 554 engage the bottom surface of the disk 140 and lift the disk 140.

Figure 10E:
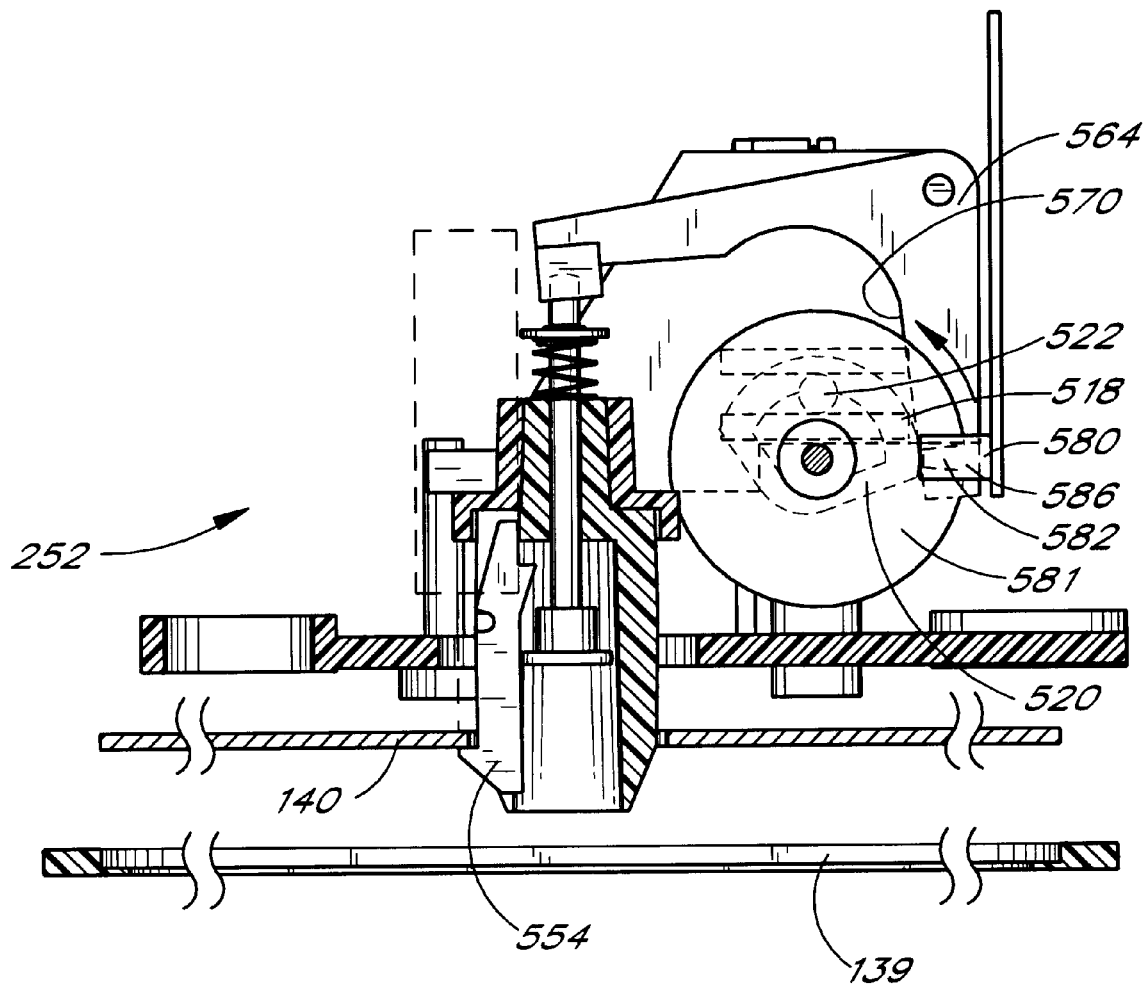

As illustrated in FIG. 10E, when the pin 522 reaches top dead center and the slot 582 of the disk 581 enters the slot 586 of the home position sensor 580, the robotics control system 340 responds to the generation of the home position signal on the signal line 410E and stops the motor 512. The arcuate portion 518 of the cam 516 is positioned with respect to the pin 522 such that, at top dead center, the arcuate portion 518 remains engaged with the inner portion 570 of the vertical leg 564. In particular, the arcuate portion 518 has approximately 5 degrees of arc remaining before the start of the detented portion 520. As discussed above in connection with FIG. 8, when the motor 512 is stopped in the uppermost position with the disk 140 supported by the hook portions 554, the disk present sensor 590 detects light and sends a signal to the robotics control system 340 indicated that the disk 140 is currently supported by the disk lifter assembly 252.

The disk lifter assembly 252 may be held in the top dead center by the stepper motor 512, particularly when the stepper motor 512 is a detented stepper motor (i.e., a stepper motor which has sufficient residual magnetic force to impede rotation when no stepping signals are being applied). If a non-detented stepper motor is used, the preferred embodiment of the present invention includes a bias spring 620 having a first end connected to a protuberance extending from the panel 530 and having a second end supported by a pylon 622 (see FIG. 8). The spring 620 has sufficient force to bias the panel 530 to remain in its uppermost position; however, the spring 620 is sufficiently weak that the motor 512 easily moves the panel 530 downward against the force of the spring 620.

Figure 11A:
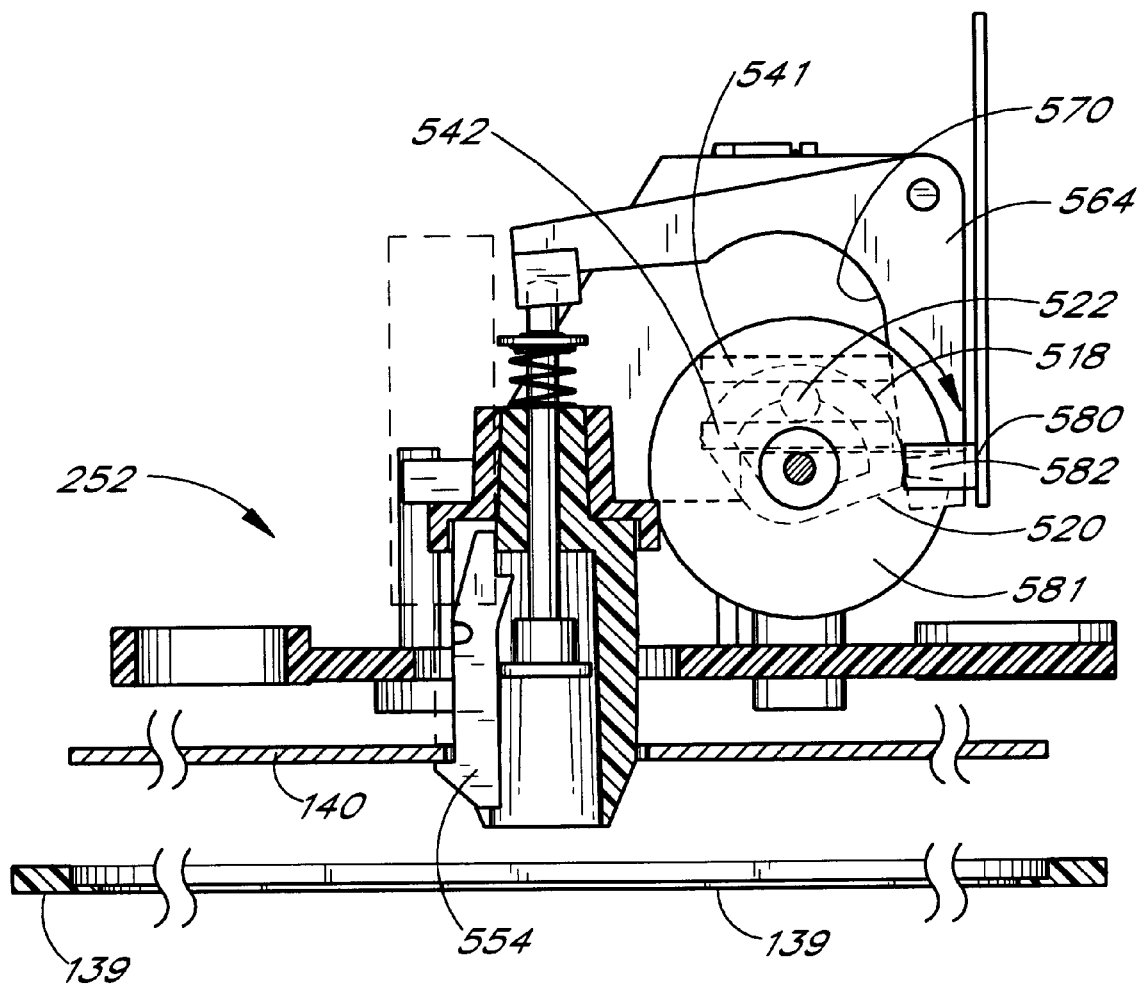
FIGS. 11A–11E illustrate a left view of the disk lifter assembly showing the disk lowering operation of the lifter assembly.

FIG. 11A illustrates the disk lifter assembly 252 in the rest position prior to lowering the disk 140 to return it to the tray 139. FIG. 11A generally corresponds to FIG. 10E. With the disk lifter assembly 252 in the position shown in FIG. 11A, the robotics control system 340 applies a sequence of signals on the lines 410A, 410B, 410C and 410D to cause the motor 512 to be stepped in the clockwise direction (as viewed in FIGS. 11A–11E).

Figure 11B:
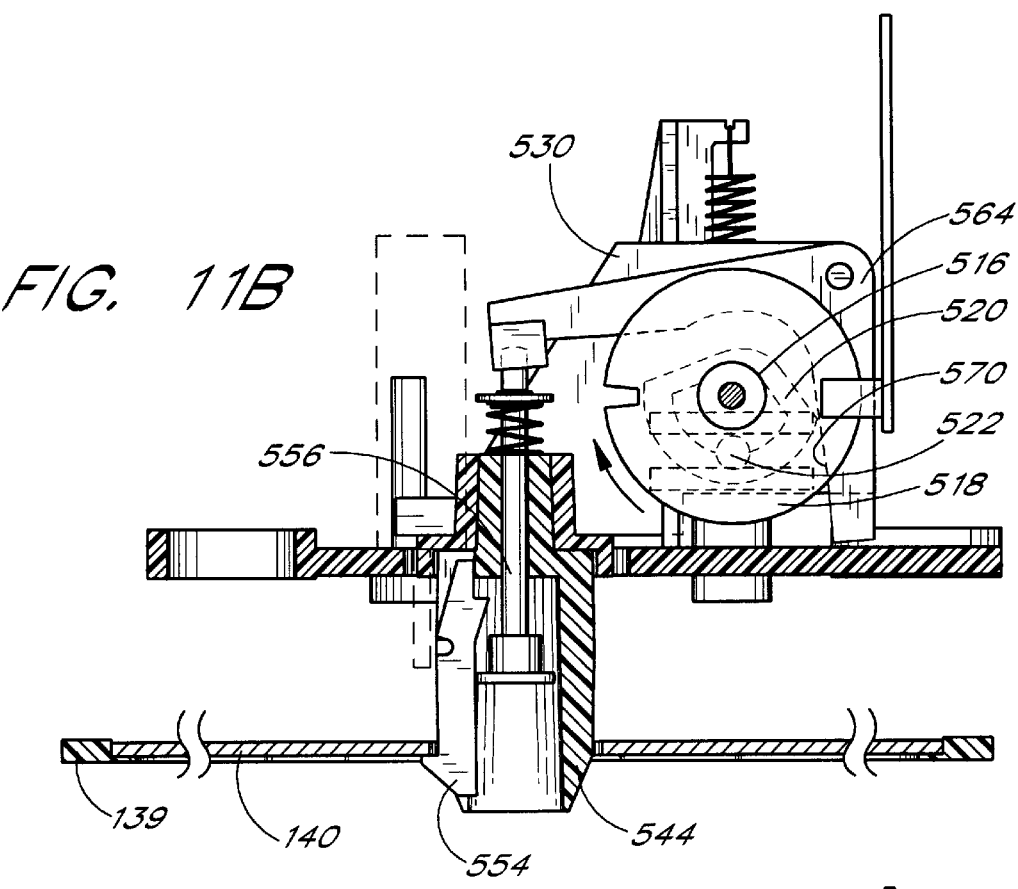

As illustrated in FIG. 11B, the clockwise rotation of the pin 522 causes the panel 530 to be pushed downward as in FIG. 10B; however, instead of moving the detented portion 520 of the cam 516 into position against the inner portion 570 of the vertical leg 564, the arcuate portion 518 of the cam 516 remains against the inner portion 570 for approximately one-half revolution of the cam 516.

Figure 11C:
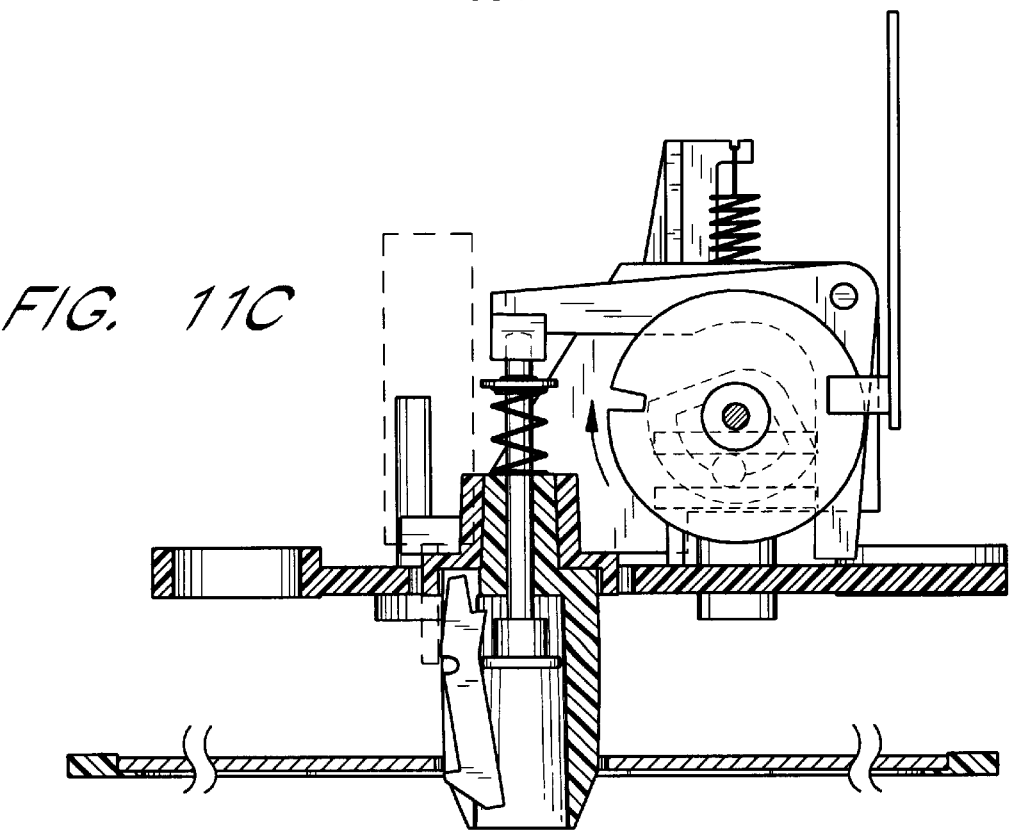

As further illustrated in FIG. 11C, just after the pin 522 reaches bottom dead center, the arcuate portion 518 of the cam 516 rotates away from the inner portion 570 of the vertical leg 564 and the vertical leg 564 moves inward along the detented portion 520. This causes the camming pin 556 to be biased upward to retract the hook portions 554 into the chuck 544.

Figure 11D:
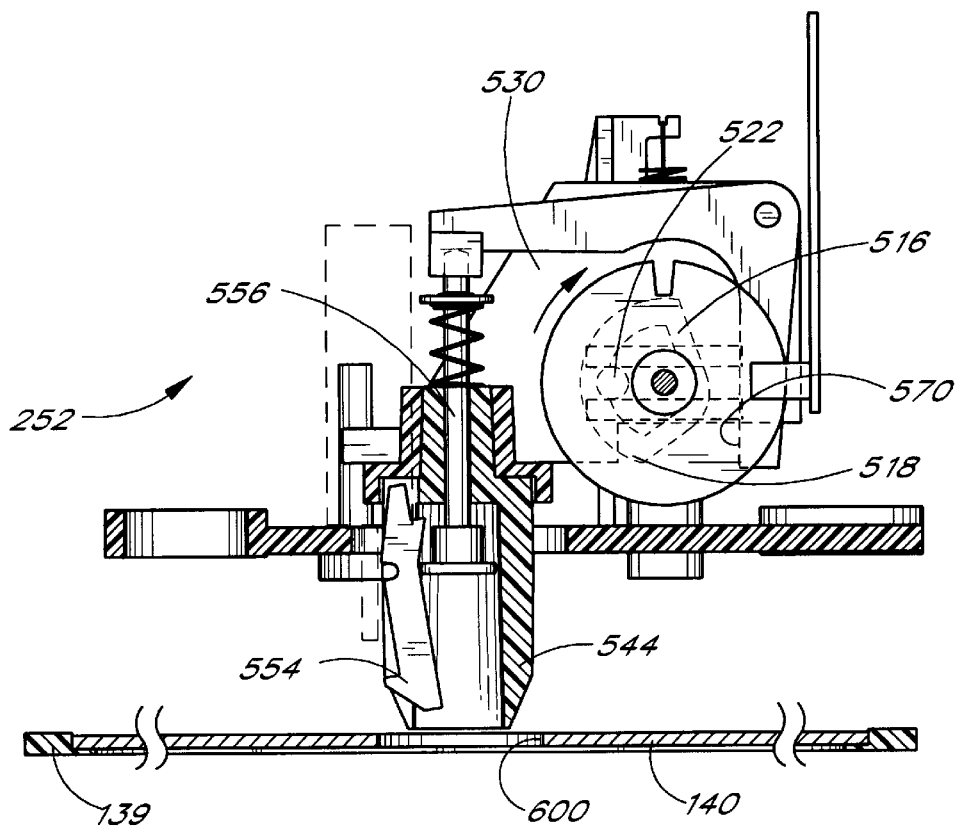

Then, as illustrated in FIG. 11D, the motor 512 continues to rotate clockwise and the panel 530 moves upward pulling the chuck 544 out of the hole 600 in the disk 140 unimpeded by the hook portions 554.

Figure 11E:
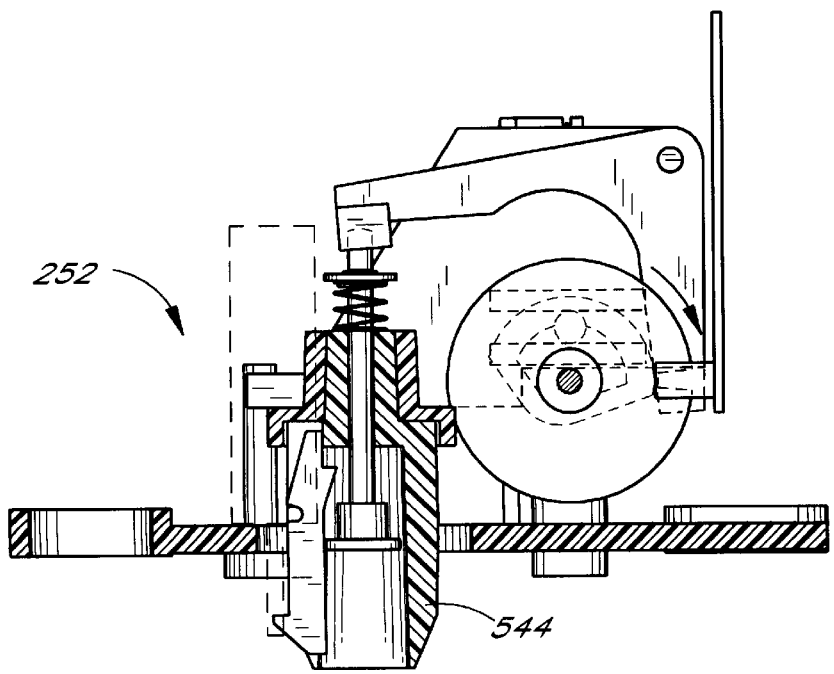

Finally, as illustrated in FIG. 11E, the disk lifter assembly 252 returns to the rest position without the disk 140. Further, the rod 591 (FIG. 8B) is at its lowermost position to permit light to shine through the slot 596 (FIG. 8A) of the sensor 590 to generate a signal to the robotics control system 340 that no disk is present.

Before describing the operation of the tray picker assembly 250 in detail, the trays 139 and the magazines 131–135 will first be described in more detail.

Figure 13:
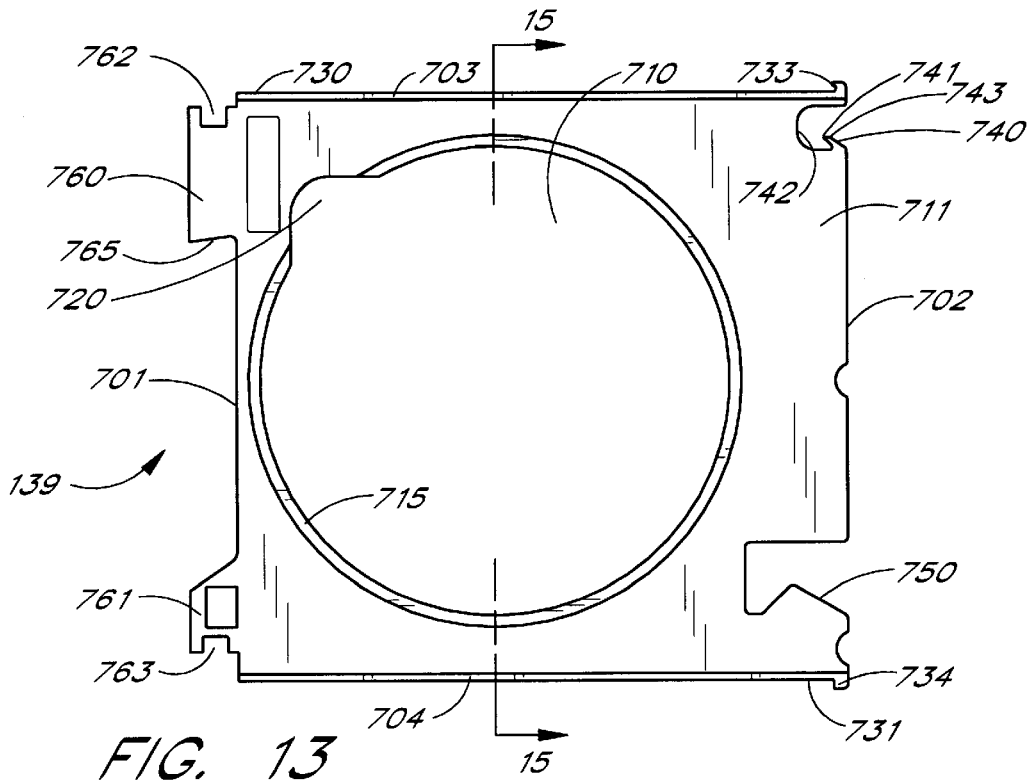
FIG. 13 is a top plan view of a first magazine tray.
Figure 14:
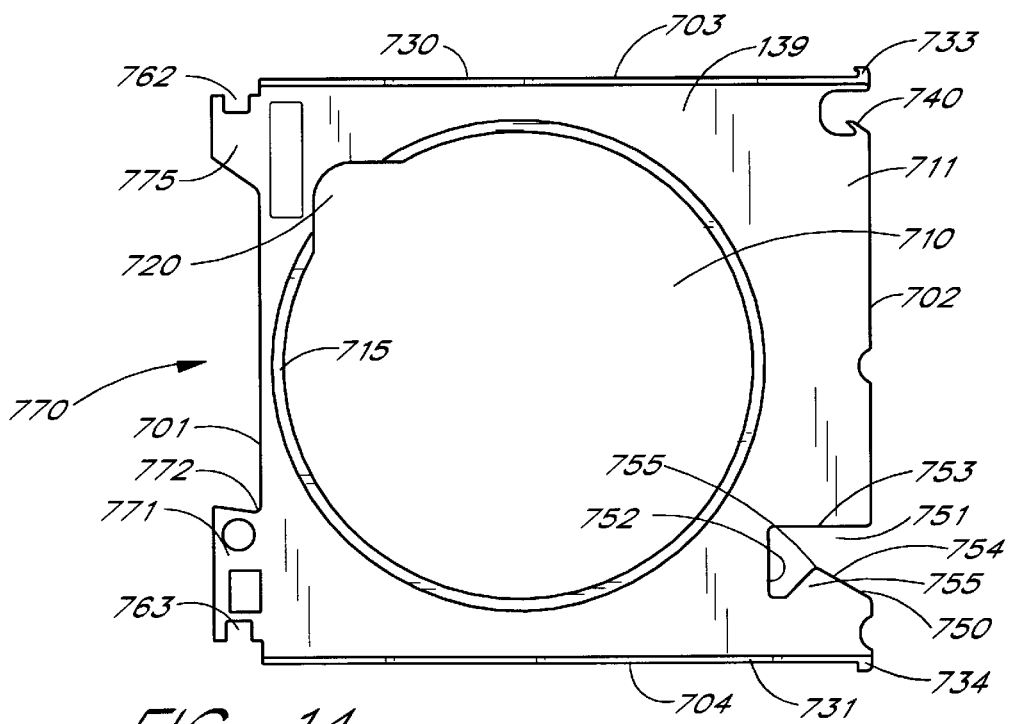
FIG. 14 is a top plan view of a second magazine tray.
Figure 15:
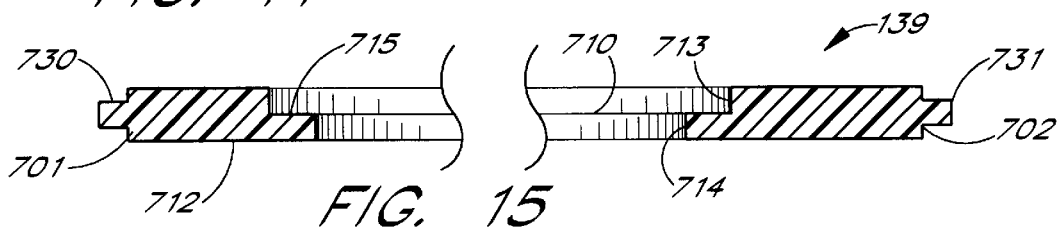
FIG. 15 is a cross-sectional view of FIG. 13 taken along lines 15—15 in FIG. 13.

FIGS. 13–15 illustrate a tray 139. The tray 139 is generally rectangular and has a front edge 701, a rear edge 702, a left side 703 and a right side 704. The tray further has a hole 710 formed between an upper surface 711 and a lower surface 712. The hole 710 is positioned closer to the front edge 701 than to the rear edge 702. As shown in the cross-sectional view in FIG. 15, the hole 710 has a stepped cross section forming an upper portion 713 and a lower portion 714 with a ridge or shelf 715 formed between the two portions 713, 714. The lower portion 714 has a diameter slightly smaller than the diameter of the CD-ROM disk 140 (FIG. 17), and the upper portion 713 has a diameter slightly larger than the CD-ROM disk 140 so that when the disk 140 is placed in the hole 710, it rests on the shelf 715. The upper portion 713 has a depth selected to be slightly deeper than the thickness of a conventional CD-ROM disk 140 so that when the disk 140 is resting on the shelf 715, the upper surface of the disk 140 is slightly below the upper surface 711 of the tray 139. By minimizing the depth of the tray 139, the concentration of disks 140 can be maximized in the given amount of vertical space of the tower. Preferably, the hole 700 has an elongated portion 720 formed proximate to the front 701 of the tray 139. The elongated portion 720 permits the user to insert a finger beneath the disk 140 when lifting the disk 140 manually.

As further illustrated in FIG. 13, the tray 139 has a left guide rail 730 and a right guide rail 731 formed on the left side 703 and the right side 704, respectively. The guide rails 730, 731 have a thickness approximately one-half the thickness of the tray 139 and the guide rails 730, 731 are centered between the upper surface 711 and the lower surface 712. A hook 733 is formed at the end of the left guide rail 731 proximate to the rear edge 702. A stop 734 is formed at the end of the right guide rail 732 proximate to the rear edge 702. The purposes for the hook 733 and the stop 734 will be explained below.

A latch catch 740 is formed as an opening in the rear edge 702 proximate to the left side 703. As illustrated, the latch catch 740 is a generally rectangular notch having an open end 741 and having a closed end 742 formed in a generally semicircular shape. A hook 743 is formed in the open end 741. The purpose of the latch catch 740 will be explained below.

A spring catch 750 is formed as an opening in the rear edge 702 proximate to the right side 704. As illustrated, the spring catch 750 is a generally rectangular notch having an open end 751 and having a closed end 752. One side 753 of the spring catch 750 positioned away from the right side 704 is generally straight. The opposite side 754 closer to the right side 704 has a triangular-shaped protrusion 755 which interrupts the rectangular shape. The purpose of the spring catch 750 will be explained below.

The tray 139 has a left ear 760 and a right ear 761 which protrude from the front edge 701. The left ear 760 has a rectangular notch 762 formed therein proximate to the left side 703. Similarly, the right ear 761 has a rectangular notch 763 formed therein proximate to the right side 704. As illustrated in FIG. 13, the left ear 760 is shorter proximate to the front edge 701 and becomes wider away from the front edge 701. Thus, a recess 765 is formed between the left ear 760 and the front edge 701 to permit the tray 139 to be gripped by a user. In contrast the right ear 761 is longer proximate to the front edge 701 and becomes narrower away from the front edge 701.

In contrast to the tray 139 in FIG. 13, a tray 770 in FIG. 14 has a right ear 771 which is smaller proximate to the front edge 701 than it is away from the front edge 701 to thereby form a recess 772 between the right ear 771 and the front edge 701. In further contrast, the tray 770 has a left ear 775 which is larger proximate to the front edge 701 and becomes smaller away from the front edge.

The purposes for the above-described features of the trays 139 and 770 will be described with respect to the magazine 131 illustrated in FIGS. 16–21. The magazine 131 comprises the front portion 137, the rear portion 138, a left side 800, a right side 801, a top 802 and a bottom 803. As illustrated, the front portion 137 is generally open to permit the trays 139 and 770 to slide in and out of the magazine 131. The left side 800 and the right side 801 have respective inner portions 810, 812 having a plurality of slots 814 formed therein. In the preferred embodiment, each of the inner portions 810, 812 has 20 slots 814 formed therein. The slots 814 are evenly spaced on 0.1 inch centers. Each slot 814 has a height slightly larger than the thickness of the left and right guide rails 730, 731. The left side 800 and the right side 801 are spaced apart by a distance selected such that the trays 139, 770 fit easily between the slots 814.

Figure 16:
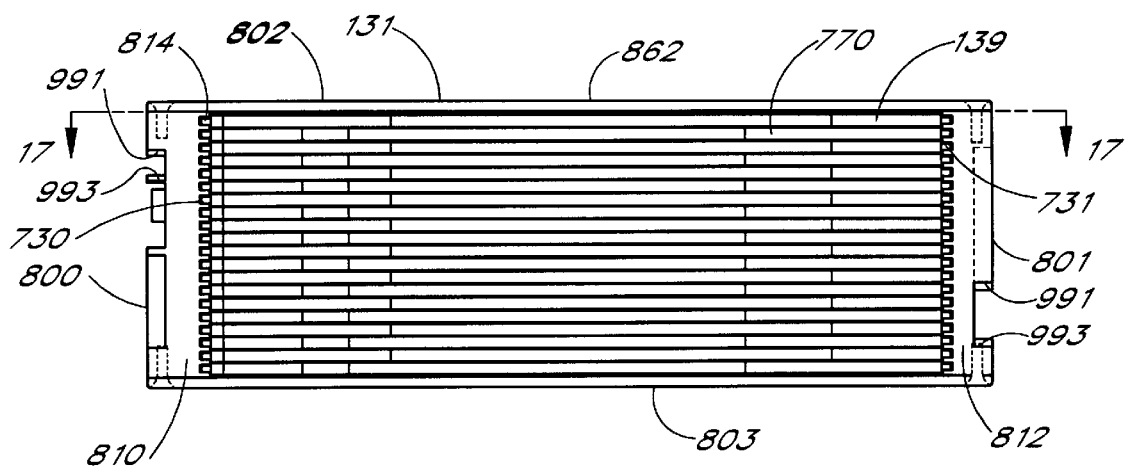
FIG. 16 is an enlarged front view of the disk magazine illustrating the open end of the magazine from which the trays are removed and showing the stacked arrangement of the trays in the magazine.
Figure 17:
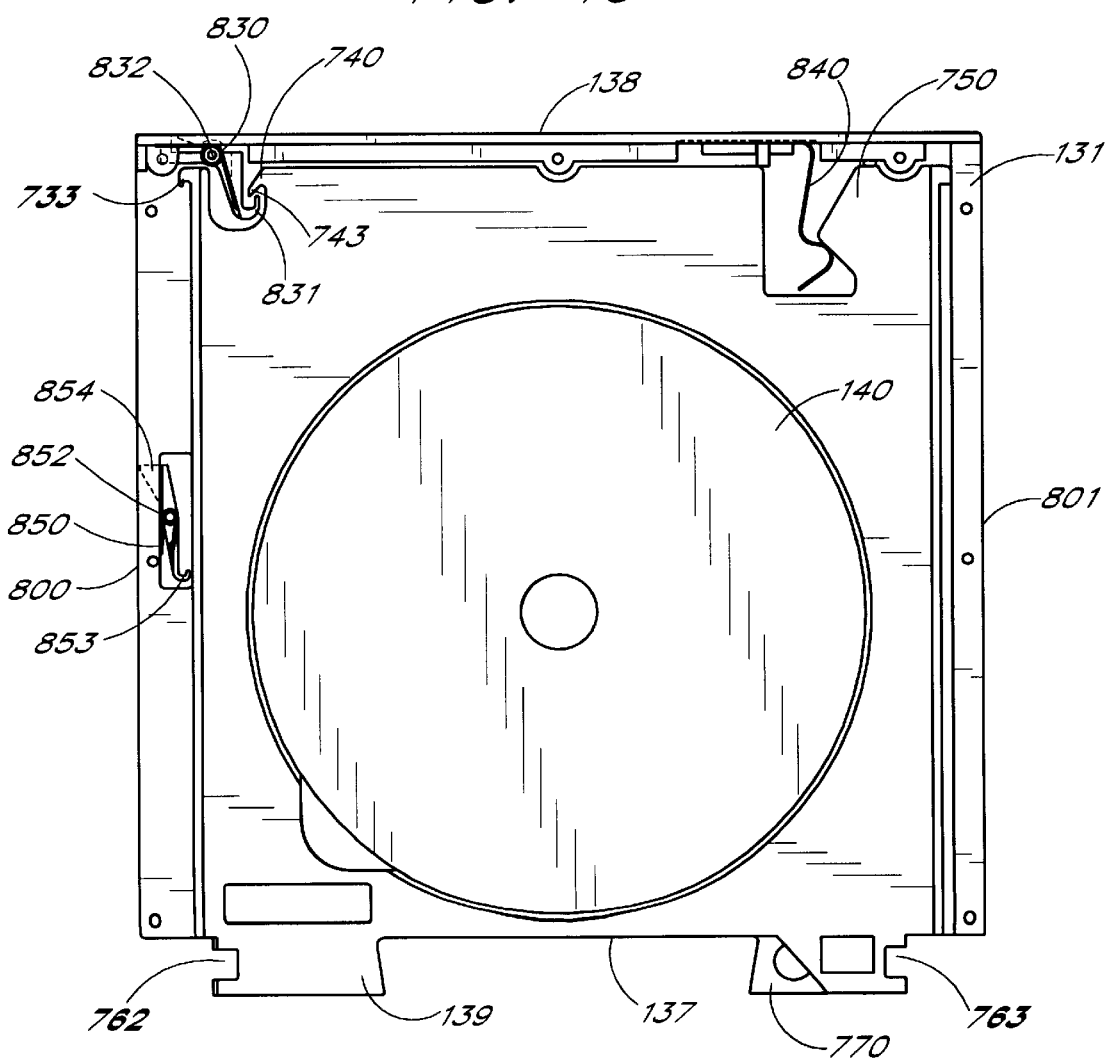
FIG. 17 is a top cross-sectional view of the magazine of FIG. 16 taken along lines 17—17 in FIG. 16.

As illustrated in FIGS. 16 and 17, the trays are placed in the slots 814 on top of each other with the trays 139 alternating with the trays 770. The vertical spacing between the slots 814 is sufficient that the trays 139, 770 do not touch each other. As discussed above, the trays 139 and 770 are not much thicker than the disks 140. By constructing the trays 139, 770 with such a small thickness and configuring the magazines 131 so compactly without the trays 139, 770 touching one another, more disks 140 may be added to the tower for the given amount of vertical space. The slots 814 run for the full length of the left side 800 and the right side 801. The slots have a cross-sectional dimension in the left side 800 and right side 801 designed to accommodate the guide rails 730, 731 as well as the hook 733 and the stop 734. However, the cross section of the slots 814 at the front portion 137 of the magazine is only sufficient to accommodate the guide rails 730 and 731, not the hook 733 and stop 734. Thus, the trays 139, 770 can be removed part way from the front portion 137 of the magazine 131, but not entirely.

As illustrated in FIGS. 13, 14 and 17, the purpose of the two types of left ears 760, 775 and right ears 761, 771 can now be understood. Because the trays 139, 770 are so close together, it would be difficult to grip the ear of a particular tray if the ears were all of the same shape. However, by staggering the ears with alternating left and right recesses 765, 772, a user is readily able to select a particular tray 139 or 770 to extract from the magazine 131.

As illustrated by FIGS. 17–21, the latch catch 740 and the spring catch 750 are safety features which prevent the trays 139, 770 from sliding out of the magazine when not desired. In particular, the magazine 131 includes a spring-biased latch 830 which engages the latch catch 740 when a tray 139, 770 is fully inserted in the magazine 131. The latch 830 includes a hook portion 831 which engages the hook 743 on a tray 139, 770 if an attempt is made to remove a tray 139, 770. The latch 830 includes a pivot 832. An activating portion 833 (FIG. 18) can be moved manually to cause the latch 830 to rotate around the pivot 832 to move the hook portion 831 out of the way of the hook 743 so that a tray 139, 770 can be moved. Each magazine slot 125–129 has a engagement protuberance (not shown) which automatically engages the activating portion 833 and rotates the hook 831 out of the way when the magazine 131 is inserted in its respective slot 125–129. Thus, when the magazine 131 is in its operating position, the trays 139, 770 can be moved forward in the magazine 131.

Figure 20:
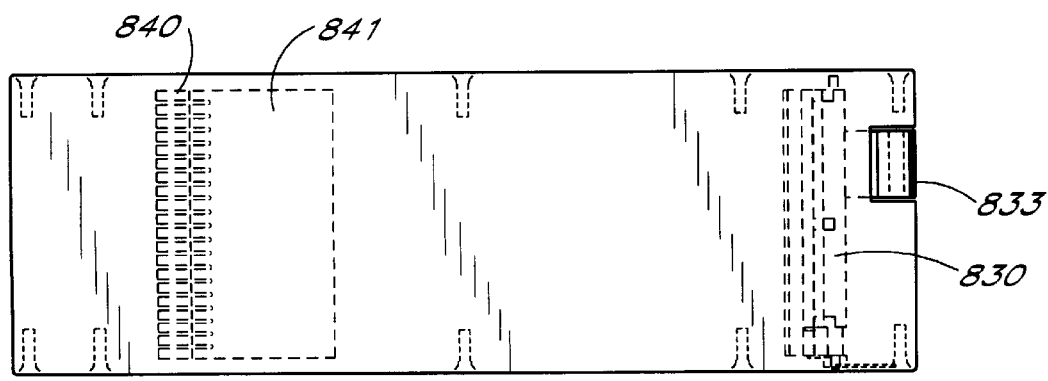
FIG. 20 is a rear view of the magazine illustrating the closed end of the magazine.

The spring catches 750 engage a plurality (e.g., 20) of leaf-springs 840 which are mounted to the rear portion 138 of the magazine 131. Preferably, as illustrated in FIG. 20, the leaf-springs 840 have a common base portion 841 which is split into the individual springs 840. The leaf-springs 840 are formed into the shape shown in FIG. 17 to engage the triangular-shaped protuberance 755 on each tray 139, 770. The leaf-springs 840 operate to bias the trays 139, 770 in their respective fully inserted positions so that when the latch catch 740 is released and a user or the tray picker 250 is pulling a tray 139, 770 from the magazine 131 only the selected tray will readily move. Further, the leaf-springs 840 keep the trays 139, 770 from vibrating out of position during operation of the present invention.

Figure 21:
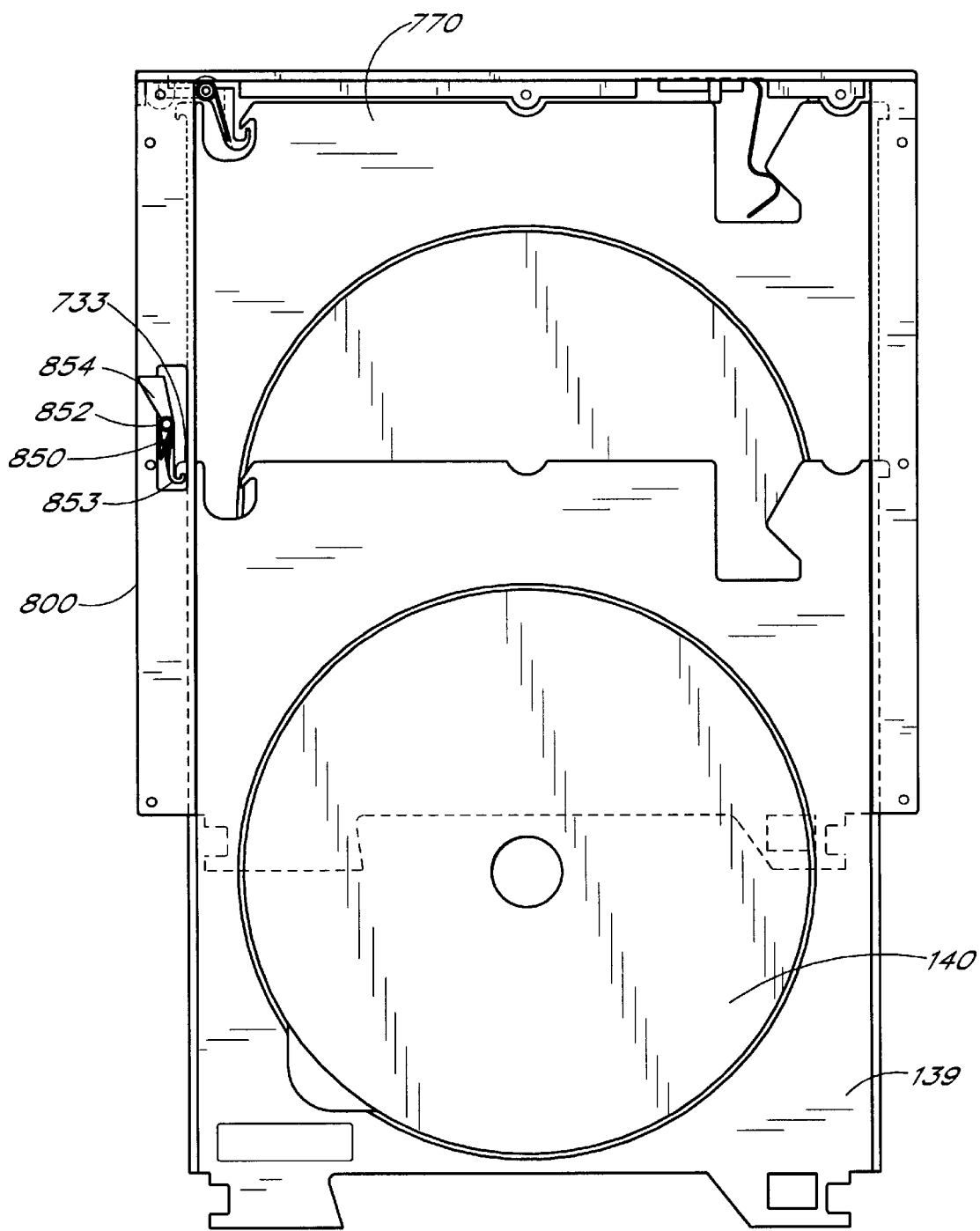
FIG. 21 is a top plan view of the magazine with a disk tray partially removed showing that the disk in the underlying tray is blocked from removal.

The magazine 131 includes one additional safety feature which is best illustrated in FIGS. 17 and 21. A second spring-biased latch 850 is positioned at approximately the mid-point of the left side 800 of the magazine 131. The latch 850 has a central pivot 852. A hook portion 853 is formed on one side of the central pivot 852, and an actuator 854 is formed on the other side of the central pivot 852. The hook portion 853 is biased to rest in the path of the hook 733 so that the hook 733 engages the hook portion 853 and stops the tray 139 with the tray extended approximately halfway out of the magazine 131, as illustrated in FIG. 21. The tray 139 is extended far enough to enable a user to remove the disk 140 from or insert the disk 140 into the hole 710 in the tray 139. However, as illustrated in FIG. 21, the disk 140 in the tray 770 beneath the tray 139 is covered by the tray 139 so that the disk 140 in the tray 770 is constrained within the tray 770 even if the user inadvertently turns the magazine 131 over. The actuator 854 is not readily actuatable by a user; however, when the magazine 131 is inserted into the respective slot 125–129, a further protuberance (not shown) on the enclosure engages the actuator 854 and moves the hook portion 853 out of the path of the hook 733 so that the tray can be fully extended by the tray picker assembly 250.

As illustrated in FIG. 17, when the trays 139, 770 are fully inserted in the magazine 131, the rectangular notches 762 on the left sides of the trays 139, 770 are aligned, and the rectangular notches 763 on the right sides of the trays 139, 770 are also aligned. The left notches 762 and the right notches 763 serve two different purposes. As illustrated in FIG. 1B, the enclosure 110 includes an infrared transmitter 900 at the top of the enclosure and an infrared receiver 902 near the bottom of the enclosure (e.g., at a level between the lowermost magazine 135 and the uppermost drive 141). The transmitter 900 and the receiver 902 are aligned with the notches 762 on the left sides of the trays 139, 770. The notches 762 will be aligned when all the trays 139, 770 in all the magazines 131–135 are fully inserted in the respective magazines. If so, then the infrared light from the transmitter 900 will be detected by the receiver 902 and a signal will be provided to the robotics control system 340 via a signal line 904 (FIG. 23C). If any tray 139, 770 is sufficiently out of alignment to block the infrared light, then no light will be detected, and the robotics control system 340 will detect an error and will suspend all movement of the elevator 202 until the misaligned tray is aligned by the user.

The notches 763 on the right sides of the trays 139, 770 are also aligned. When properly aligned, the notches 763 provide a channel for the movement of the picker tooth 473 as the elevator 202 moves up and down. When the elevator 202 stops at a selected tray 139, 770, the picker tooth 473 is moved rearward by the operation of the tray picker assembly 250 to pull a tray 139, 770 from a magazine 131–135.

As further illustrated in FIG. 7, the tray picker assembly 250 includes a left side rail 920 and a right side rail 921. Each side rail 920, 921 has a respective slot 922, 923 formed therein. The side rails 920, 921 are positioned beneath and on either side of the elevator 202 and are precisely aligned with the picker tooth 473. The side rails 920, 921 are thus aligned with the particular tray 139, 770 where the elevator 202 has stopped. The picker tooth 473 pulls the tray 139, 770 from the magazine 131–135 into the slots 922, 923 in the side rails 920, 921. The side rails 920, 921 are spaced apart sufficiently that the tray 139, 770 readily enters the slots 922, 923. A pair of bias springs 924, 925 (FIG. 6) are positioned at approximately the midpoint of the left side rail 920. When the picker tooth 473 has pulled the tray 139, 770 fully into the slots 922, 923, the bias springs 924, 925 push the tray 139, 770 against the right guide rail 921. The right guide rail 921 serves as a reference for the location of the tray 139 so that the hole 600 in a disk 140 is properly aligned from right to left with the tray lifter assembly 252. As discussed above, the rearward sensor 481 assures that the disk hole 600 is properly aligned from front to back.

As discussed above, the robotics control system 340 applies stepping signals to the picker stepper motor 478 in a proper sequence to first remove a tray 139 from the magazine 131–135. The number of stepping pulses in the sequence is known; however, the rearward sensor 481 assures that the tray 139 has moved to the correct location before the tray lifter assembly 252 is activated to lift the disk 140 from the tray 139 or to lower a disk 140 to the tray 139. Similarly, the number of stepping pulses required to insert a tray 139 is also known; however, the forward sensor 480 assures that the tray has been properly inserted before the elevator 202 is again moved.

The present invention includes other sensors which assist in assuring proper operation of the present invention. As further illustrated in FIG. 1B, the enclosure includes another sensor system which comprises a infrared transmitter 940 at the top of the enclosure which is aligned with an infrared receiver 942 at the bottom of the enclosure. The transmitter 940 and the receiver 942 are positioned along an extended centerline of the magazines 131–135 and approximately one-half inch behind the magazines 131–135. The transmitter 940 and the receiver 942 are positioned such that when the tray picker assembly 250 removes a tray approximately one inch from the magazine 131–135, the forwardmost portion of the hole 710 of the tray 139 is aligned with the light passing from the transmitter 940 to the receiver 942. If the tray 139 has a disk 140 in it, the light will be blocked by the disk 140. On the other hand, if the tray 139 is empty, the light will not be blocked. A signal will be generated to the robotics control system 340 via a signal line 944 (FIG. 23C) to indicate that the currently picked tray 139 is empty. This feature enables the robotics control system 340 to perform a rapid inventory of which of the hundred trays 139 in the five magazines 131–135 have disks in them without having to pull the trays 139 all the way out and then trying to lift a disk 140.

The elevator 202 includes obstruction sensors to assure that the present invention is operating properly. As illustrated in FIG. 7, two obstruction sensor transmitters 950, 951 are positioned proximate to the left side of the elevator 202 and extend below the tray picker tooth 473 proximate to the front of the elevator 202 and proximate to the rear of the elevator 202, respectively. Two obstruction sensor receivers 952, 953 are positioned proximate to the right side of the elevator 202 and are aligned with the transmitters 950, 951. The transmitters 950, 951 direct infrared light toward the receivers 952, 953. As long as the areas between the transmitters 950, 951 and the receivers 952, 953 are unoccupied, the receivers 952, 953 detect the light and generate respective signals to the robotics control system 340 via signal lines 954, 955 (FIG. 23C) to indicate that the areas are clear. On the other hand, if the areas beneath the elevator 202 become obstructed, the signals to the robotics control system 340 are interrupted to indicate that the robotics control system 340 should stop the elevator movement until the obstruction is cleared. This feature is particularly important in view of the fact that the drives 141–144 are operated independently of the robotics control system 340. Thus, a command may be generated on the SCSI bus to open a drive drawer 150 when the robotics control system 340 is not expecting the drawer 150 to be open.

The obstruction sensors are further used to assure that a drive drawer 150 is open when it is supposed to be open. In particular, as the elevator 202 is lowered to the vicinity of the drive drawer 150 where it is to lift or deposit a disk, the obstruction sensors should sense the presence of the drive drawer 150 before stopping. If the receivers 952, 953 do not send an obstruction signal to the robotics control system 340 prior to stopping, the robotics control system 340 will not attempt to lower or lift a disk 140 from an unextended drawer 150. In particular, the signals from both the forward and rearward obstruction sensor receivers 952, 953 should sense the presence of the drawer 150 to assure that the drawer 150 is fully extended.

Figure 18:
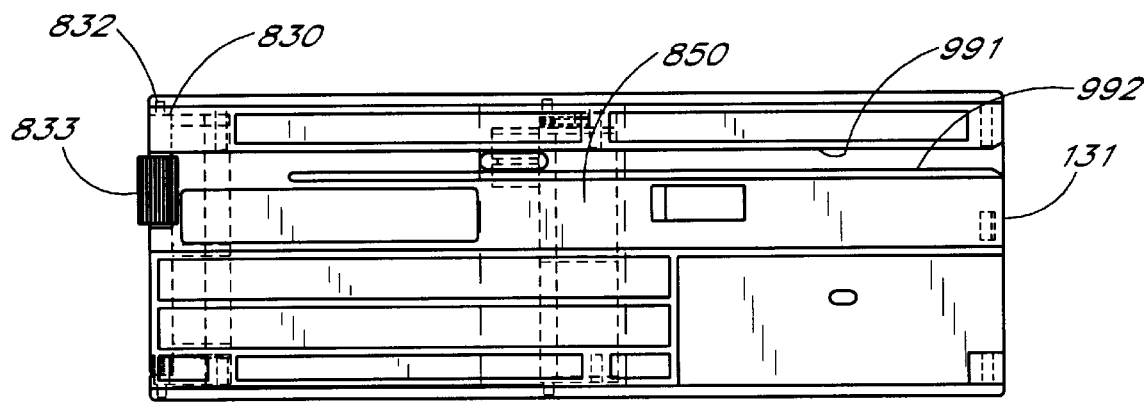
FIG. 18 is a left side view of the magazine.
Figure 19:
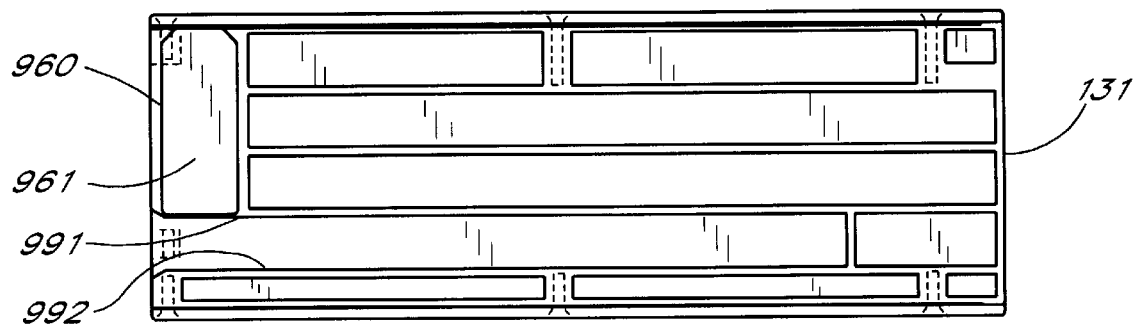
FIG. 19 is a right side view of the magazine.

As further illustrated in FIGS. 2C and 18, the right side 801 of the magazine 131 includes a flat portion 960 which receives a stick-on bar code label 961. The bar code label 961 is created to uniquely identify each magazine 131. For example, an eight-bit bar code can be used to uniquely identify up to 256 magazines. Additional bar code bits can be used to increase the number of magazines which can be uniquely identified. The elevator 202 includes a bar code sensor 962 (FIG. 6) mounted on the right side thereof. The bar code sensor 962 comprises two infrared transmitter/receiver pairs which are positioned so that as the elevator 202 moves upward and downward past the magazines 131–135, the bar code sensor 962 is able to read the bar codes on each magazine 131-135 and transmit the bar code signal back to the robotics control system 340 via a pair of signal lines 963 and 964. The robotics control system 340 decodes the bar code signal in a conventional manner.

Each of the magazine slots 125–129 further includes a microswitch 970 (a numeric identifier is shown only for the microswitch for the uppermost slot 125). The microswitch 970 has an actuator (not shown) which extends through the right side portion 122 of the inner frame 120. The microswitch 970 is normally open; however, when a magazine 131 is inserted in the slot 125, a protuberance 972 (FIG. 12A) on the left side of the magazine engages the actuator and closes the microswitch 970. Thus, a closed microswitch 970 for a slot 125–129 indicates that the a magazine 131–135 is in place in that particular slot.

Figure 12A:
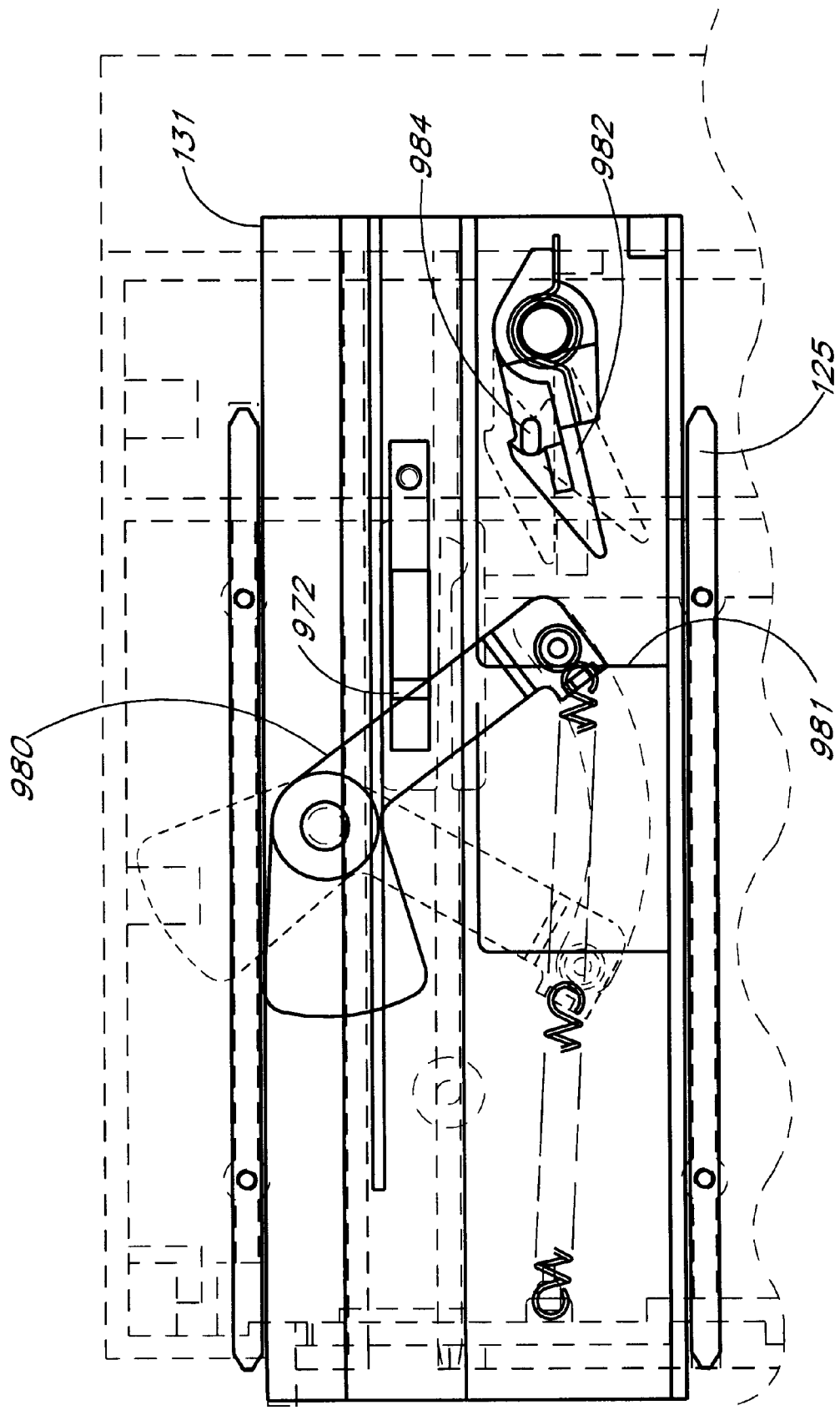
FIGS. 12A is an enlarged right view of the inner frame and the magazine illustrating the push to engage, push to release mechanism.

As illustrated in FIG. 12A, in preferred embodiments of the present invention, a spring-biasing mechanism 980 for each slot 125–129 pushes against a ridge 981 on the magazines 131–135 to provide a force to eject the magazines 131–135. A push-to-engage, push-to-release latch 982 is provided for each slot, and a protuberance 984 on each magazine 131–135 engages the latch 982 to hold the magazine 131–135 in place when inserted and to release the magazine 131–135 when pressure is again applied to the magazine. The latch 982 operates in a known manner and will not be discussed in detail herein. Alternatively, a manually operable latch (not shown) can be provided to hold each magazine 131–135 in place against the bias of the mechanism 980.

Figure 12B:
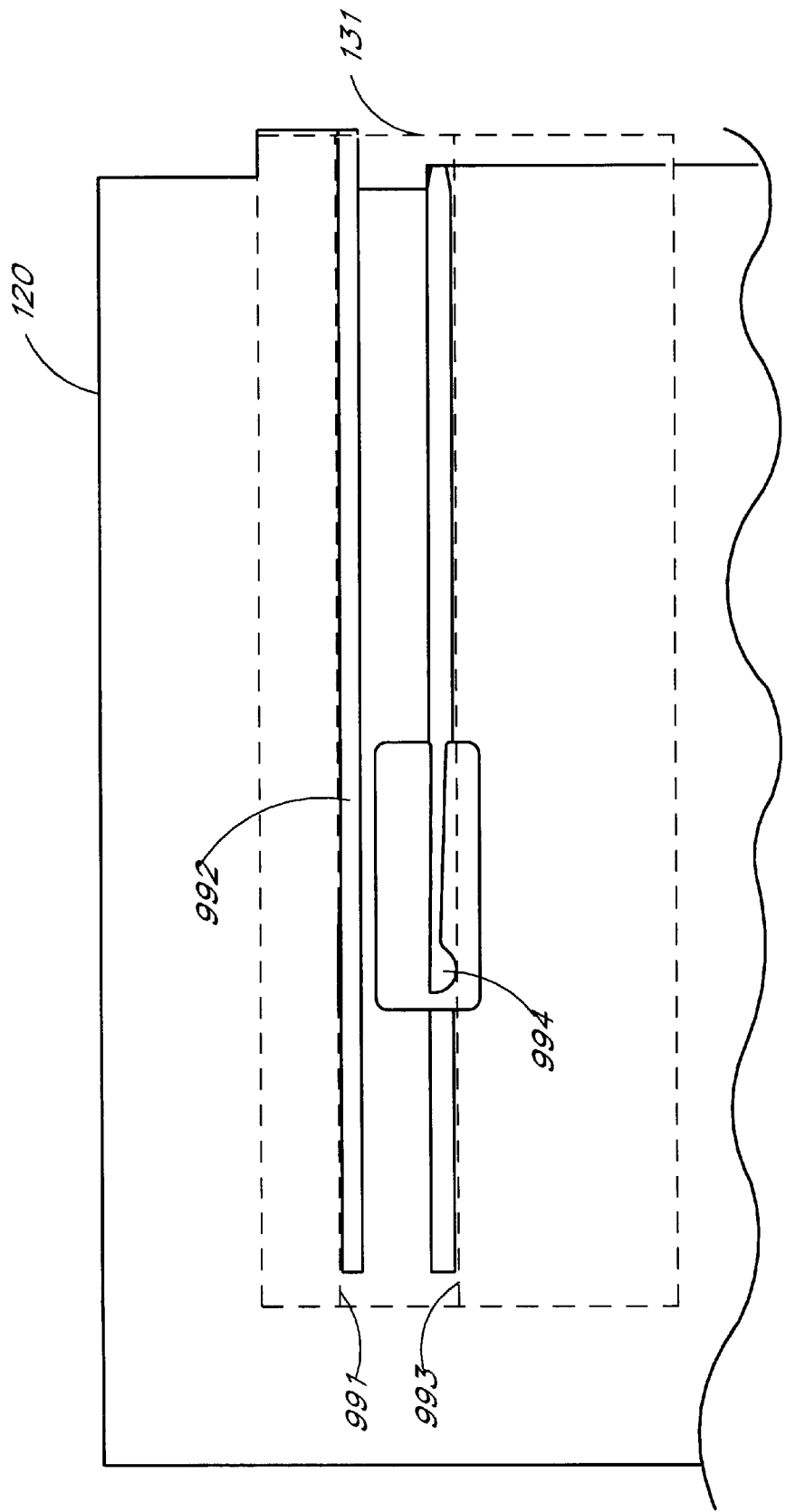
FIG. 12B is an enlarged right view of the inner frame and the magazine illustrating the spring-biasing mechanism which aligns the magazine with respect to the inner frame.

As illustrated in FIG. 12B, each of the magazines 131–135 is supported by a pair of upper rails 991 located on opposite sides of the magazine 131 and a pair of support rails 992 located at opposite sides of each of the slots 125–129 and forming part of the inner frame 120. Each magazine 131 also includes a pair of lower rails 993 located on opposite sides of the magazine 131 adjacent the upper rails 991. A pair of spring fingers 994 are located at opposite sides of each slot 125 on the inner frame 120 adjacent the support rails 992. The spring fingers 994 are generally parallel with the support rails 992 but are slightly offset so as to create a biasing force against the lower rails 993 of each magazine 131 to push the magazine 131 downward. This biasing force causes the magazine upper rails 991 to be forced against the support rails 992 of the inner frame 120. The ends of the magazine rails 991 and 993 are preferably beveled adjacent the rear portion 138 of the magazine to facilitate introduction of the magazine rails 991 and 993 above the support rail 992 and below the fingers 994 upon insertion of the magazine 131 into the slot 125. By supporting and biasing the sides of the magazines 131–135 in this manner, the location of the disk trays relative to the home position sensor 230 are accurately positioned for tray picking and disk lifting purposes because there is less variation in the sides of the magazine than the bottom of the magazine 131 when manufacturing the magazines.

Figure 22:
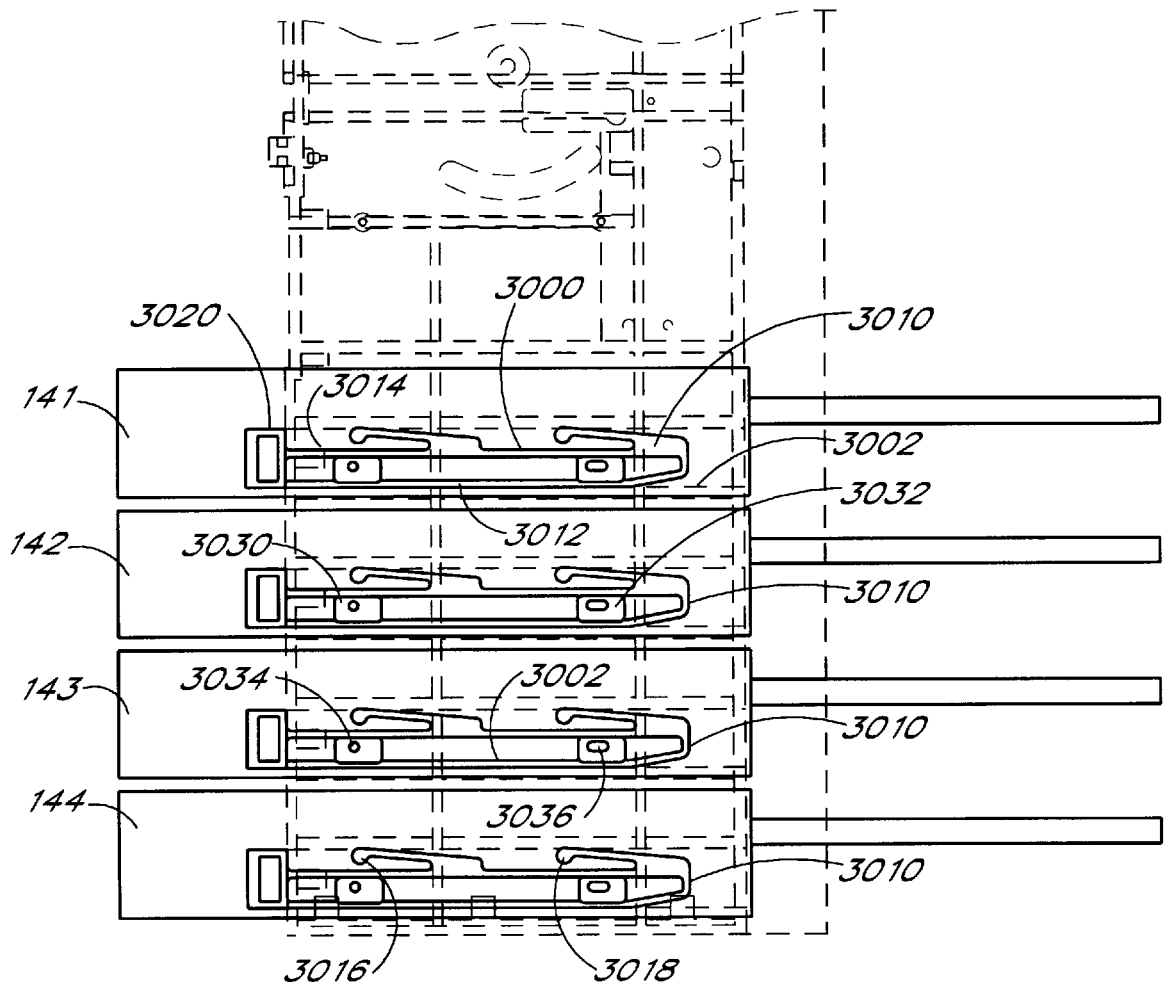
FIG. 22 is a side view of the inner frame and the drives showing the guide rails and mounting rails to support the drives in fixed relationship with the inner frame.

As illustrated in FIG. 22, the drives 141–144 are mounted in the inner frame 120 between an upper guide rail 3000 and a lower guide rail 3002 on each side of the enclosure. Only the guide rails on the right side of the enclosure are illustrated in FIG. 22. The guide rails on the left side are advantageously positioned similarly to the guide rails 3000, 3002. Each of the drives 141–145 has a mounting rail 3010 attached to each side of it. Only the right mounting rail 3010 is shown. The left mounting rail (not shown) has a configuration that is the mirror image of the configuration of the right mounting rail 3010. The mounting rail 3010 has a horizontal bottom rail portion 3012 which lies flat against the lower guide rail 3002 to provide an accurate reference for the mounting rail 3010 with respect to the inner frame 120. The mounting rail has a middle portion 3014. Two leaf-spring members 3016 and 3016 are attached to the middle portion 3014. The leaf-spring members 3016, 3018 are formed to extend from the middle portion 3014 by a sufficient amount such that when the mounting rail 3010 is positioned between the upper guide rail 3000 and the lower guide rail 3002, the leaf-spring members 3016, 3018 push against the upper guide rail 3000 and force the bottom rail portion 3012 in firm, even engagement with the lower guide rail 3002. The mounting rail 3010 further includes a front ear 3020 which includes a screw hole (not shown) through which a screw (not shown) is inserted to fasten the mounting rail 3010 to the inner frame 120. The opposite guide rail (not shown) includes a corresponding ear (not shown). Thus, when the mounting rail 3010 is inserted between the upper guide rail 3000 and the lower guide rail 3002 and the front ear 3020 is fastened to the inner frame 120, and the corresponding opposite mounting rail (not shown) is likewise inserted between the opposite upper and lower guide rails (not shown), and the two ears are fastened to the inner frame 120, the drive 141–144 is positioned in a predetermined known location with respect to the inner frame 120. Thus, when the drawer 150 of a drive 141–144 is extended the drawer 150 will be accurately positioned to receive a disk 140 from the lifter assembly 252.

Because, the drives from various manufacturers may have different dimensions, the mounting rails 3010 are uniquely configured to adapt each particular drive to the inner enclosure 120. In particular, the mounting rail 3010 has a first mounting plate 3030 and a second mounting plate 3032 into which respective screw holes 3034 and 3036 are formed. The screw holes 3034, 3036 are spaced apart from each other to match the spacing on the particular drive for which the mounting rail 3010 is intended. Further, the screw holes 3034, 3036 are uniquely positioned with respect to the ear 3020 and with respect to the bottom rail 3012 for each particular drive such that when the drive is secured to the inner frame, as described above, the center of the disk opening in the drawer of each drive is the same regardless of the manufacturer of the drive.

The above-described disk transport mechanism is sufficiently compact that the five magazines 131–135, the four drives 141–144, the transport mechanism 200 and the circuit board 342, and an optional hard disk drive (not shown) is enclosed within an enclosure having dimensions of approximately 25 inches high, by 18 inches deep, by 8 inches wide, which is approximately the size of a conventional tower enclosure for commercially available microprocessor-based computer systems. Thus, the present invention can readily be installed in an office or residence without requiring significant floor, desk or shelf space.

FIG. 23 (comprising FIGS. 23A–23E) illustrates the robotics control system 340. As illustrated in FIG. 23A, the robotics control system 340 comprises a microprocessor (i.e., central processing unit (CPU)) 1000, which, in the preferred embodiment, is a commercially available 80C188 microprocessor. The microprocessor 1000 has an eight-bit address and data bus 1001. The microprocessor 1000 also has an eight bit address bus 1002 which is shown as an address/control bus to indicate that other control signals not specifically discussed herein are also generated by the microprocessor 1000. The address and data bus 1001 is provided as in input to an address latch 1003 which is gated by an address latch enable (ALE) signal on a line 1004 when the address and data bus 1001 is transmitting address information. The output of the address latch 1003 is provided on an eight-bit address bus 1005 which is combined with the address/control bus to provide a address control bus 1006 which includes sixteen address bits in addition to the control bits. In addition to the address latch enable signal, the microprocessor 1000 also generates a read signal (*RD)

on a line 1010 and a write signal (*WR) on a line 1011. (The "*" in front of the signal mnemonic indicates that the signal is an active low signal.)

The address and control bus 1006, the data bus 1001, the read signal line 1010 and the write signal line 1011 are provided as inputs to a random access memory (RAM) 1020, which operates in a nonvolatile fashion, as described below, and to a flash RAM 1021. The RAM 1020 operates in a conventional manner to store data from the microprocessor 1000 in response to write requests and to send data to the microprocessor in response to read requests. As indicated, the RAM 1020 is provided with power on a power line 1022 from a voltage source indicated as VBB. The voltage source will be described below. Briefly, the voltage source VBB is provided by a battery controller 1030 (FIG. 23E) which maintains the power on the RAM 1020 even when main system power is off. Thus, the RAM 1020 is considered to be a nonvolatile RAM because it does not lose its data when the main power is turned off. In the preferred embodiment, the RAM 1020 is a commercially available CXK58257AM-85LL static RAM from Sony.

The flash RAM 1021 stores the main program for the microprocessor 1000. The flash RAM 1021 provides nonvolatile storage of program data, but is selectively rewritable in a conventional manner to enable new programs to be downloaded via the SCSI bus. Alternatively, if rewritability is not required, a programmable read only memory (PROM) or other nonvolatile memory device can also be used. In the preferred embodiment, the flash RAM 1021 is a commercially available AT29C512 64K×8 flash RAM from ATMEL.

The microprocessor has an input/output port which receives the two tachometer sensor signals on the lines 380E and 380F, two bar code signals on the lines 963, 964, and the SCSI identification input signals from the SCSI identification selector 370 via a set of lines 1034. In the preferred embodiment, the SCSI identification selector 370 comprises a conventional thumbwheel switch (not shown) which permits selection of three bits to thereby provide a total of eight possible SCSI IDs. As further illustrated in FIG. 23A, the microprocessor receives a SCSI interrupt signal via a line 1036 and receives a door open interrupt signal via a line 1038. The SCSI interrupt signal is generated by a SCSI controller described below in connection with FIG. 23B. The door open interrupt signal is generated by a microswitch (not shown) activated by opening the upper door 160 to the magazines, as described above.

Figure 23A:
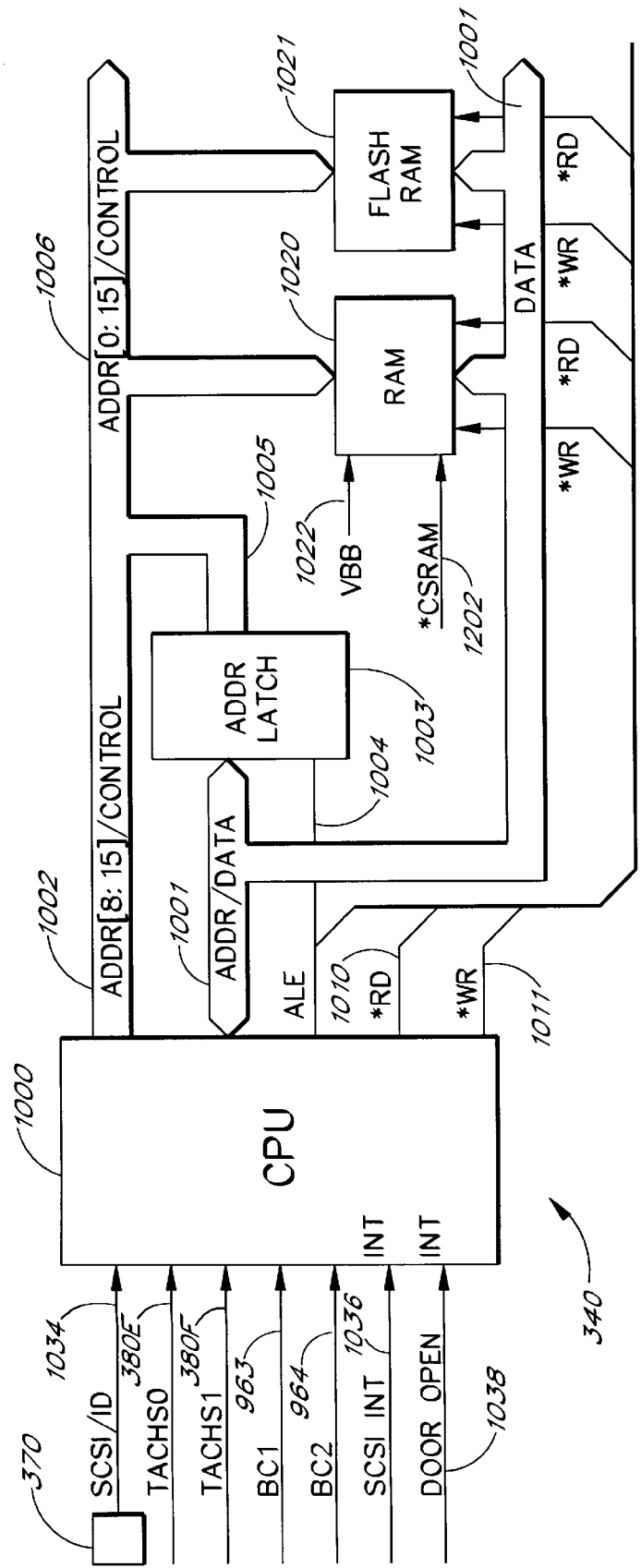
FIGS. 23A–23E are block diagrams of the electronic components of robotics control system of the present invention.

One skilled in the art will appreciate that the 80C188 microprocessor requires a clock input which is not shown in FIG. 23A, and will further appreciate that the microprocessor 1000 generates and receives other signals which are not specifically described herein.

Figure 23B:
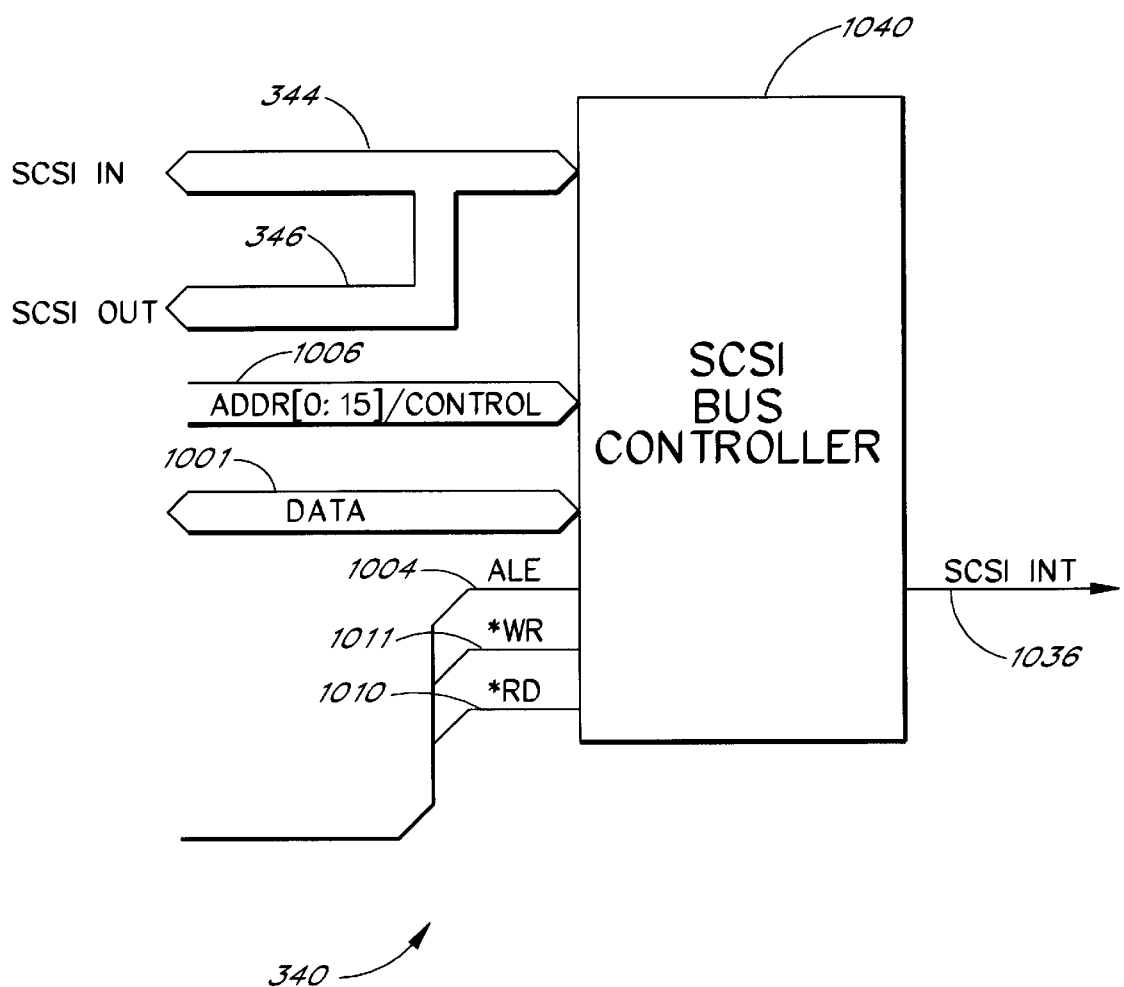
Figure 23C:
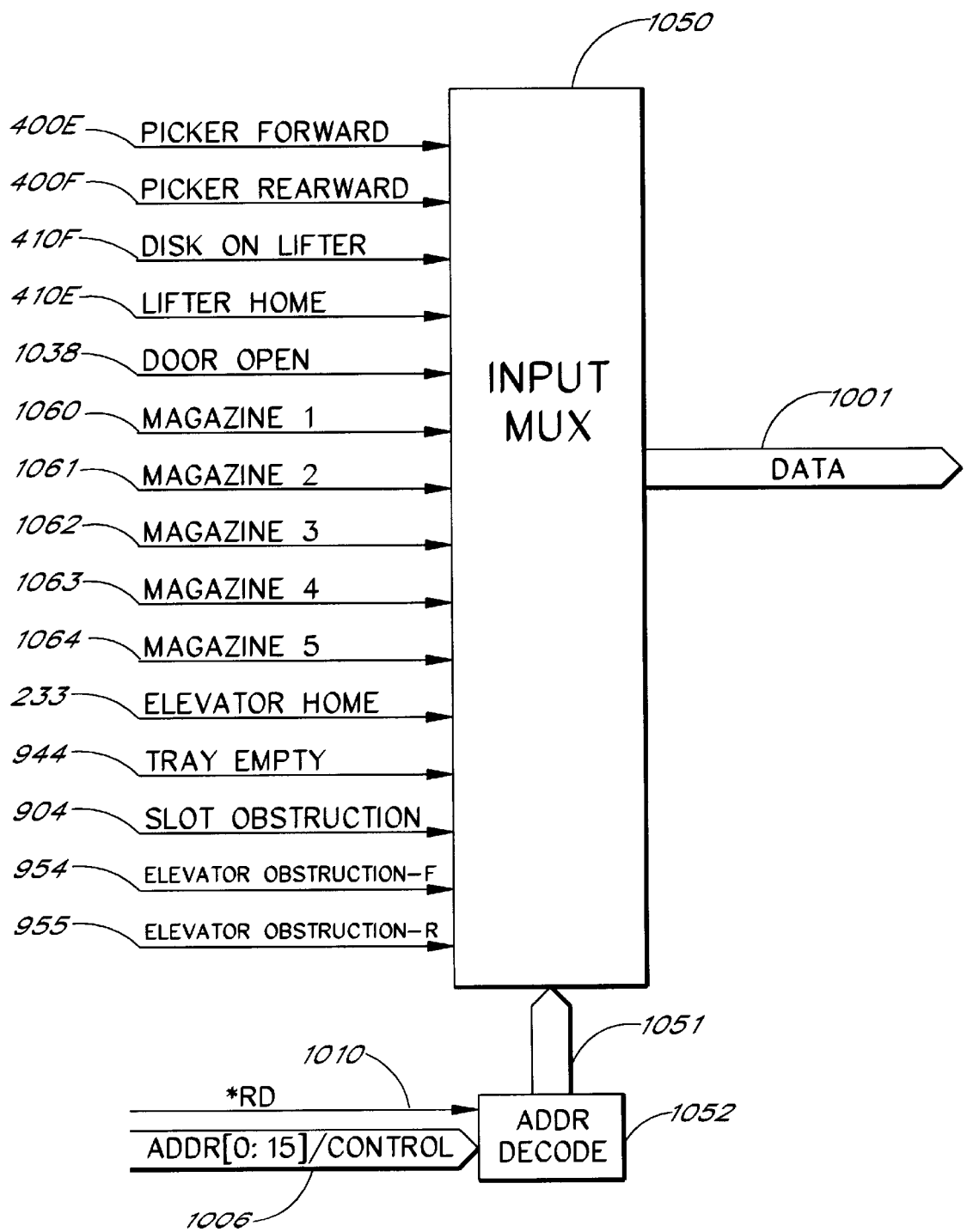

FIG. 23B illustrates a SCSI bus controller 1040 in accordance with the present invention. The SCSI bus controller 1040 is a conventional SCSI bus controller, such as, for example, a commercially available 53CF92 controller from Symbios. The SCSI bus controller 1040 receives data and control signals from the SCSI bus input connector 344. The SCSI bus controller 1040 further receives address and control signal on the bus 1006 and receives and transmits data signals on the bus 1001. The SCSI bus controller 1040 further receives the address latch enable signal, the write signal and the read signal on the lines 1004, 1011 and 1010, respectively. The SCSI bus controller 1040 generates the SCSI interrupt on the signal line 1036 to signal the microprocessor 1040 when the SCSI bus controller 1040 needs to communicate with the microprocessor 1000. The SCSI bus controller 1040 operates in a conventional manner to receive setup commands from the microprocessor 1000, such as, for example, a command communicating a SCSI ID to the SCSI bus controller 1040. The SCSI bus controller 1040 operates as an interface to transfer data between the SCSI bus and the microprocessor 1000. In particular, computer system 322 sends commands to the microprocessor 1000 via the SCSI bus to request the microprocessor 1000 to perform the elevator movement, tray picking and disk lifting and lowering operations described herein. In addition, the microprocessor 1000 transfers status and other information (e.g., disk present status, magazine in/out status, bar code information, etc.) to the computer system 322 in response to status or information requests from the computer system 322. The operation of the SCSI bus controller 1040 is well known to the art and will not be discussed in detail herein.

FIG. 23C schematically illustrates an input multiplexer 1050 which is responsive to selection and enable signals on lines 1051 from an address decoder 1052 which decodes the address and control signals from the microprocessor 1000 on the bus 1006. When selected by selected combinations of addresses on the bus 1006 when the read signal on the line 1010 is active, the multiplexer 1050 outputs selected ones of its input signals onto the data bus 1001 so that the signals can be read by the microprocessor 1000. As illustrated, the multiplexer 1050 receives the picker forward sensor signal on the line 400E, the picker rearward sensor signal on the line 400F, the disk on lifter signal on the line 410F, the lifter home signal on the line 410E, the door open signal on the line 1038, the magazine 1 in place signal on a line 1060, the magazine 2 in place signal on the line 1061, the magazine 3 in place signal on the line 1062, the magazine 4 in place signal on the line 1063, the magazine 5 in place signal on the line 1064, the elevator home signal on the line 233, the tray empty signal on the line 944, and the slot obstruction signal on the line 904. Thus, the microprocessor 1000 is able to monitor the status of the various components of the present invention via the multiplexer 1050. In preferred embodiments, the input multiplexer 1050 comprises a plurality of 74ALS244 tri-state bus drivers having eight bits each. The address decoder 1052 selectively enables one of the bus drivers at a time to propagate its respective data inputs onto the data bus 1001.

Figure 23D:
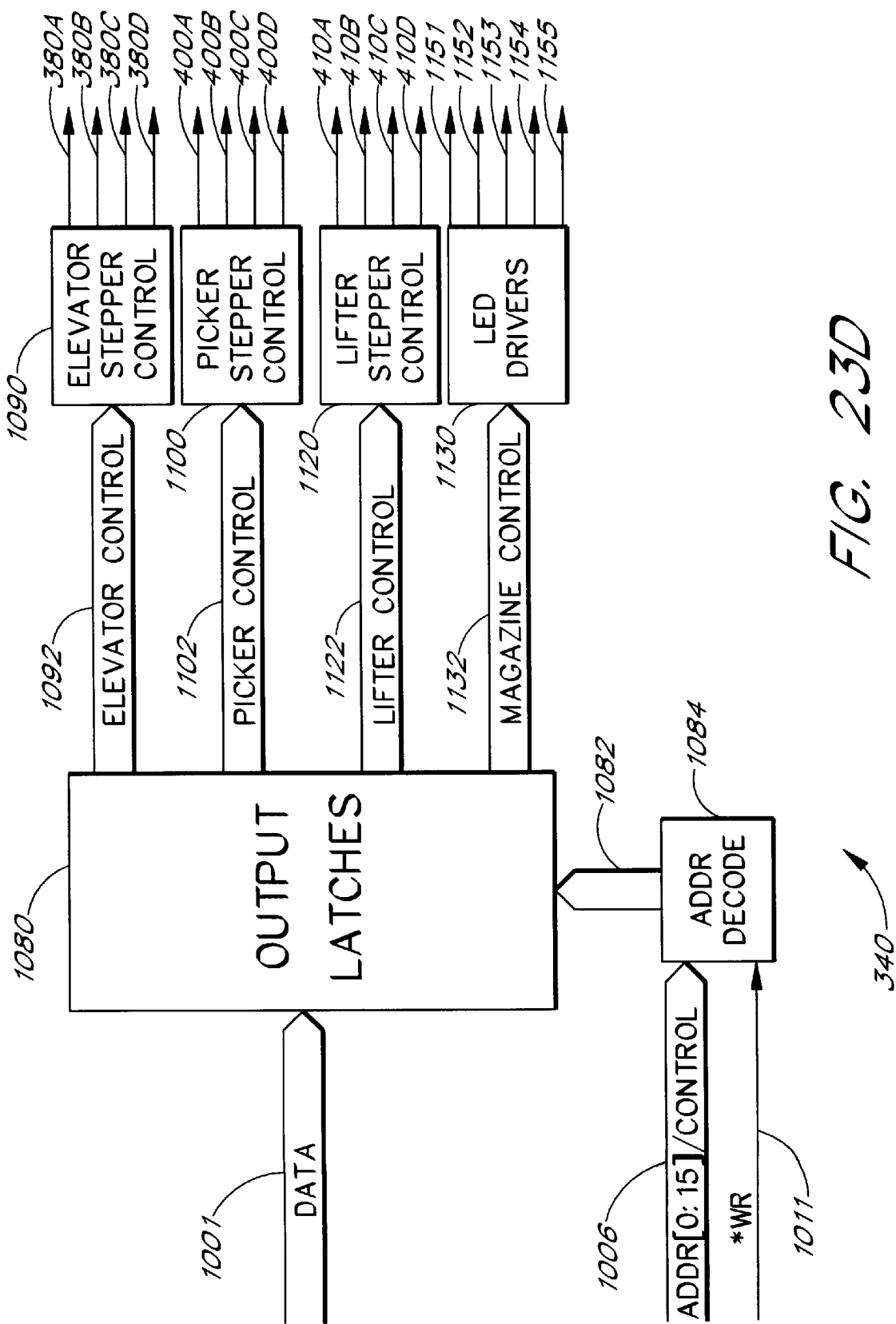

FIG. 23D illustrates the primary output systems in the robotics control system 340. A set of output latches 1080 have inputs connected to the data bus 1001. The output latches 1080 are controlled by control signals on a set of lines 1082 from an address decoder 1084. The address decoder 1084 is controlled by the address bus 1006 and the write signal on the line 1011 so that it generates latching signals to the latches 1080 in response to particular addresses when the write signal is active. In particular, the output latches 1080 generate stepping signals to an elevator stepper control system 1090 via a set of elevator control lines 1092. The elevator control system 1090 is responsive to the stepping signals to generate the motor stepping signals on the lines 380A, 380B, 380C and 380D. In the preferred embodiment, the elevator control system 1090 comprises a conventional L297 stepper motor controller (not shown) commercially available from SGS Thomson which generates the four stepper motor phases and a commercially available SI9942DY buffer (not shown) from Siliconix for each phase to provide the current needed to drive the elevator stepper motor 220.

Similarly, the output latches 1080 generate stepping signals to a picker stepper control system 1100 via a set of picker control lines 1102. The picker control system 1100 is responsive to the stepping signals to generate the motor stepping signals on the lines 400A, 400B, 400C and 400D. In the preferred embodiment, the picker control system 1100 comprises a conventional MC3479 stepper motor controller (not shown) commercially available from Motorola which generates the four stepper motor phases and a commercially available SI9942DY buffer (not shown) from Siliconix for each phase to provide the current needed to drive the picker stepper motor 478.

Similarly, the output latches 1080 generate stepping signals to a lifter stepper control system 1120 via a set of lifter control lines 1122. The lifter control system 1120 is responsive to the stepping signals to generate the motor stepping signals on the lines 410A, 410B, 410C and 410D. In the preferred embodiment, the lifter control system 1120 comprises a conventional MC3479 stepper motor controller (not shown) commercially available from Motorola which generates the four stepper motor phases. In the preferred embodiment, the stepper motor phases are provided directly to the lifter stepper motor 512 directly without buffering.

The output latches 1080 also control a set of magazine LED drivers 1130 via a set of magazine active control lines 1132. The control lines are activated to indicate when a disk 140 has been removed from its respective tray 139, 770. When a control line is active, a driver (e.g., a conventional 7406 driver) supplies current to respective LEDs 1136 located on the front of the inner frame 120 proximate to the magazine slots 125–129 (see FIG. 1) via lines 1151, 1152, 1153, 1154, 1155 to indicate that the respective magazine 131–135 is in use and that the magazine should not be removed by the user.

Figure 23E:
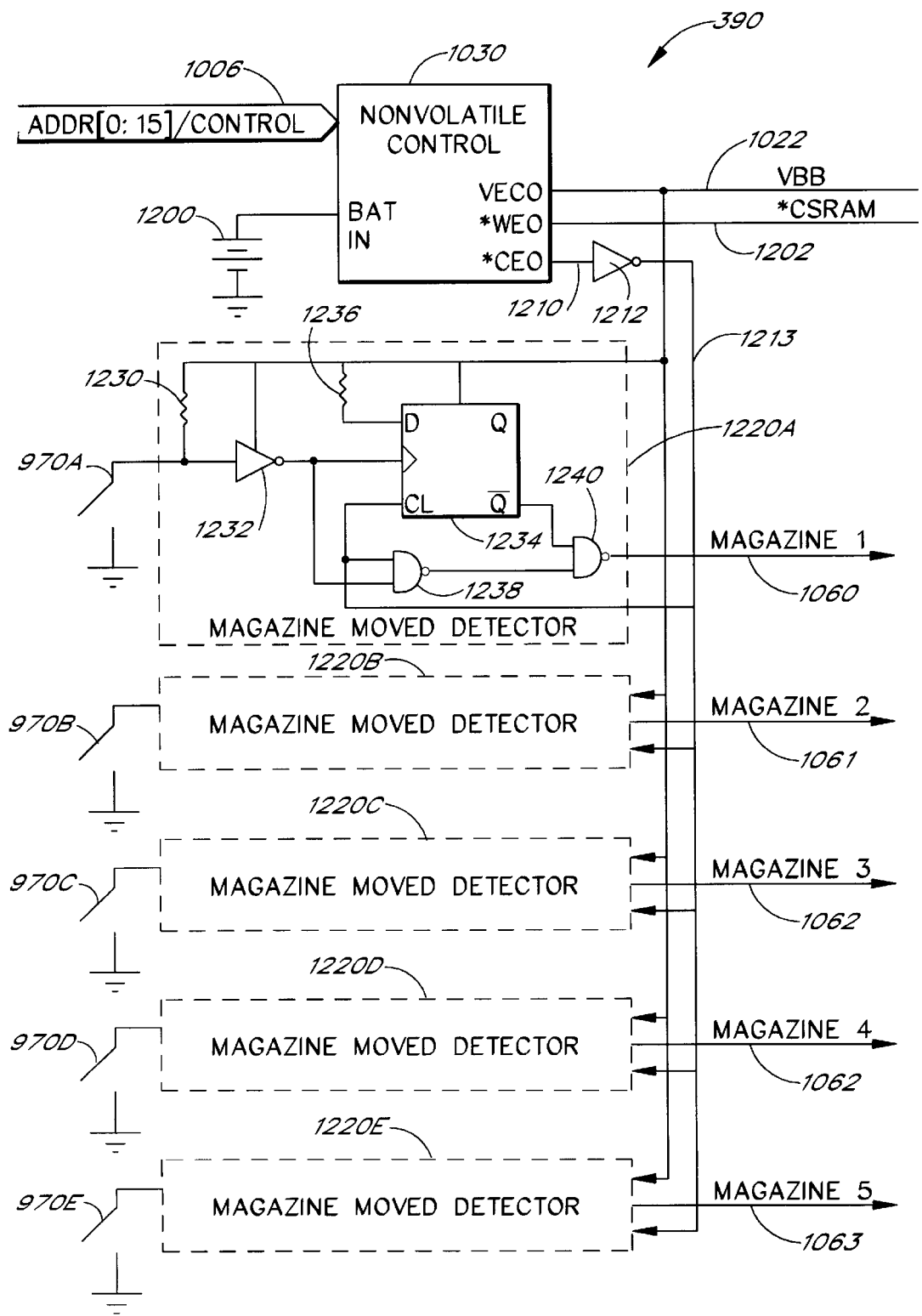

FIG. 23E illustrates the magazine in place logic. It comprises the nonvolatile controller chip 1030, such as, for example, a commercially available Dallas Semiconductor DS1234. The controller chip 1030 receives address and control signals via the address and control bus 1006 and receives a voltage input from a battery 1200. The controller chip 1030 provides the battery backup voltage VBB as an output on the line 1022. The controller chip 1030 also provides a nonvolatile RAM chip select (*CSRAM) signal on a line 1202. The chip select signal is a controlled signal responsive to a corresponding signal on the address and control bus 1006; however, it is selectively disabled by the controller chip 1030 when the battery backup voltage VBB is being provided by the battery 1200 rather than normal system power.

The controller chip 1030 further provides an active low output signal on a line 1210 which is inverted by an inverter 1212 to generate an active high reset signal on a line 1213. The reset signal is generated when a selected combination of address and control signals are provided on the address and control bus 1006. The purpose of the reset signal will be explained below.

The microswitches 970 (designated as 970A, 970B, 970C, 970D and 970E in FIG. 23E) are closed when the magazines 131–135 are in their respective slots 125–129. The microswitches 970 are connected to respective magazine moved detectors 1220A, 1220B, 1220C, 1220D and 1220E wherein the logic details are shown for the detector 1220A. The details for the other detectors are the same and are not shown. The detector 1220A comprises a pullup resistor 1230 connected from the microswitch 970A to the voltage VBB. The microswitch 970A is further connected to the input of an inverter 1232 which is powered by the voltage VBB. The output of the inverter 1232 is provided as a clock input to a D-flip-flop 1234 which is also powered by the voltage VBB.

The D input of the D-flip-flop 1234 is connected to the voltage VBB via a resistor 1236 The output of the inverter 1232 is also provided as one input to a first NAND gate 1238 which has a second input connected to the reset signal on the line 1213. The reset signal is also connected to the clear input of the D-flip-flop 1234. The output of the first NAND gate 1238 is connected to one input of a second NAND gate 1240. A second input of the second NAND gate 1240 is connected to the inverting ($\overline{Q}$) output of the D-flip-flop 1234. Any time the microswitch 970A is switched from its open condition to its closed position, the input to the inverter 1232 is connected to logic ground to cause its output to switch to a high state and thus switches the clock input of the D-flip-flop 1234. The switching to a high state causes the D-flip-flop 1234 to clock a logic "1" from its D-input to its Q output and thus to clock a logic "0" to its $\overline{Q}$ output. The output of the second NAND gate 1240 is forced to a logic "1" to cause the magazine 1 line 1060 to be high to indicate that the first magazine 131 is in place. During normal operation, the reset signal on the line 1213 is activated to clear the D-flip-flop 1234 to clear the magazine in place signal on the line 1060. If the magazine 131 is removed and replaced, the microswitch 970A will first open to cause the clock input to the D-flip-flop 1234 to go low and will then close to again clock the D-flip-flop to activate the magazine 1 signal. Because the microswitch 970A, the inverter 1232 and the D-flip-flop 1234 are powered by the voltage VBB which remains active even when the main system power is powered off, the removal and insertion of a magazine while the power is off will be detected and clocked into the D-flip-flop 1234. Thus, when the power is restored and the NAND gates 1238 and 1240 are again operational, the microprocessor 1000 can read the magazine lines 1060–1065 via the input multiplexer 1050 to determine if any of the magazines 131–135 were removed and replaced when the power was off. Thus, the computer system 322 can be informed that the magazines 131–135 in the slots 125–129 following the restoration of power may not be the same as before power was turned off. The computer system 322 can then initiate an inventory of the magazines (e.g., by reading the bar codes) to determine which magazines 131–135 are in the slots 125–129.

Figure 24:
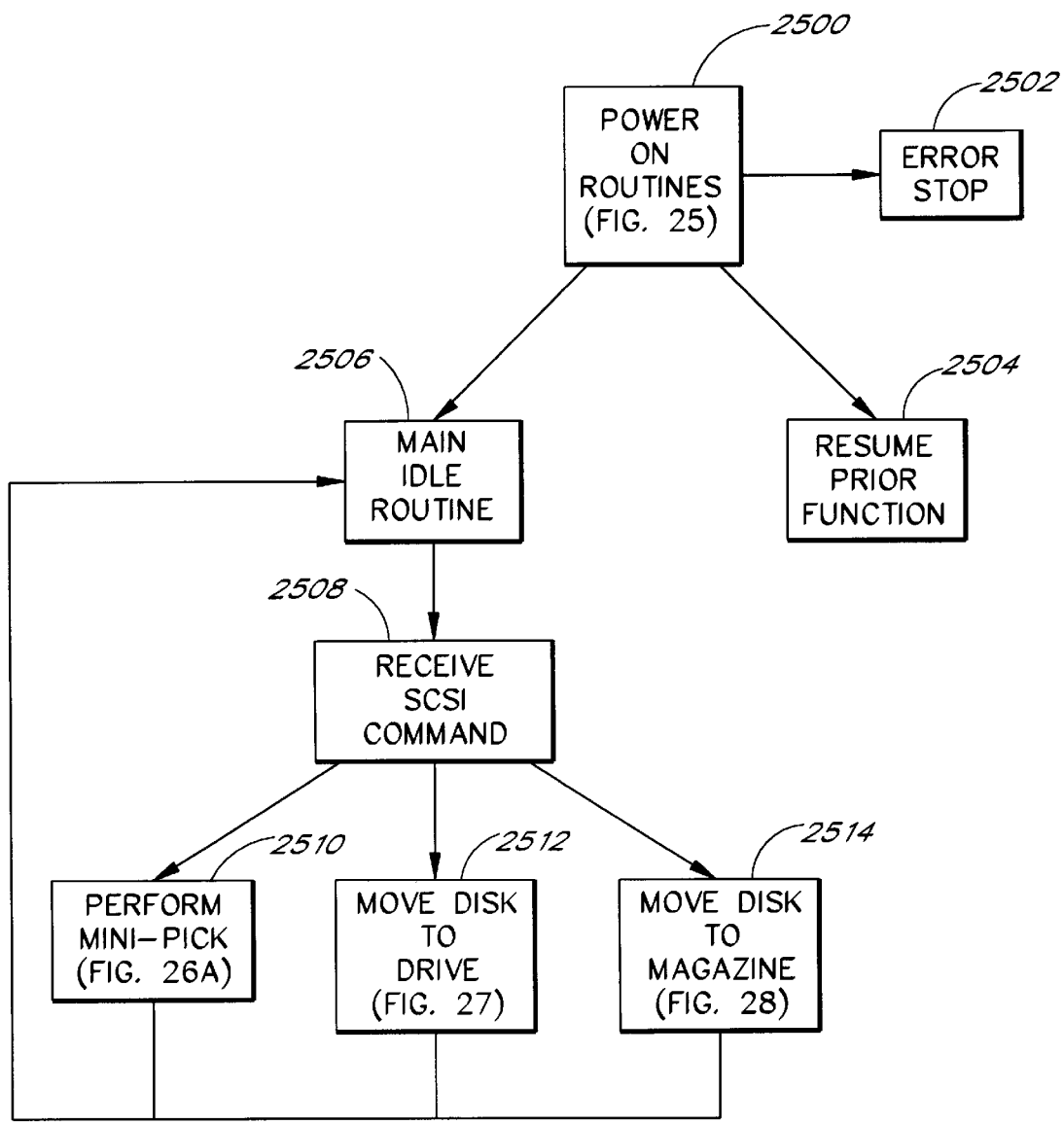
FIGS. 24–28 are flow charts of the principal operations of the present invention.

The operation of the present invention is illustrated in the flow charts of FIGS. 24–28. FIG. 24 represents a flow chart of the overall operation of the microprocessor 1000. As illustrated, when the present invention is powered on, the microprocessor 1000 first performs a series of power-on routines represented by a block 2500 in FIG. 24A. More detail regarding the power-on routines will be provided in FIG. 25, discussed below. As a result of the execution of the power-on, the microprocessor 1000 will enter an error stop routine 2502 if the operations in the power-on routine were not completed successfully. If the operations in the power-on routine 2500 were completed successfully, the microprocessor 1000 checks to determine whether the microprocessor 1000 was in the process of performing a function when power was turned off. If so, the microprocessor 1000 enters a resume prior function routine 2504 which will be described below in more detail.

If the microprocessor 1000 completes the operations of the power-on routine 2500 successfully and if no operations were in progress when power was turned off, the microprocessor 1000 enters a main idle routine 2506 wherein it waits for a command from the SCSI bus via the SCSI bus controller 1040 requesting it to perform a particular operation. The microprocessor 1000 responds to an interrupt from the SCSI controller 1040 to decode a command in a routine 2508. For example, the microprocessor 1000 can be commanded to perform a mini-pick operation, as represented by a block 2510 and as described below in connection with FIG. 26. (The mini-pick operation enables the microprocessor 1000 to quickly inventory the trays in a magazine and determine which trays have disks in them.) The microprocessor 1000 can also be commanded to move a disk from a magazine tray to a drive drawer, as represented by a block 2512 and as described below in connection with FIG. 27. The microprocessor 1000 can also be commanded to move a disk from a drive drawer to a magazine tray as represented by a block 2514 and as described below in connection with FIG. 28. Other operations can also be performed in response to commands received on the SCSI bus, such as, for example, returning the status of the various sensors in the enclosure, however, such operations are straightforward and will not be described herein.

Figure 25A:
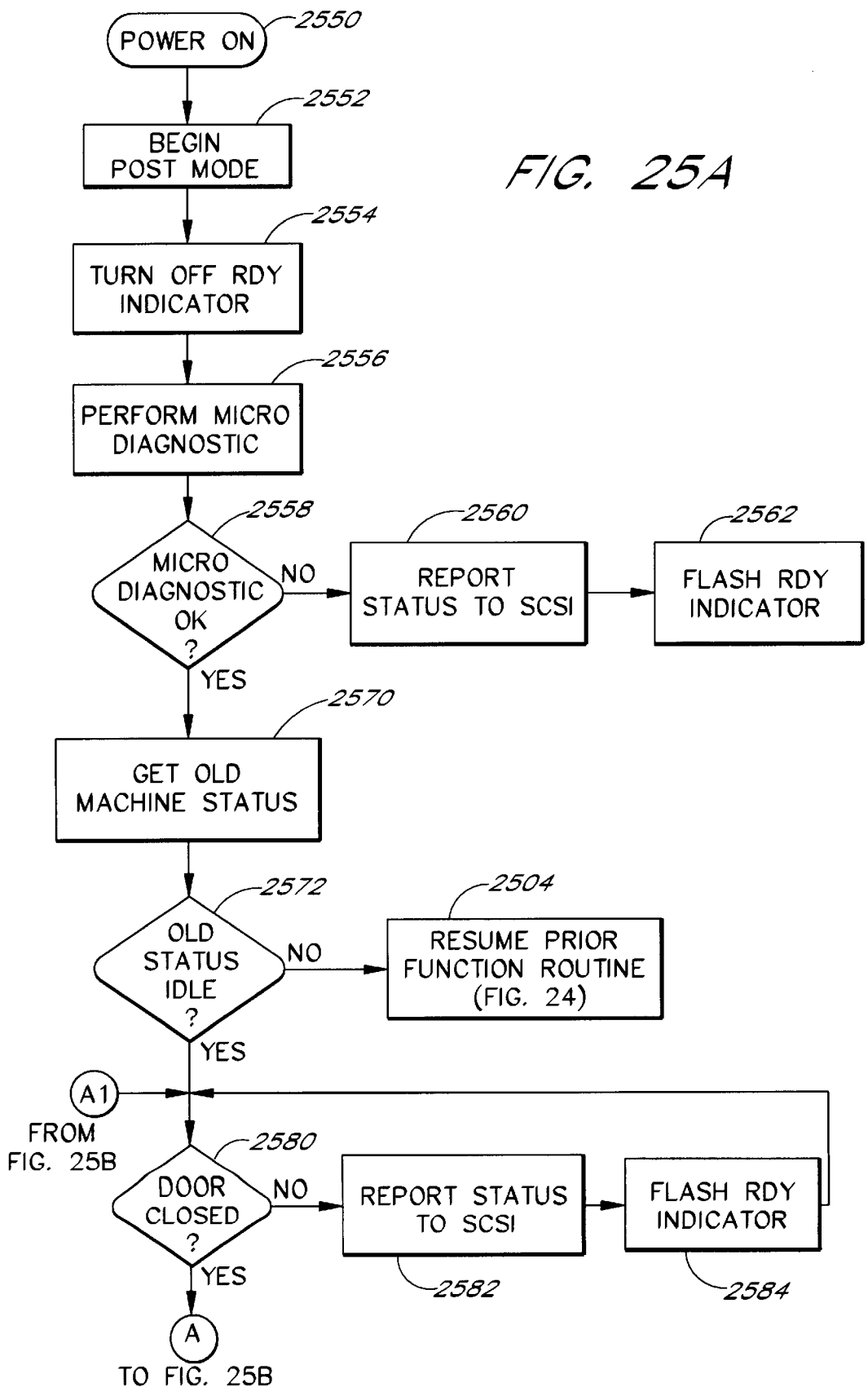
Figure 25B:
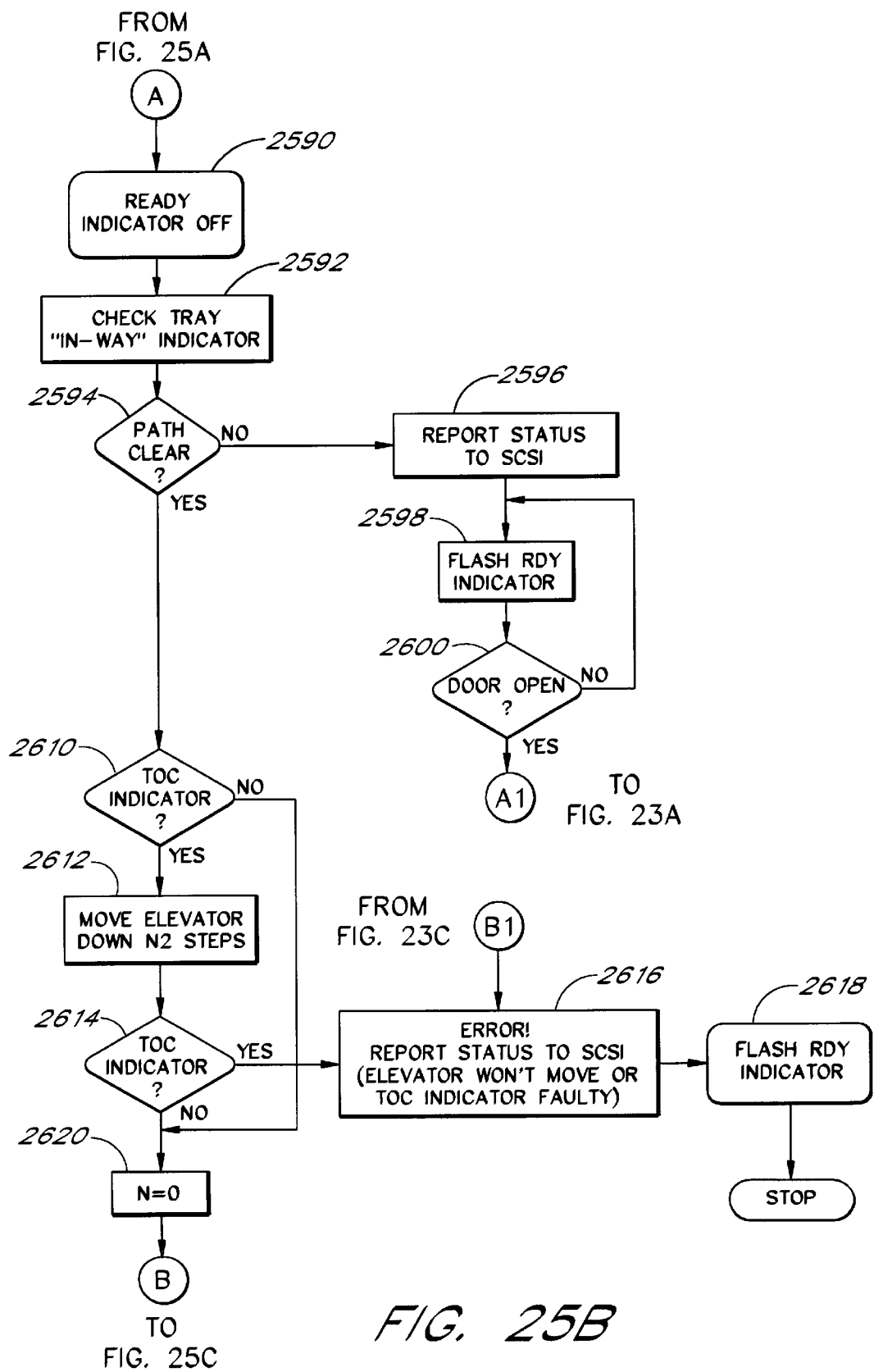
Figure 25C:
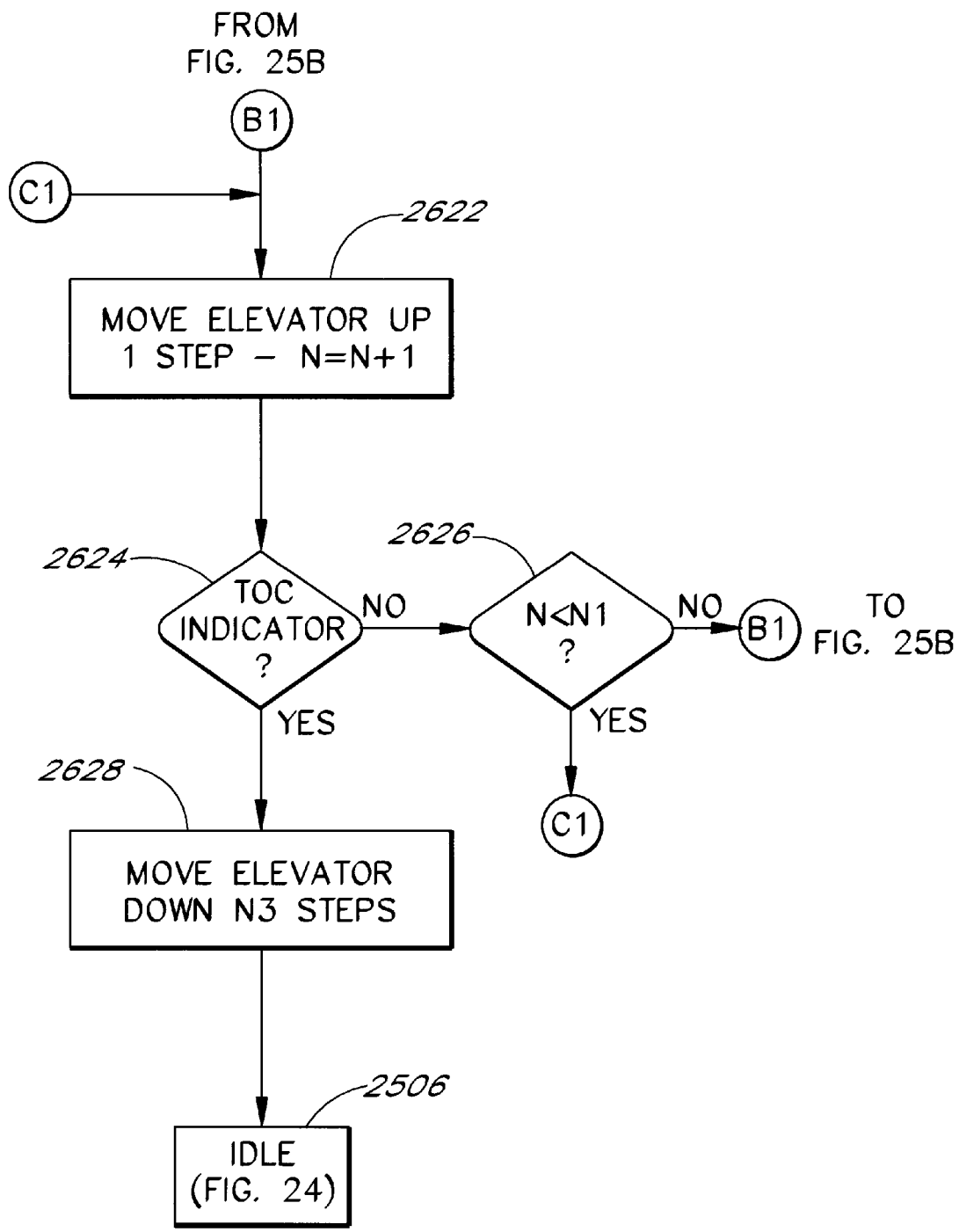

The power-on routine 2500 is shown in more detail in FIGS. 25A, 25B and 25C. The microprocessor 1000 enters the power-on routine 2500 via an power-on entry point 2550 (FIG. 25A). The microprocessor 1000 then begins operations in a power-on self-test (POST) mode 2552 wherein various diagnostics are performed on the microprocessor 1000 and the RAMs 1020, 1021 to assure that they are working properly. Among other operations, in a routine 2554, the microprocessor 1000 outputs a command to a ready (RDY) indicator (e.g., an LED (not shown) on the front panel of the enclosure) to turn off the ready indicator to show that the system is not currently ready to operate. This ready indication is also advantageously provided as a status bit to the SCSI bus controller 1040 so that the ready status can be communicated to the computer system 322 when requested.

After turning off the ready indicator, the microprocessor 1000 performs the microdiagnostics described above (i.e., the processor and RAM tests) in a routine 2556. After performing the diagnostics, the microprocessor 1000 determines whether the diagnostics have passed or failed in a decision block 2558. If the diagnostics have failed, the microprocessor 1000 enters a routine 2560 wherein the diagnostic failure is reported as a status input via the SCSI bus controller 1040. Also, in a routine 2562, the microprocessor 1000 causes the ready indicator to flash (i.e., turns the LED on and off repeatedly) to inform the user that the system is not operating properly.

If the diagnostics pass, the microprocessor 1000 enters a routine 2570 wherein it reads the status of the previously performed operations. As the microprocessor 1000 performs the operations described below, it keeps track of where it is in the operations by writing status information to selected locations in the nonvolatile RAM 1020. As discussed above, the nonvolatile RAM 1020 is powered by the backup voltage VBB and thus does not lose data when the system power is turned off. Thus, when the power is restored, the microprocessor 1000 reads the selected locations of the nonvolatile RAM 1020 to determine whether the status information stored therein indicates that an operation was in progress when power was turned off. It should be understood that when an operation is completed, the microprocessor 1000 clears all status information in the nonvolatile RAM 1020 related to the completed operation and sets an idle status indicator (not shown) in a predetermined location in the nonvolatile RAM 1020 to indicate that no operation is in progress. Thus, in the routine 2570, the microprocessor 1000 reads the idle status location, and, in a decision block 2572, the microprocessor 1000 determines whether the idle status was idle or not idle. If the idle status was not idle, the microprocessor 1000 enters the resume prior function routine 2504 which will be described below in connection with FIG. 29.

If, in the decision block 2572, the microprocessor 1000 determines that the previous idle status was idle, then the microprocessor 1000 begins performing a series of operations to initialize the system and to check the integrity of the system. In particular, the microprocessor 1000 first checks to determine whether the door 160 to the magazines 131–135 is closed in a decision block 2580. If the door is not closed, the microprocessor 1000 performs a routine 2582 wherein it may report the door open status to the SCSI bus controller 1040 and then flashes the ready indicator LED (not shown) in a routine 1084. Because the user may close the door at any time, the microprocessor 1000 returns to the decision block 2580 and checks the door being closed repeatedly until the door is closed. Each time the microprocessor 1000 passes through the routine 1084, it determines whether sufficient time has elapsed to change the state of the ready indicator. One skilled in the art will appreciate, the ready indicator is flashed at a sufficiently slow rate that the flashing can be perceived by the user. The microprocessor 1000 delays for a sufficient amount of time in the routine 1084 to control the flash rate.

If, in the decision block 2580, the microprocessor 1000 determines that the door is closed, the microprocessor 1000 proceeds to a routine 2590 (FIG. 25B) wherein the ready indicator is turned off to indicate that the system is not yet ready for operation. Then, in a routine 2592, the microprocessor 1000 checks the output of the infrared receiver 902 to verify that the notches 762 are properly aligned. Then, in a decision block 2594, the microprocessor 1000 determines whether the output indicates whether the light path through the notches is clear or blocked. If the light path is blocked, the trays are not properly aligned and the elevator cannot be moved safely. The microprocessor 1000 proceeds to a routine 2596 wherein it reports the status to the SCSI controller 1040. The microprocessor 1000 then proceeds to a routine 2598 wherein it flashes the ready indicator (not shown). Thereafter, in a decision block 2600, the microprocessor 1000 checks to determine if the door is open. If the door is not open, the microprocessor 1000 returns to the routine 2598 wherein it changes the state of the ready indicator, after an appropriate delay. The microprocessor 1000 continues to check the door and flash the ready indicator until the door is opened by the user because it is necessary for the user to open the door and remove the magazines to push all the trays back into the respective magazines.

When, in the decision block 2600, the microprocessor 1000 determines that the door has been opened, the microprocessor returns to the decision block 2580 (FIG. 25A) wherein it repeatedly checks for the door being closed, reports the door open status to the SCSI bus controller 1040 and flashes the ready indicator, as described above. When the door is closed (after the user has aligned the trays in the magazines), the microprocessor 1000 again proceeds to the routines 2590, 2592, and, if the trays are properly aligned, proceeds from the decision block 2594 to a decision block 2610. In the decision block 2610, the microprocessor 1000 checks the home position sensor 230 (also referred to as a top of carriage (TOC) indicator) to determine if the elevator 202 is at the home position. If so, the microprocessor 1000 proceeds to a routine 2612 wherein the microprocessor 1000 generates commands to the elevator motor 220 to move the elevator 202 down by N steps (for example, two steps) which should be a sufficient number of steps to move the elevator 202 out of the range of the home position sensor 230. Then, in a decision block 2614, the microprocessor 1000 checks to see if the home position sensor 230 currently indicates the presence of the elevator in the home position. If so, the microprocessor 1000 proceeds to a routine 2616 wherein it reports a status indication to the SCSI bus controller 1040 to indicate that the elevator 202 cannot be moved or that the home position sensor 230 is faulty. Thereafter, the microprocessor 1000 proceeds to a routine 2618 to flash the ready indicator (not shown) in a manner such as was discussed above.

If in the decision block 2610 or in the decision block 2614, the microprocessor 1000 determines that the home position sensor 230 is not generating an active signal, the microprocessor 1000 proceeds to a routine 2620 wherein the microprocessor 1000 sets a value N in an internal register (not shown) to an initial count of 0. Then, in a routine 2622 (FIG. 25B), the microprocessor 1000 generates a command to the elevator motor 220 to raise the elevator 202 by one step. The value of N is incremented after the step is completed. Then, in a decision block 2624, the home position sensor 230 (top of carriage indicator) is checked to determine whether the elevator 202 has reached the home position. If the elevator 202 has not reached the home position, the microprocessor 1000 proceeds to a decision block 2626 wherein, the microprocessor 1000 compares the current value of N to a maximum value N1 which, in this example, is set to 187, the maximum number of steps from the lowermost position of the elevator 202 to the home position sensor 230. If N has reached N1 without reaching the home position, then either the elevator 202 is not moving or the home position sensor 230 is not working. Thus, the microprocessor 1000 proceeds to the routine 2616 (FIG. 25B) where it indicates the fault to the SCSI bus controller 1040 and then flashes the ready indicator as discussed above.

If, in the decision block 2624, the microprocessor 1000 determines that the elevator 202 is in the home position, the microprocessor 1000 proceeds to a routine 2628 wherein it sends commands to the elevator motor 220 to step the elevator 202 by N3 steps to a parking area between the magazines. For example, in the preferred embodiment, the elevator 202 is moved downward by 47 steps to park between the second magazine 132 and the third magazine 134. In this position, the picker tooth 473 is not engaged with any of the trays 139, and the magazines 131–135 can be freely removed from the slots 125–129. Thereafter, the microprocessor 1000 returns to the main idle routine 2506 (FIG. 24) to await a command from the SCSI bus controller 1040.

The main idle routine 2506 will not be described in detail. Basically, the microprocessor 1000 awaits receipt of a command from the SCSI bus controller 1040 in a conventional manner by responding to any interrupt that it receives from the SCSI bus controller 1040. Advantageously, the microprocessor 1000 monitors various status indicators, such as the door open indicator or the magazine present indicators to determine whether a change has been made in the operational condition of the system. Techniques for responding to interrupts and for polling status indicators are well known to persons of skill in the art.

Figure 26:
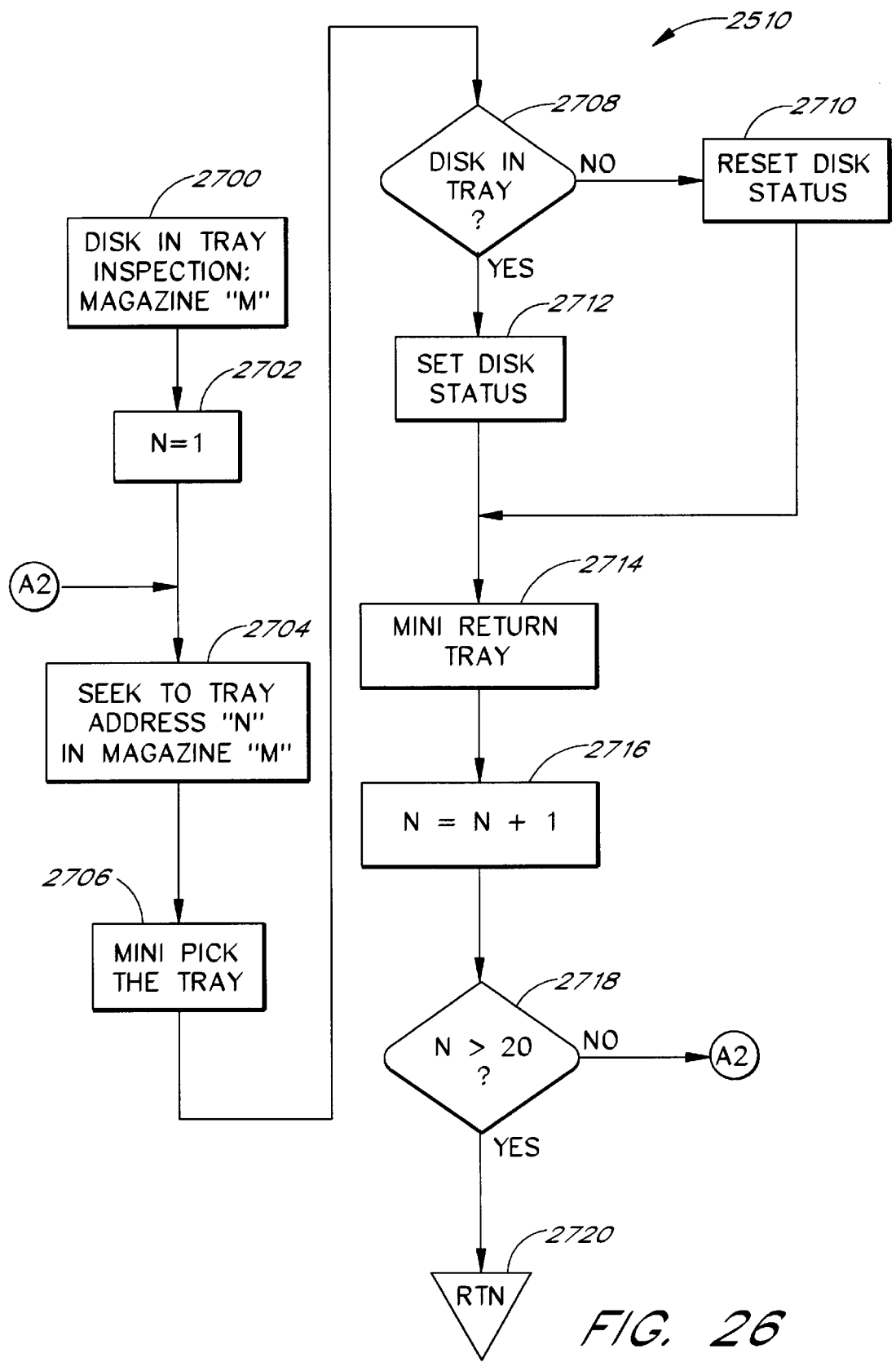

Returning to FIG. 24, if while in the main idle routine 2506, the microprocessor receives an interrupt from the SCSI bus controller 1040, the microprocessor receives and decodes the command in the routine 2508. If the command is to perform a mini-pick operation, the microprocessor 1000 proceeds to the routine 2510 which is shown in more detail in FIG. 26. The microprocessor 1000 enters the routine 2510 in a routine 2700 wherein the microprocessor 1000 determines which magazine or magazines to test for presence of disks in the trays. For example, the microprocessor 1000 may be commanded to test all magazines or to test one particular magazine. The routine 2510 illustrated in FIG. 26 shows the operation for one magazine. After determining which magazine to test, the microprocessor enters a routine 2702 wherein it sets a value N equal to 1 to indicate that the first tray of the magazine is to be tested. Then, in a routine 2704, the microprocessor 1000 sends commands to the elevator motor 220 to move the elevator to the first tray in the selected magazine. The microprocessor 1000 calculates the number of steps up or down from its present position to the desired position and outputs the requisite number of step commands to the motor 220 to cause the required movement to reach the desired position.

After reaching the desired position, the microprocessor 1000 performs a mini-pick operation in a routine 2706. In the mini-pick operation, the microprocessor 1000 commands the picker stepper motor 478 to step a sufficient number of steps to withdraw the selected tray approximately one inch from the selected magazine. This distance is sufficient to position the disk in the tray in the light path between the transmitter 940 and the receiver 942 which sense whether a disk is in the partially extended tray. In a decision block 2708, the microprocessor 1000 monitors the output of the receiver 942 to determine if a disk is present. If a disk is not present, then in a routine 2510, the microprocessor 1000 clears a predetermined status bit in memory location in the nonvolatile RAM 1020 to indicate that the disk is not present in the particular tray. Otherwise, if the disk is present, the microprocessor 1000 enters a routine 2712 wherein it sets the predetermined status bit. In either case, the microprocessor 1000 then enters a routine 2714 wherein it returns the tray to its home position by sending a sufficient number of step commands to the picker stepper motor 478. Before moving the elevator 202, the microprocessor 1000 advantageously verifies that the picker is in its most forward position by checking the output of the forward travel sensor 480 and also verifies that the tray has been returned by checking the output of the infrared receiver 902 to verify that the notches 762 are properly aligned.

The microprocessor 1000 then increments the value of N in a routine 2716 and then in a decision routine 2718, the microprocessor determines whether N is greater than 20 which indicates whether the last tray in the magazine has been mini-picked. If N is not greater than 20, the microprocessor 1000 returns to the routine 2704 to seek to the next tray and then test the presence of a disk in the tray. Otherwise, if N is greater than 20, the microprocessor 1000 returns to the idle routine 2506 via a return routine 2720.

By performing the mini-pick operation on all the trays in a magazine when a new magazine is inserted into one of the slots, the microprocessor 1000 is able to quickly inventory the magazine to thereby determine which trays in the magazine originally held disks. The microprocessor 1000 advantageously stores the original magazine inventory in a status word in the RAM 1020, and can later compare the original inventory to the current inventory to determine whether the particular magazine can be removed from its respective slot. If an original disk is not present in the magazine, the microprocessor 1000 causes the LED associated with the magazine to flash to indicate to the user that the magazine should not be removed.

Figure 27A:
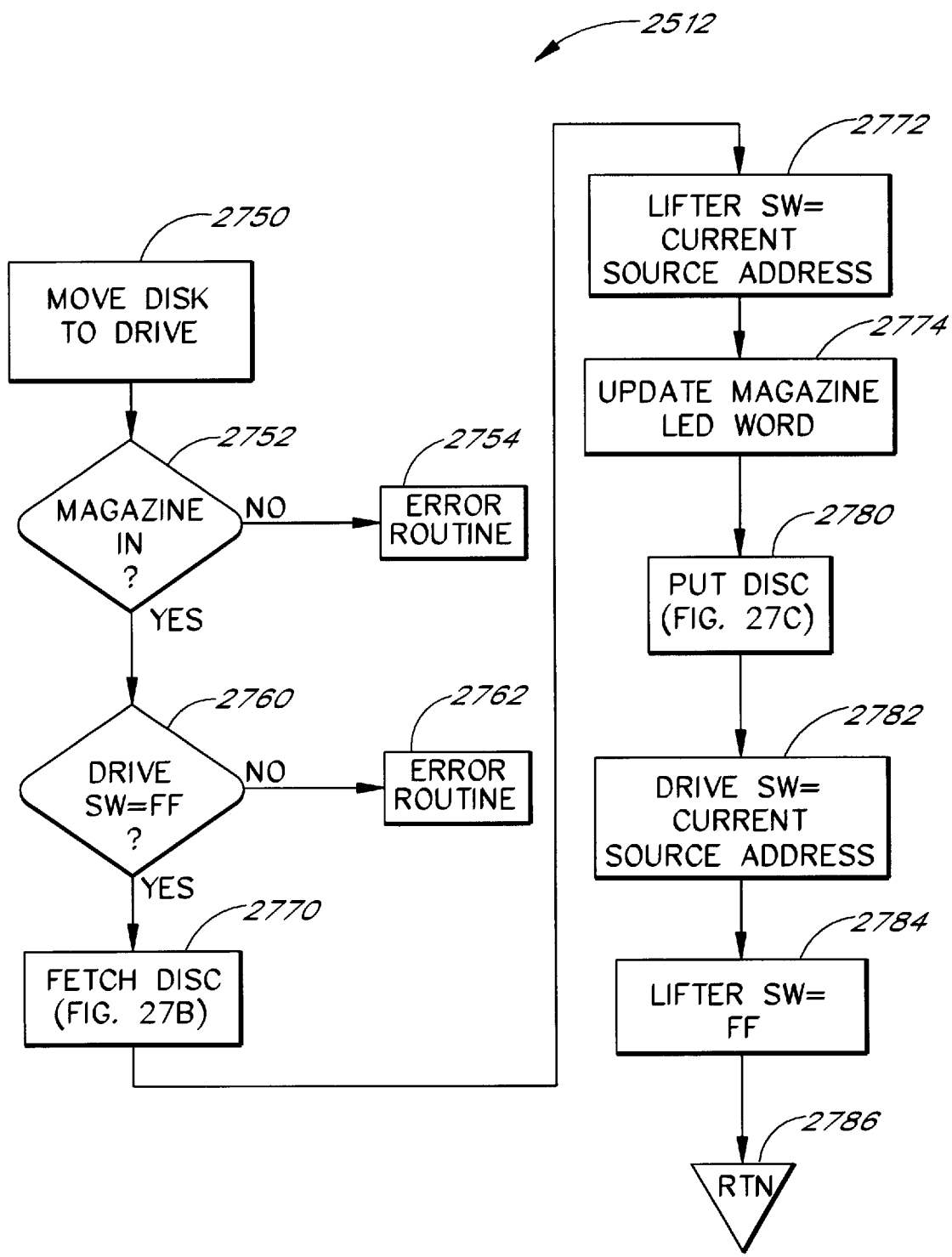
Figure 27B:
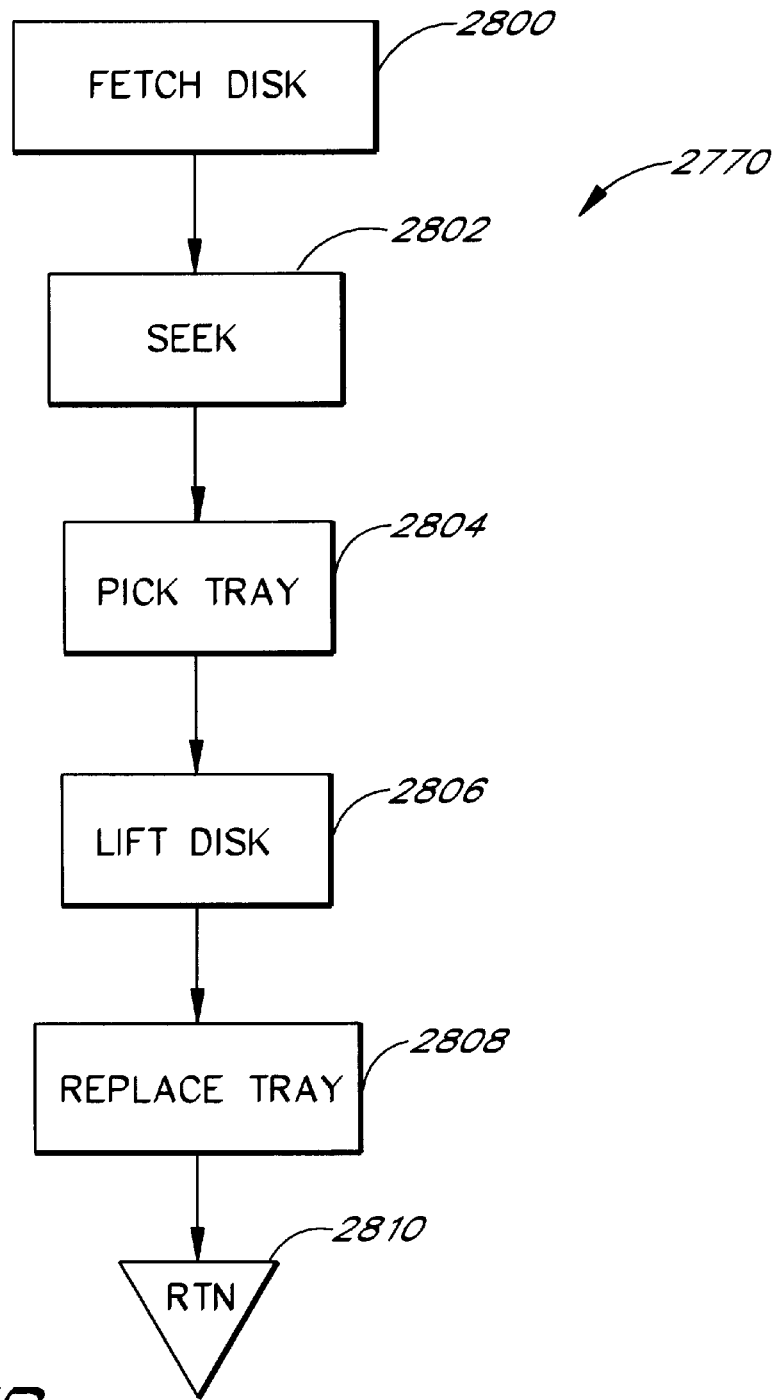
Figure 27C:
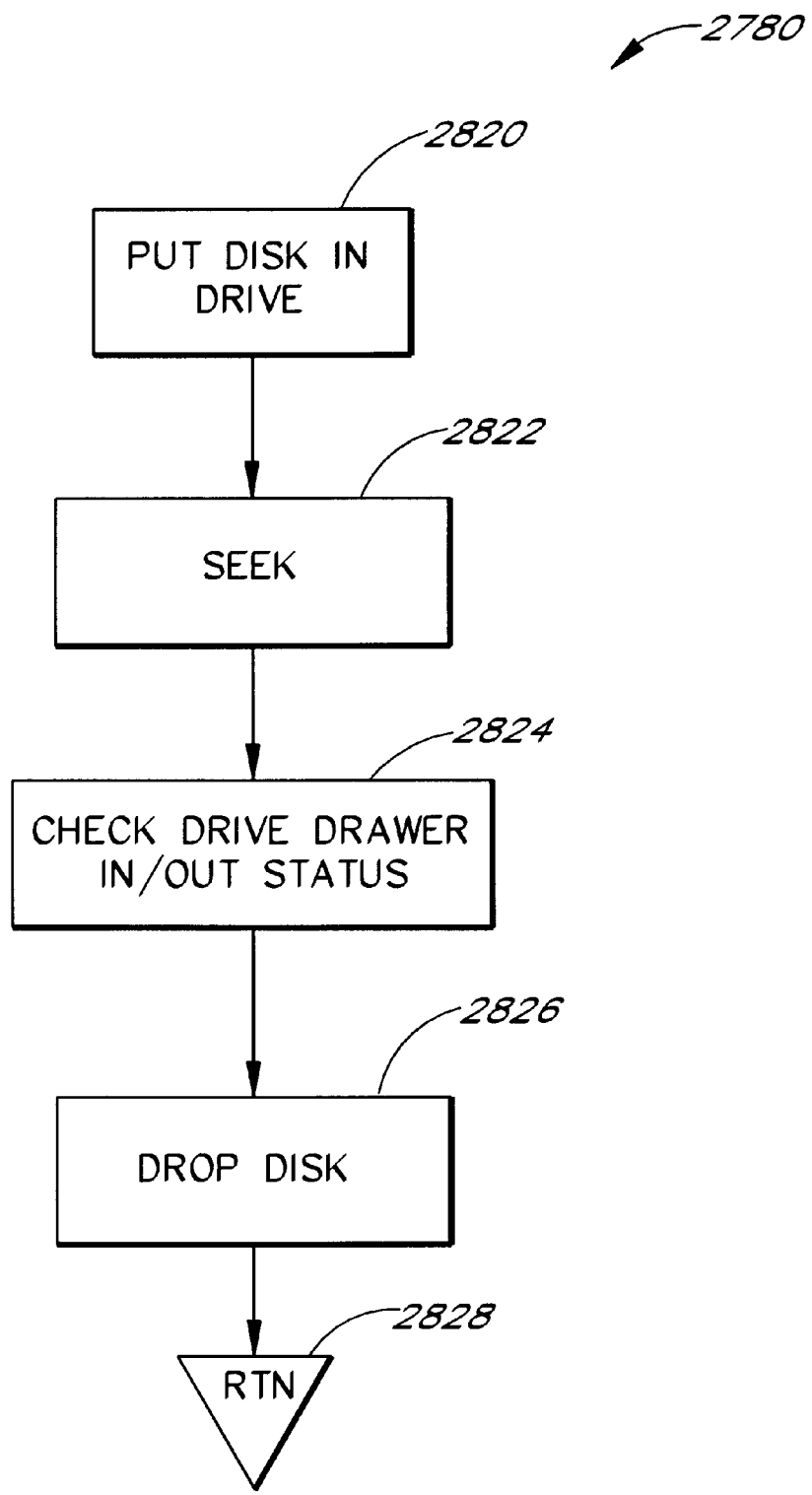

If, in the routine 2508 (FIG. 24), the microprocessor 1000 decodes a command to move a disk from a magazine to a drive, it enters the routine 2512 which is described in detail in FIGS. 27A, 27B and 27C. The microprocessor 1000 enters the routine 2512 in an entry routine 2750 with the information regarding the magazine and tray where the disk is to be removed and the drive to which the disk is to be taken. First, in a decision routine 2752, the microprocessor 1000 checks a predetermined location in a status word in the nonvolatile RAM 1020 to determine whether the requested magazine is present in the system (i.e., whether the corresponding microswitch was closed when the status word was last updated). If the magazine is not present, the microprocessor 1000 enters an error routine 2754 wherein it sends an error message to the SCSI bus controller 1040 indicating that the requested command was not successfully completed because the magazine was not in its respective slot. Thereafter, the microprocessor 1000 returns to the idle routine 2506 (FIG. 24) to await further commands from the SCSI bus controller 1040.

If, in the decision routine 2752, the microprocessor 1000 determines that the magazine is present, the microprocessor 1000 proceeds to a decision routine 2760 wherein it reads a status word in the nonvolatile RAM 1020 associated with the destination drive. A status word is provided in the nonvolatile RAM 120 for each drive 141–144 so that the microprocessor 1000 can keep track of the current status of each drive with respect to its last activity with respect to the drive. In particular, when the drive drawer is empty, the status word is set to hexadecimal FF (eight ones) to indicate that the drive is empty. If a disk is transferred from a magazine tray to the drive drawer, the drive status word is set to a value corresponding to the tray which was the source for the disk. For example, in the simplest embodiment, the status word value is set to a value from 0 through 19 for a disk from the uppermost magazine in the slot 125, to a value from 20–39 for a disk in the next higher slot 126, and so on. Thus, if in the decision routine 2760, the microprocessor 1000 reads a value other than FF for the status word for the destination drive, the destination drive already has a disk in it, and the microprocessor 1000 proceeds to an error routine 2762 wherein the microprocessor 1000 sends an error message to the SCSI bus controller 1040. The microprocessor 1000 then returns to the idle routine 2506 (FIG. 24) to await the next command from the SCSI bus controller 1040.

If, in the decision routine 2760, the drive status word contains a value of FF, the microprocessor 1000 enters a routine 2770 wherein it fetches a disk from the source tray. The routine 2770 will be described in more detail below in connection with FIG. 27B. After fetching the disk, the microprocessor 1000 enters a routine 2772 wherein it changes a status word in the nonvolatile RAM 1020 associated with the lifter from a value of FF to a value corresponding to the source address (i.e., the magazine and tray) of the disk currently on the lifter assembly 252. Then, in a routine 2774, the microprocessor 1000 updates a status word associated with the magazine from which the disk was removed to indicate that the disk from the particular tray was removed. The microprocessor also enables the status LED associated with the magazine to indicate that a disk has been removed from the magazine. This alerts the user that the magazine should not be removed from the enclosure until the disk is returned.

The microprocessor 1000 then proceeds to a routine 2780 wherein the elevator is moved to the destination drive drawer and the disk is lowered into the drive drawer. The routine 2780 is described in more detail below in connection with FIG. 27C. After deposited the disk on the drive drawer, the microprocessor 1000 enters a routine 2782 wherein the microprocessor 1000 stores a value corresponding to the source of the disk in the status word associated with the destination drive so that the microprocessor 1000 can determine later that the drive is currently loaded with that particular disk. Thereafter, in a routine 2784, the microprocessor 1000 stores a value of FF in the lifter status word to indicate that the lifter assembly 252 is currently empty (i.e., does not have a disk present). Thereafter, the microprocessor 1000 returns to the idle routine 2508 via a return routine 2786.

FIG. 27B illustrates the fetch disk routine 2770 in more detail. The microprocessor enters the routine 2770 in a routine 2800 with a source address for the disk to be fetched. The microprocessor 1000 converts the source address into a location of the elevator 202 with respect to the home position. Then, in a routine 2802, the microprocessor 1000 generates step commands to the elevator motor 220 to step from its current position to the position of the tray having the desired disk. The microprocessor 1000 then picks the tray in a routine 2804 by generating step commands to the picker motor 478 and verifying that the selected tray 139 has moved to the rearward travel sensor 481. Then, in a routine 2806, the microprocessor 1000 generating step commands to the lifter stepper motor 512 to cause the lifter stepper motor 512 to rotate in the counterclockwise direction, as illustrated above in connection with FIGS. 10A–10E, to lift a disk 140 from the tray 139. The microprocessor 1000 advantageously verifies the completion of the operation by checking the output from lifter home position sensor 580 to determine if the disk lifter is at top dead center and also by checking the output of the disk present sensor 590 to make sure the disk 140 has been successfully lifted from the tray 139. Appropriate error routines (not shown) or retry routines (not shown) may be advantageously provided to control the operations of the microprocessor 1000 if either check indicates that the operation was not successfully completed.

After lifting the disk, the microprocessor 1000 generates commands to the picker motor 478 to reinsert the tray in the magazine. The microprocessor 1000 then returns to the routine 2512 (FIG. 27A) via a return routine 2710.

The routine 2780 is illustrated in more detail in FIG. 27C. The microprocessor enters the routine 2780 in a first routine 2820 wherein the microprocessor 1000 determines the destination for the disk which it has on the lifter assembly 252. The microprocessor 1000 calculates the number of steps required to move the elevator 202 from its current position to the drawer of the destination drive. Then, in a seek routine 2822, the microprocessor 1000 generates a sequence of step commands to the elevator motor 220 to step the elevator 202 downward to the location of the destination drawer. As discussed above, the microprocessor 1000 monitors the output of the obstruction sensor receiver 952 to make sure that it does not collide with an extended tray or drawer or other obstruction on the way down to the destination drawer. This is particularly important because the drives are controlled independently of the changer 100, and an erroneous command to the wrong drive could extend a drawer from a drive above the destination drive. Assuming that no obstructions are present, when the elevator 202 reaches the vicinity of the extended drawer, the microprocessor 1000 also monitors the output of the obstruction sensor receiver 952 in a routine 2824 to assure that the drive drawer has indeed been extended. The microprocessor 1000 does not issue commands to lower the disk without first verifying the presence of an extended drawer beneath the lifter assembly 252.

When the elevator 202 has been moved to the proper location above the extended drive drawer, the microprocessor 1000 generates step commands to the lifter motor 512 in a routine 2826 to rotate the lifter motor 512 clockwise to thereby lower the disk onto the drive drawer as described above in connection with FIGS. 11A–11E. After lowering the disk onto the drawer, the microprocessor 1000 verifies that the lifter has returned to top dead center and that no disk is present on the lifter. If either verification fails, the microprocessor 1000 executes an appropriate error or retry routine (not shown). Otherwise, the microprocessor 1000 returns to the routine 2512 (FIG. 27A) via a return routine 2828.

FIGS. 28A–28D illustrate in more detail the routine 2514 for transporting a disk from a drive to a magazine. The microprocessor 1000 enters the routine 2514 in a routine 2900 wherein it evaluates the move command to determine which disk from which magazine is to be moved. Then, in a decision routine 2902, the microprocessor 1000 determines whether the requested magazine is currently loaded in the system. If not, the microprocessor 1000 enters an error routine 2904 in which the microprocessor 1000 sends a status response to the SCSI bus controller 1040 indicating that the requested command was not completed. The status response advantageously includes an indication that the requested magazine was not present.

If the magazine is present, the microprocessor 1000 enters a decision routine 2906 wherein the microprocessor 1000 determines whether the selected magazine has been inventoried. Briefly, the microprocessor 1000 advantageously maintains a list of the contents of the magazines to keep track of the disks present in the magazine as a result of the mini-pick operation described above. However, if a magazine is replaced by the user and a mini-pick operation has not been requested, then the microprocessor 1000 does not have a current list of disks in that particular magazine. If the magazine has been inventoried, the microprocessor 1000 proceeds to a decision routine 2908 wherein the microprocessor 1000 examines the inventory list for the magazine and determines whether the requested disk is present in the magazine. If the disk is not present, either because it was not in the magazine originally or because it has been previously moved, then the microprocessor 1000 proceeds to a get disk routine 2910 which will be described below in connection with FIG. 28C. The microprocessor 1000 also goes directly to the routine 2910 from the decision routine 2906 if the magazine has not been inventoried. If, in the decision routine 2908, the microprocessor 1000 determines that there is a disk already in the selected location of the magazine, the microprocessor 1000 enters an error routine 2912 wherein it sends a status report to the SCSI bus controller 1040 to indicate that the operation was not completed and, preferably, to indicate the reason for not completing the operation.

After getting the disk in the routine 2910, the microprocessor 1000 enters a routine 2920 wherein it returns the disk to the selected tray. A more detailed description of the routine 2920 will be provided below in connection with FIG. 28D. Thereafter, in a routine 2922, the microprocessor sets the lifter status work to FF to indicate that the lifter assembly 252 does not have a disk present. Then, in a routine 2924, the microprocessor updates the magazine LED status word to indicate that the disk is now present in the destination tray. If, after updating the magazine LED status word, the microprocessor 1000 determines that all of the trays originally holding disks currently have disks in them, the LED for that magazine is turned off to indicate to the user that the magazine can be removed. The microprocessor 1000 then returns to the routine 2514 (FIG. 28A) via a return routine 2926.

Figure 28A:
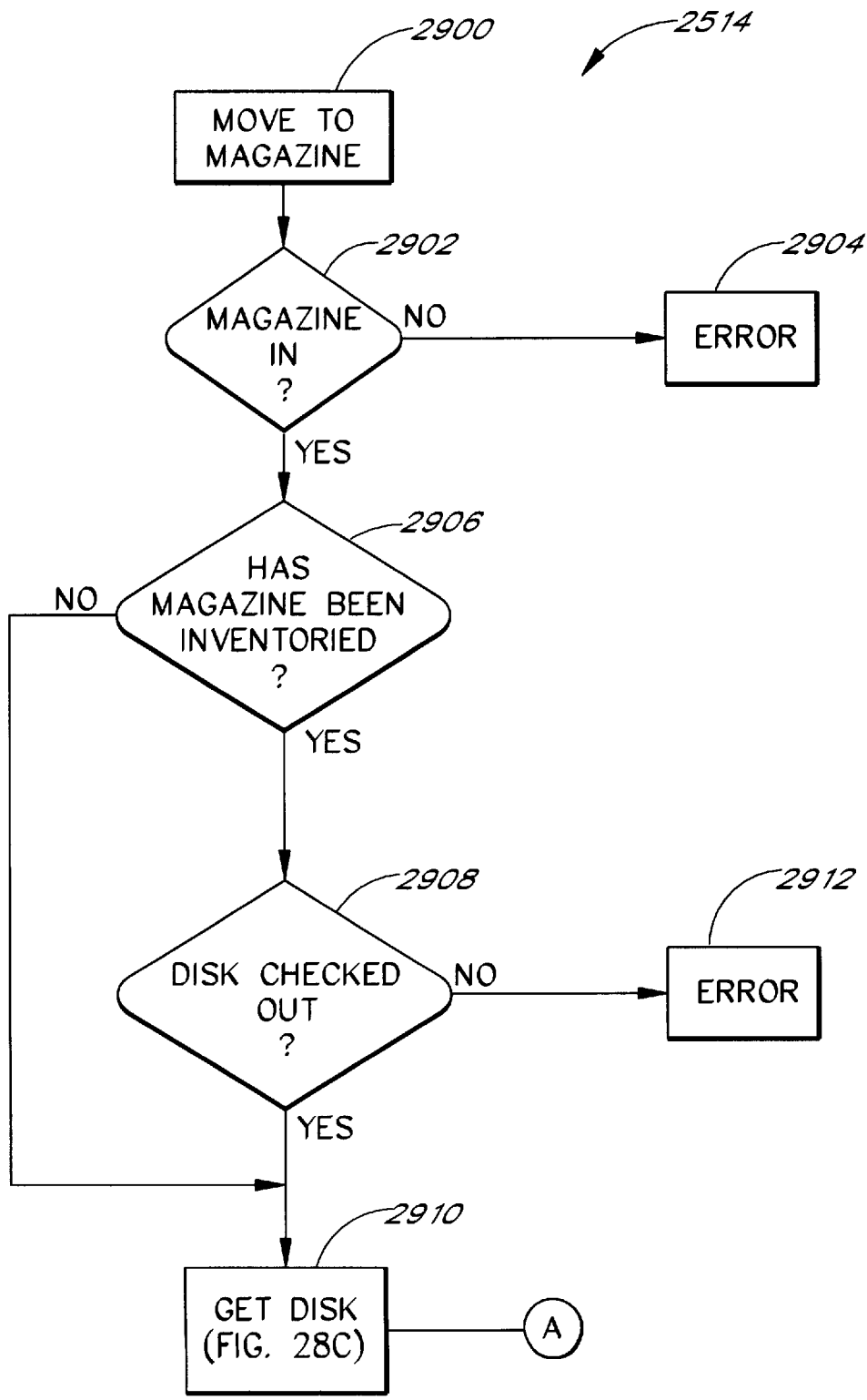
Figure 28B:
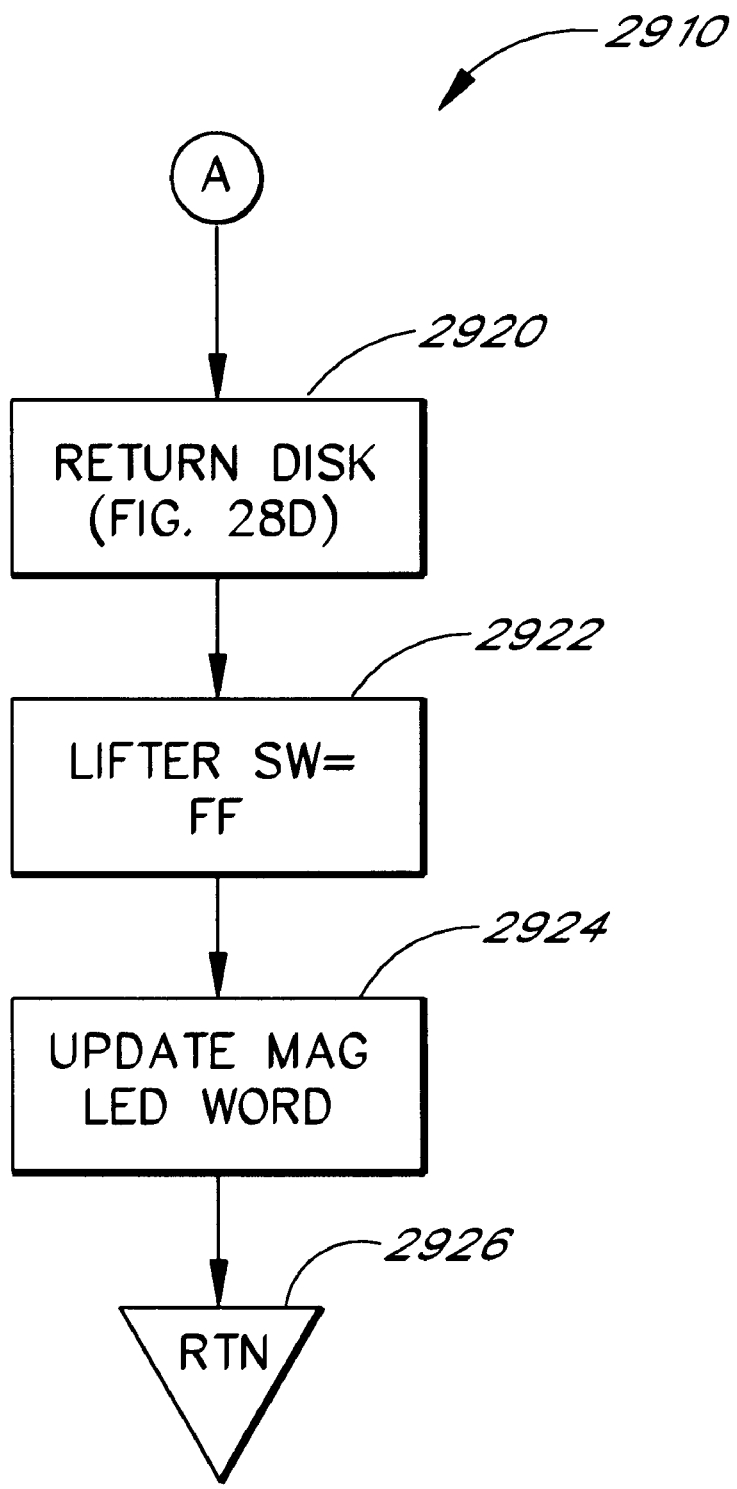
Figure 28C:
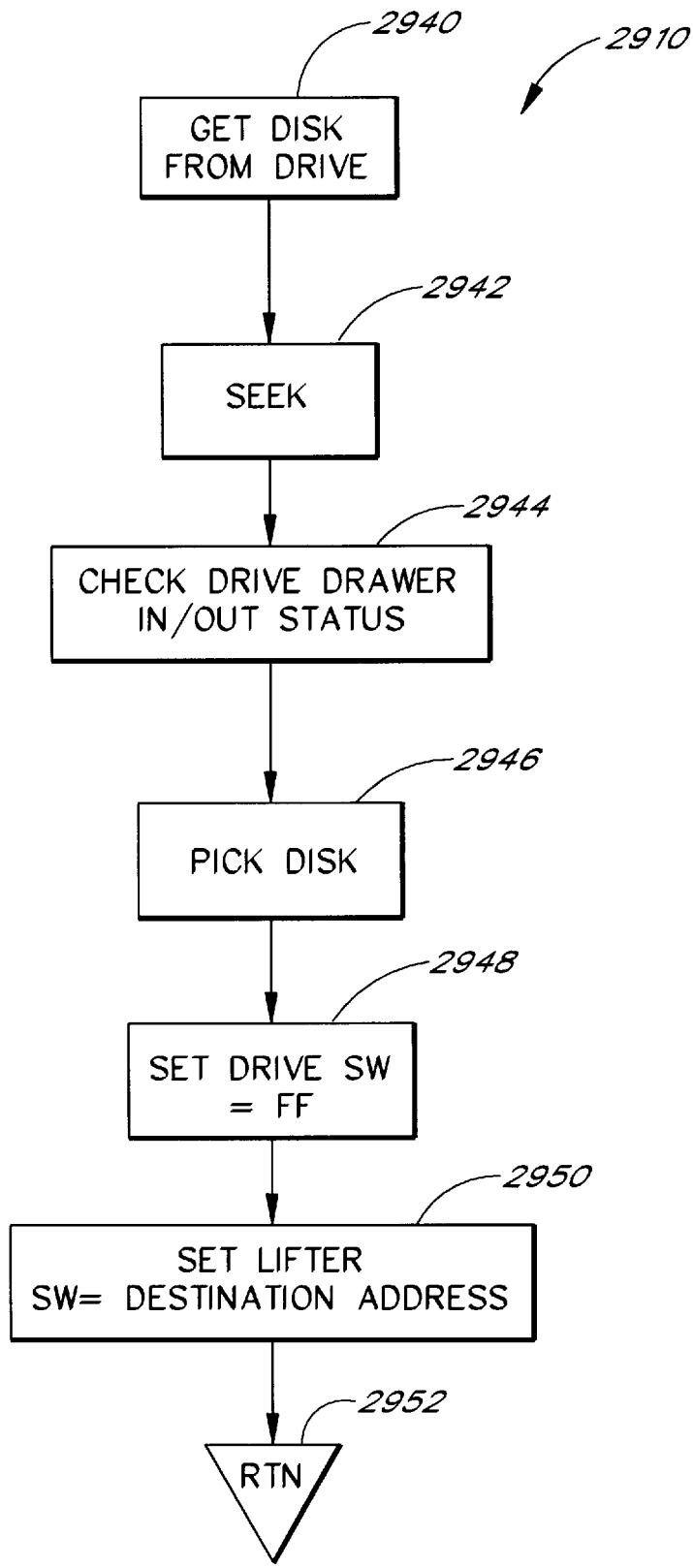

The routine 2910 for getting the disk from the drive drawer is illustrated in FIG. 28C. The microprocessor 1000 enters the routine 2910 in a routine 2940 wherein the microprocessor 1000 determines the elevator location corresponding to the drive drawer from which the disk is to be retrieved. Then, in a routine 2942, the microprocessor 1000 generates step commands to move the elevator 202 to the correct drawer location, as described above. When the elevator 202 has reached the correct drawer location and the microprocessor has determined that the drawer is extended in a routine 2944, as described above, the microprocessor 1000 generates step commands to the lifter motor 512 in a routine 2946 to cause the motor 512 to rotate counterclockwise to lift the disk from the extended drive drawer. The microprocessor 1000 preferably performs the checking described above. If the disk is successfully lifted, then, in a routine 2948, the microprocessor 1000 sets the drive status word to FF to indicate that it no longer has a disk present, and, in a routine 2950, the microprocessor 1000 sets the lifter status word with a value indicating the destination tray for the disk on the lifter. Thereafter, the microprocessor 1000 returns to the routine 2514 (FIG. 28A) via a return routine 2952.

Figure 28D:
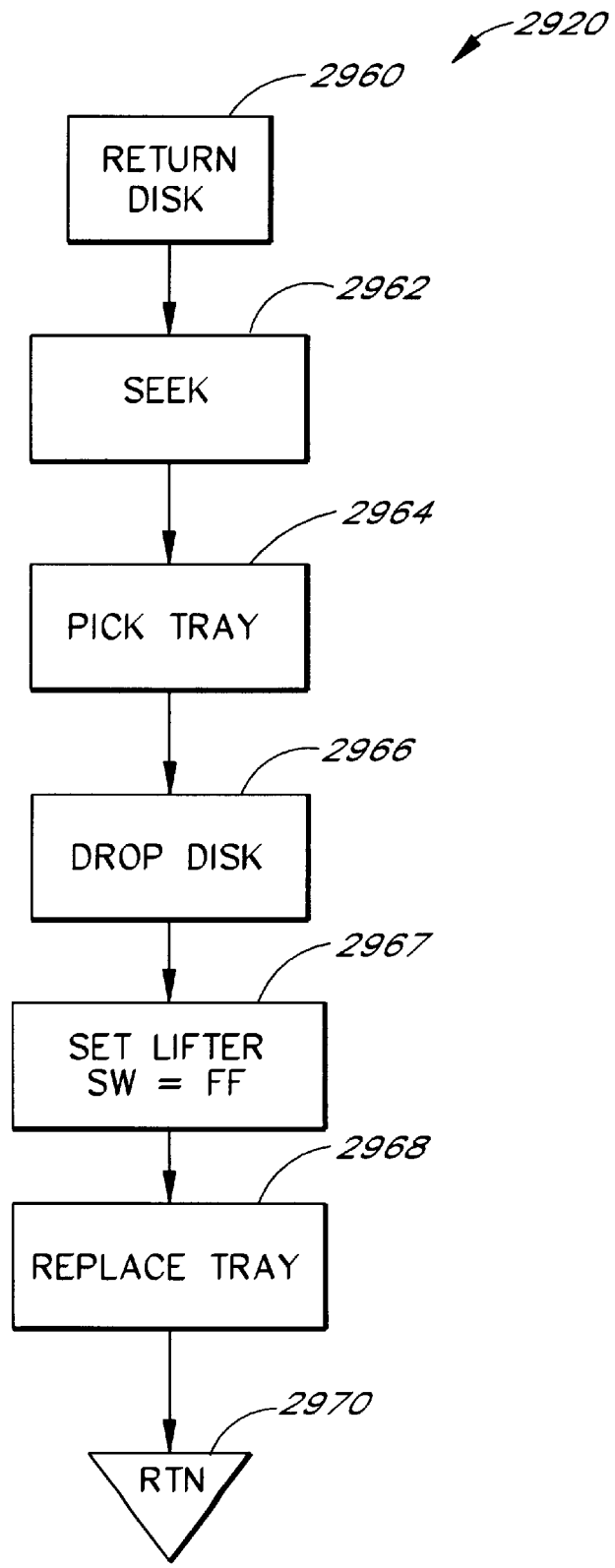

FIG. 28D illustrates in more detail the routine 2920 for returning the disk to the destination tray in the destination magazine. In particular, in a routine 2960, the microprocessor determines where the destination tray is located with respect to the present position of the elevator 202. Then, in a routine 2962, the microprocessor 1000 generates step commands to the elevator motor 220 to move the elevator 202 upward to the destination location. After the elevator 202 reaches the destination location, the microprocessor 1000 enters a routine 2964 wherein the microprocessor 1000 generates step commands to the picker motor 478 to pull the tray out of the magazine. Then, in a routine 2966, the microprocessor 1000 issues step commands to the lifter motor 512 to rotate the lifter motor 512 clockwise to lower the disk onto the extended tray. Then, in a routine 2967, the microprocessor 1000 sets the lifter status word to FF to indicate that no disk is present on the disk lifter assembly 252. Thereafter, in a routine 2968, the microprocessor 1000 generates step commands to the picker motor 478 to insert the tray in the magazine. The microprocessor 1000 then returns to the routine 2514 via a return routine 2970.

From the foregoing description, it can be appreciated that the microprocessor 1000 advantageously writes status information to the nonvolatile memory 1020 as it progresses through its various operations. The status words for the lifter, for the disk drives and for the magazines enable the microprocessor 1000 to determine what operation was in progress if power was turned off. In particular, when the microprocessor 1000 executes the routine 2504 (FIG. 25), the microprocessor 1000 can readily determine the source of any disk that might be on the lifter and can determine the source magazine from which any disk in a drive. Additional status words can advantageously be provided to more distinctly define an operation in progress so that the microprocessor 1000 can resume any operation which was interrupted when power was turned off.

The inventions described herein may be embodied in other specific forms without departing from the essential characteristics as described herein. The embodiments described above are to be considered in all respects as illustrative only and not restrictive in any manner. The scope of each of the inventions is indicated by the following claims rather than by the foregoing description. Any and all changes which come within the meaning and range of equivalency of the claims are to be considered within their respective scope.

What is claimed is:

1. A disk library comprising:

an inner frame;

a plurality of disk magazines removably secured within said inner frame, each of said magazines including a plurality of disk trays which hold removable disks, said trays selectively extendable from said magazines, each magazine comprising:

a top portion and a bottom portion;

a frame between said top portion and said bottom portion, said frame comprising an inner portion having at least 20 slots, each slot formed between a respective pair of guide rails; and at least 20 disk trays, each tray spaced apart by a center-to-center distance of approximately 0.1 inch, such that said magazine has a vertical thickness between said top portion and said bottom portion of less than 2.5 inches, each of said trays including a hook extending from an edge thereof, said magazine including a spring-biased latch positioned proximate the midpoint of a side of said magazine, said latch including an actuator portion and a hook portion, said hooks of said trays engaging said hook portion of said latch upon extension of said trays unless said actuator portion of said latch is actuated by a protuberance positioned on said inner frame which engages the actuator portion during insertion of said magazine in said inner frame, said latch thereby preventing full extension of said trays unless said magazine is in said inner frame;

at least one disk drive removably secured within said inner frame, said disk drive including at least one drive drawer which holds a removable disk, said drive drawer selectively extendable from said disk drive;

a disk transport mechanism which transports disks to and from said trays and to and from said drive drawer, said transport mechanism comprising:

a vertical shaft;

an elevator slidably mounted to move up and down along said shaft;

a tray picker mounted to said elevator which selectively pulls one of said trays from one of said magazines to extend said tray so that a disk in said tray has a predetermined alignment with respect to said elevator, said tray picker including an engagement tooth, at least one of said ears on each of said trays having a notch, said notches of all of said trays forming an aligned channel for vertical movement of said engagement tooth of said tray picker therein, said engagement tooth further engaging said notch of one of said trays when said tray picker operates to pull said tray from said magazine, a lifter mounted to said elevator which raises a disk from one of said trays, said lifter retaining said disk to move said disk from said tray to said drive drawer, said lifter releasing said disk onto said drive drawer, said lifter further raising said disk from said drive drawer, retaining said disk to move said disk to said tray, and releasing said disk onto said tray; and an elevator motor coupled to said elevator to move said elevator between a position proximate to one of said trays and a position proximate to said drive drawer.

2. The disk library as defined in claim 1, comprising five magazines, each of said magazines having 20 trays for holding 20 disks therein, said disk transport further comprising four drives, said disk transport being enclosed within a volume having dimensions of no more than approximately 25 inches high by 18 inches deep by 9 inches wide.

3. A disk library comprising:

an inner frame;

a plurality of disk magazines removably secured within said inner frame, each of said magazines comprising:

a top portion and a bottom portion;

a frame between said top portion and said bottom portion, said frame comprising an inner portion having a plurality of slots, each slot formed between a respective pair of guide rails; and a plurality of disk trays for holding disks, each of said trays having an opening formed therein, the openings of all of said trays being vertically aligned when all of said trays are secured within said magazines, said inner frame comprising:

a transmitter which transmits light through said aligned openings of said trays; and a receiver which receives said light transmitted by said transmitter when said openings are aligned, said receiver providing an output signal that indicates that said openings are aligned, thereby indicating that all trays are secured in their respective magazines;

at least one disk drive removably secured within said inner frame, said disk drive including at least one drive drawer which holds a removable disk, said drive drawer selectively extendable from said disk drive;

a disk transport mechanism which transports disks to and from said trays and to and from said drive drawer, said transport mechanism comprising:

a vertical shaft;

an elevator slidably mounted to move up and down along said shaft;

a tray picker mounted to said elevator which selectively pulls one of said trays from one of said magazines to extend said tray so that a disk in said tray has a predetermined alignment with respect to said elevator, said tray picker including an engagement tooth positioned on a carriage that is moved by a belt driven by a pulley and a stepper motor, at least one of said ears on each of said trays having a notch, said notches of all of said trays forming an aligned channel for vertical movement of said engagement tooth of said tray picker therein, said engagement tooth further engaging said notch of one of said trays when said tray picker operates to pull said tray from said magazine;

a lifter mounted to said elevator which raises a disk from one of said trays, said lifter including a lifter chuck having at least one finger that pivots about a pivot point, the finger having an inwardly tapered portion and a straight portion that includes a hook, the hook being extended when an enlarged end of a pin positioned in a hollow cavity in the lifter chuck is below the pivot point and the hook being retracted when the enlarged end is above the pivot point, said lifter retaining said disk to move said disk from said tray to said drive drawer, said lifter releasing said disk onto said drive drawer, said lifter further raising said disk from said drive drawer, retaining said disk to move said disk to said tray, and releasing said disk onto said tray; and an elevator motor coupled to said elevator to move said elevator between a position proximate to one of said trays and a position proximate to said drive drawer.

4. A disk library comprising:

an inner frame;

a plurality of disk magazines removably secured within said inner frame, each of said magazines comprising:
- a top portion and a bottom portion;
- a frame between said top portion and said bottom portion, said frame comprising an inner portion having a plurality of slots, each slot formed between a respective pair of guide rails; and
- a plurality of disk trays for holding disks, each of said trays including a hook extending from an edge thereof, said magazine including a latch means positioned proximate the midpoint of a side of said magazine for engaging said hook upon extension of said trays when said magazine is not inserted in said inner frame, said latch means not engaging said hook upon extension of said tray when said magazine is inserted in said inner frame, said latch means thereby preventing full extension of said trays unless said magazine is in said inner frame;

at least one disk drive removably secured within said inner frame, said disk drive including at least one drive drawer which holds a removable disk, said drive drawer selectively extendable from said disk drive;

a disk transport mechanism which transports disks to and from said trays and to and from said drive drawer, said transport mechanism comprising:

a vertical shaft;

an elevator slidably mounted to move up and down along said shaft;

a tray picker mounted to said elevator which selectively pulls one of said trays from one of said magazines to extend said tray so that a disk in said tray has a predetermined alignment with respect to said elevator, said tray picker including an engagement tooth, at least one of said ears on each of said trays having a notch, said notches of all of said trays forming an aligned channel for vertical movement of said engagement tooth of said tray picker therein, said engagement tooth further engaging said notch of one of said trays when said tray picker operates to pull said tray from said magazine;

a lifter mounted to said elevator which raises a disk from one of said trays, said lifter retaining said disk to move said disk from said tray to said drive drawer, said lifter releasing said disk onto said drive drawer, said lifter further raising said disk from said drive drawer, retaining said disk to move said disk to said tray, and releasing said disk onto said tray; and an elevator motor coupled to said elevator to move said elevator between a position proximate to one of said trays and a position proximate to said drive drawer.

* * * * *